(12) United States Patent
Yamada et al.

(10) Patent No.: US 7,911,643 B2
(45) Date of Patent: Mar. 22, 2011

(54) IMAGING APPARATUS HAVING IMAGE DATA STORING FUNCTION

(75) Inventors: Makoto Yamada, Gifu (JP); Hiroyuki Yamamoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1426 days.

(21) Appl. No.: 10/396,344

(22) Filed: Mar. 26, 2003

(65) Prior Publication Data

US 2003/0184803 A1 Oct. 2, 2003

(30) Foreign Application Priority Data

Mar. 28, 2002 (JP) ................................ 2002-092494
Jul. 11, 2002 (JP) ................................ 2002-202608

(51) Int. Cl.
*G06F 3/12* (2006.01)
(52) U.S. Cl. ......... 358/1.9; 358/1.2; 358/1.15; 358/523; 358/448; 358/451
(58) Field of Classification Search .............. 358/1.9, 358/523, 448, 450, 1.2, 1.11–1.15, 451
See application file for complete search history.

(56) References Cited

U.S. PATENT DOCUMENTS

| 5,299,018 | A | | 3/1994 | Jefferson |
| 5,461,488 | A | * | 10/1995 | Witek ........................... 358/402 |
| 5,956,158 | A | * | 9/1999 | Pinzarrone et al. ........... 358/474 |
| 6,427,058 | B1 | * | 7/2002 | Akiba et al. .................... 399/82 |
| 6,594,650 | B2 | * | 7/2003 | Hasuo et al. ...................... 707/2 |
| 6,980,331 | B1 | * | 12/2005 | Mooney et al. ............... 358/400 |
| 6,982,811 | B2 | | 1/2006 | Sato |
| 2001/0000979 | A1 | * | 5/2001 | Han et al. ...................... 358/474 |
| 2001/0015823 | A1 | | 8/2001 | Sato |
| 2002/0048032 | A1 | | 4/2002 | Ichikawa et al. |
| 2002/0140989 | A1 | * | 10/2002 | Shinchi et al. ................ 358/402 |
| 2005/0280854 | A1 | | 12/2005 | Sato |

FOREIGN PATENT DOCUMENTS

| EP | 1 107 565 A | 6/2001 |
| JP | A 11-4403 | 1/1999 |
| JP | A 11-219423 | 8/1999 |
| JP | A 2000-16833 | 1/2000 |
| JP | 2001-358863 | 12/2001 |
| JP | 2001358863 A * | 12/2001 |
| JP | A 2001-358857 | 12/2001 |
| JP | A 2002-057874 | 2/2002 |
| WO | WO 01/59696 A2 | 8/2001 |

* cited by examiner

*Primary Examiner* — Chan S Park
(74) *Attorney, Agent, or Firm* — Oliff & Berridge, PLC

(57) ABSTRACT

An imaging apparatus is capable of storing image data in a storage. The imaging apparatus is provided with an image obtaining system that obtains image data, and an image data writing system that stores the image data obtained by the image obtaining system in the storage. The image data writing system stores the image data in a format which is determined in accordance with the number of pages of images represented by the image data.

38 Claims, 32 Drawing Sheets

IMAGING APPARATUS HAVING IMAGE DATA STORING FUNCTION

BACKGROUND OF THE INVENTION

The present invention relates to an imaging apparatus having an image data storing function.

Conventionally, a multi-function peripheral (hereinafter referred to as an MFP) has been developed and widely used. An example of such an MFP is an imaging device which has functions of printer, image scanner and facsimile devices. The MFP is can be connected with a personal computer or the like (hereinafter referred to as a PC), and functions as peripheral devices of the PC. Recently, there are suggested MFPs configured to use a removable external storage such as a compact flash®, smart media®, memory stick® and the like.

For example, when the MFP is used as the facsimile device, such an external storage may be used as a backup storage for storing facsimile data transmitted/received with the facsimile function. Generally, in facsimile devices, the data transmitted/received is made in accordance with a specific encoding format in accordance with a method known as an MH method, MR method, MMR method or the like. Therefore, the backup data stored in the external storage may also have such a specific (dedicated) format. Further, since the facsimile devices have been used as individual devices, data management system (i.e., file operating system) thereof is generally a specific system, which is not generally employed in the PCs or the like. Therefore, even if the backup data is stored in the external storage, the PCs cannot access or open the stored data due to difference of data format and/or file management system. In other words, such an external storage is used only an extension of the inner storage of the facsimile device, and users cannot enjoy the merit of the removable characteristic of such a storage.

For another example, the external storage connected to the MFP may function to provide image data for printing. That is, the printer function of the MFP may retrieves image data stored in the external storage, and print out corresponding images. Such an MFP is typically configured such that, when it functions as the image scanner, image data is created by reading an image formed on an original sheet and is stored in the external storage or an internal storage. Typically, an image formed on one sheet is read, and one image file is created and stored. Therefore, in such an MFP, if images formed on a plurality of sheets are scanned, corresponding number of image files are created regardless whether the plurality of images are scanned subsequently within one scanning job or discontinuously (i.e., at different times, dates). Such a configuration is very inconvenient since in order to view the contents of the image files, every image files should be opened, and further, file operation becomes very troublesome.

SUMMARY OF THE INVENTION

The present invention is advantageous in that an MFP is suggested, which enables a relatively easy handling of image files stored in the removable external storage.

According to an aspect of the invention, there is provided an imaging apparatus capable of storing image data in a storage, which is provided with an image obtaining system that obtains image data, and an image data writing system that stores the image data obtained by the image obtaining system in the storage. The imaging apparatus is configured such that a format to be used when the image data is stored is selected in accordance with the number of pages of images represented by the image data. Alternatively, the imaging apparatus may configured such that decision is made whether a format which is designated by a user to store the image is to be changed in accordance with the number of pages of images represented by the image data and the format as designated.

Optionally, the image data writing system is capable of storing the image data in a first format and in a second format, a file having the first format being capable of including a plurality of pages of images in one file.

Further optionally, the storage may include an electrically connectable removable storage.

Still optionally, the imaging apparatus may further include an N-in-1 image composing system that composes an N-in-1 image having reduced N pages of images in one page of image, the writing system storing selecting the format to be used in accordance with the number of pages of N-in-1 images.

In a particular case, the imaging apparatus may be configured to function as a facsimile machine. Further, the image data may include facsimile transmission and/or reception data. The storage may include a removable storage, said image data writing system stores the facsimile transmission and/or reception data in said removable storage in a versatile image format, which can be read by PCs or the like (not a dedicated facsimile format).

Further optionally, the image obtaining system may include a scanning system.

Still optionally, the storage may include an internal storage provided in the imaging apparatus and an external storage which is detachably coupled to the imaging apparatus, the image data writing system may store the image data in said internal storage and in said external storage in different formats.

According to another aspect of the invention, there is provided an imaging apparatus, which scans an original image to obtain image data having predetermined format. The imaging apparatus is further provided with a connecting system capable of detachably holding an external storage, the connecting system capable of transmitting image data to the external storage, a file format selecting system that selects a file format to be employed when the data is stored in the external storage, a data conversion system that converts the image data into converted data having a predetermined file format, and a controlling system that changes the file format to an alternative file format if the number of pages of the image data satisfies a predetermined condition, and controls the data conversion system to convert the image data in accordance with the file format selected by the file format selecting system or the alternative file format when the image data is stored in the external storage through the connecting system.

Optionally, the controlling system controls the data conversion system to convert a first page of the image data in accordance with the format selected by said file format selecting system.

Further optionally, the controlling system may control the data conversion system to convert the image data in accordance with a specific format if the image data includes a plurality of pages.

In a particular case, the imaging apparatus may further include a communication device capable of communicating with another communication device through a communication line. The imaging apparatus may be capable of storing the image data transmitted/received in the communication with another communication device. The imaging apparatus may further include a storing system that stores the image data. The storing system stores the image data in a dedicated facsimile transmission/reception format if the external storage is not connected to said imaging apparatus or if the external storage is connected to said imaging apparatus but does not have sufficient remaining capacity.

According to a further aspect of the invention, there is provided an image data processing apparatus, which is provided with an original reading unit that scans an image on an original to generate first image data having a predetermined data format, a file conversion unit capable of converting the first image data having the predetermined data format into a file having a predetermined file format, a storage capable of storing the converted file that is converted by the file conversion unit, and a storing system that stores first image data newly generated by the original reading unit in the storage by adding the newly generated first image data at the end of a file having the predetermined file format and stored in the storage as a succeeding page.

Optionally, the storage is capable of storing image data having the predetermined data format.

Further optionally, the image data processing apparatus may include a file designating system which is used to designate a specific file from among a plurality of files stored in the storage. If the specific file is designated by the file designating system, the storing system adds the newly generated first image data at the end of the specific file designated by the file designating system as a succeeding page.

Furthermore, the original reading unit is capable of generating image data having the predetermined data format and representing an area of 1/N of one page area, N being an integer, and the image data processing apparatus further includes an N-in-1 image data composing system that combines a plurality of pieces of image data each representing an area of 1/N times of one page area to compose an N-in-1 type second image data.

In a particular case, the image data processing apparatus may further include an image data name inputting system through which a name of the first image data generated by the original reading unit can be input, and a file name detection system that detects names of files stored in the storage. If the file name detection system detects a file having the same name as a name input through the image data name inputting system, the storing system adds the first image data at the end of the file having the same name as a succeeding page.

Still optionally, the image data processing apparatus may include an external storage receiving unit to which an external storage can be detachably coupled, the storage including the external storage which can be coupled to the external storage receiving unit.

BRIEF DESCRIPTION OF THE ACCOMPANYING DRAWINGS

Figure 12A:
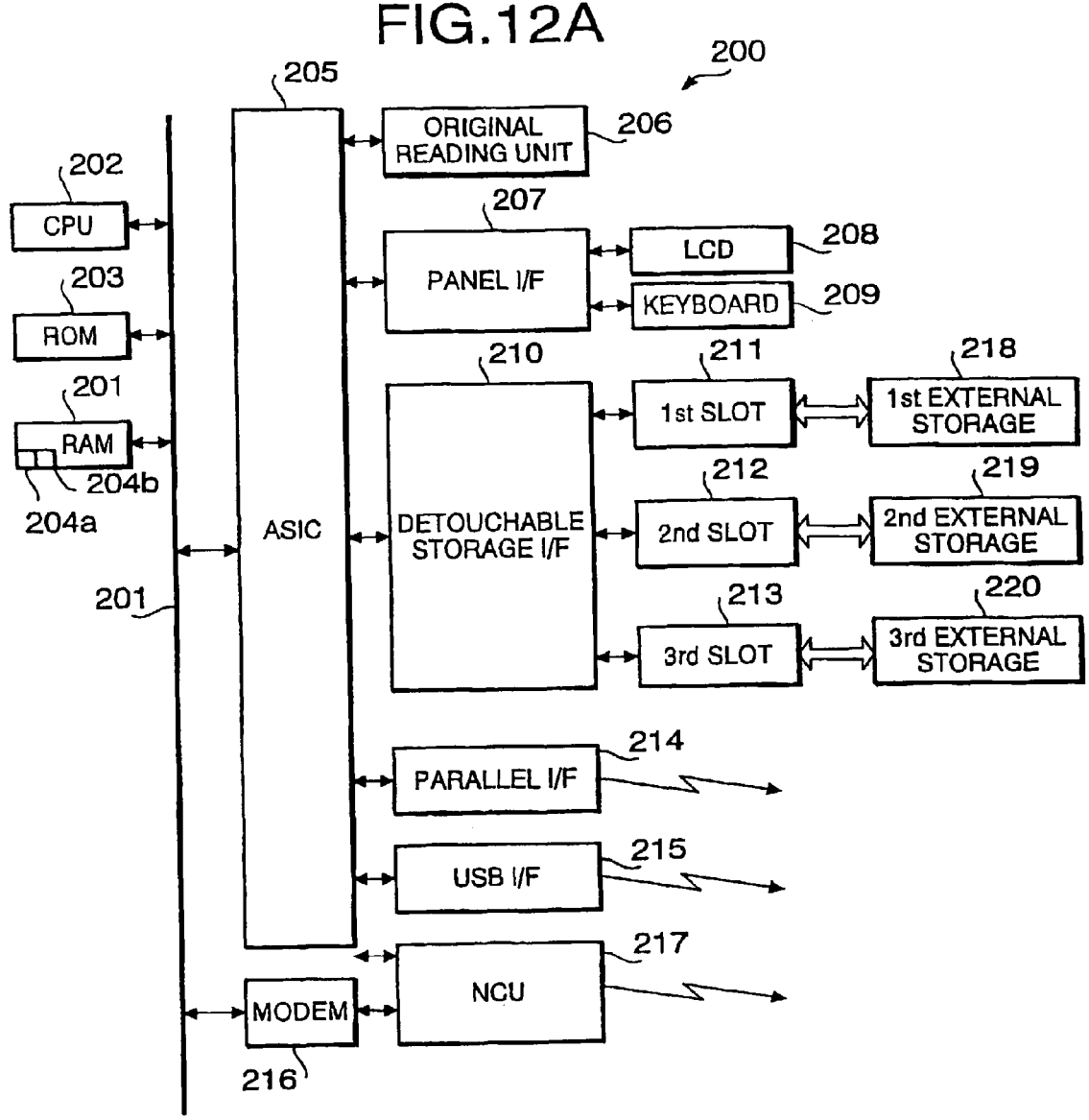
FIG. 12A is a block diagram schematically showing a configuration of an MFP according to a second embodiment.
Figure 12B:
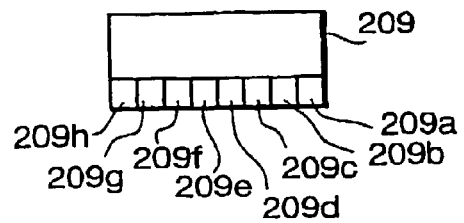
Figure 13:
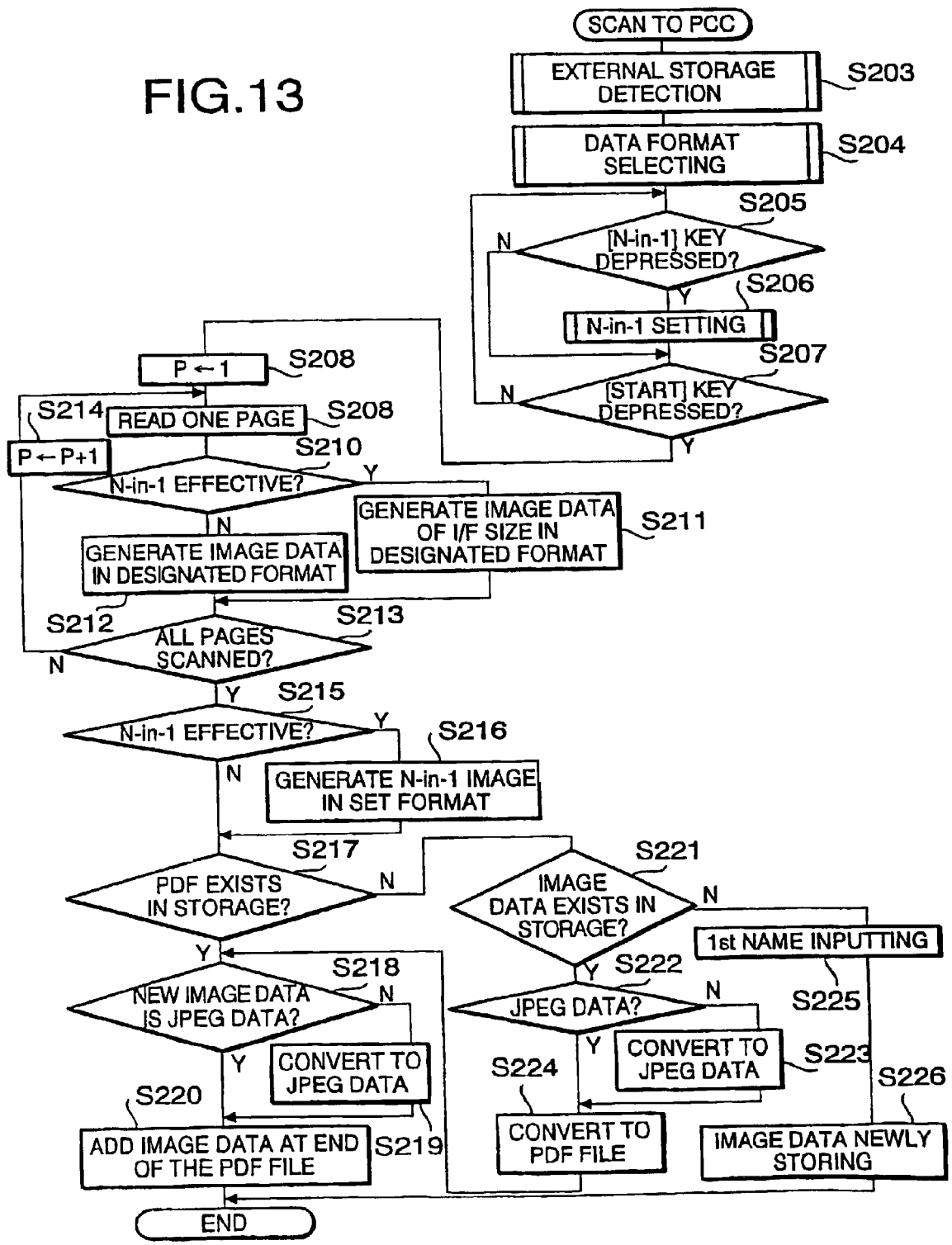
Figure 14:
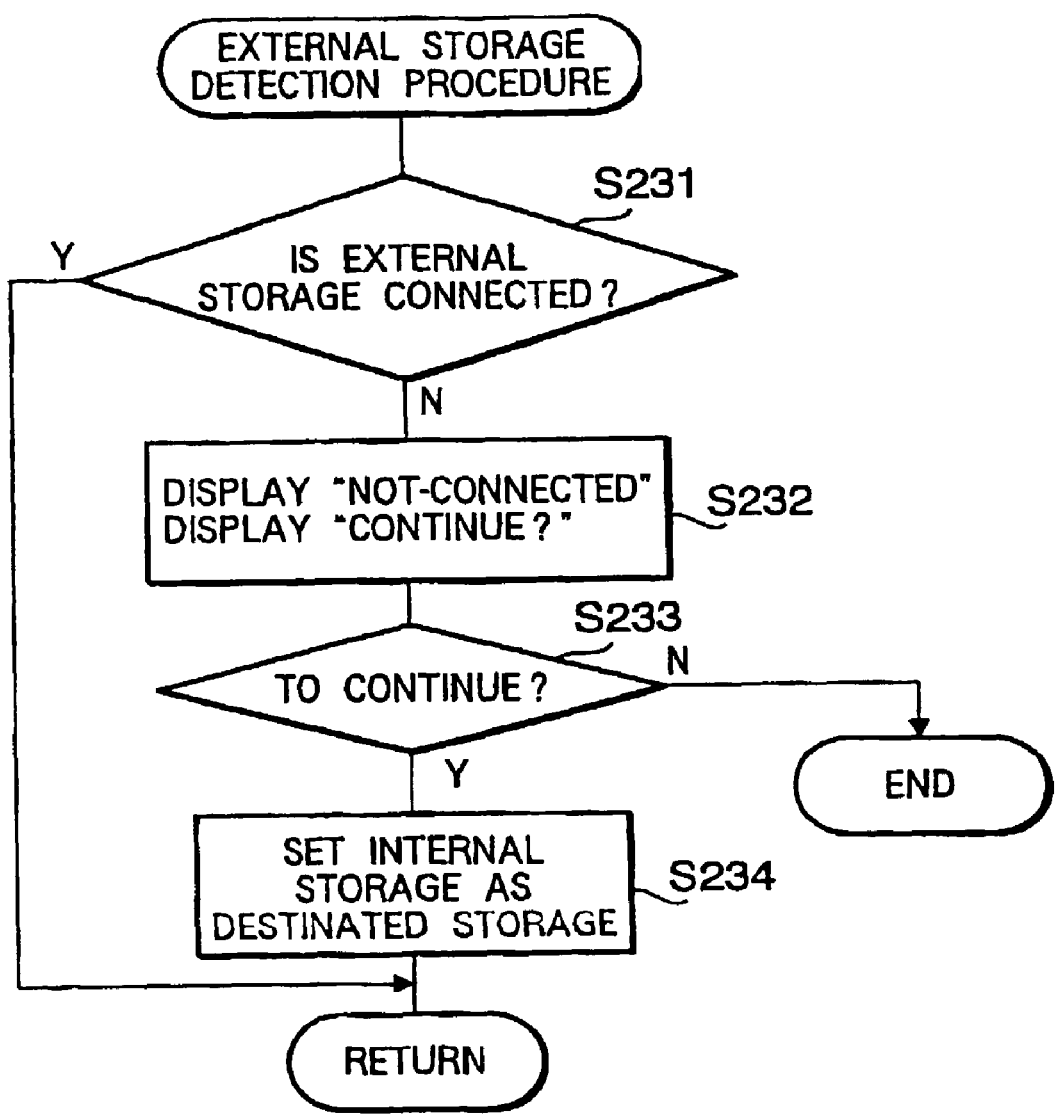
Figure 15:
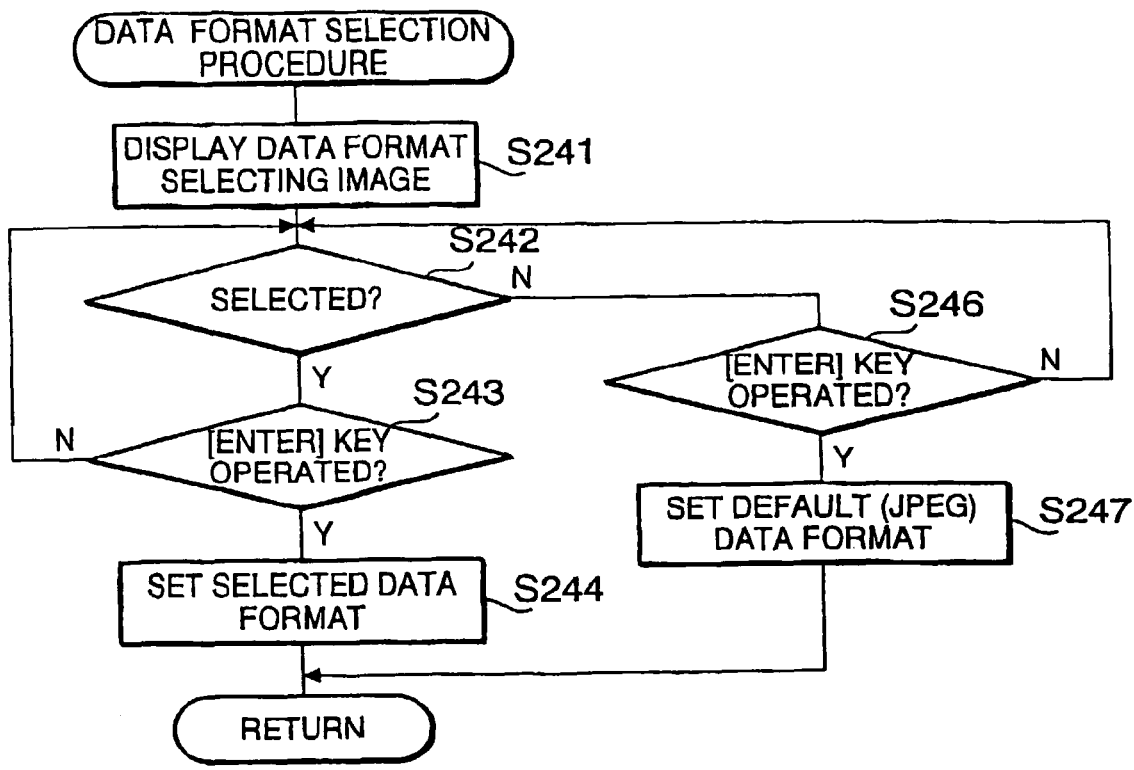
Figure 16:
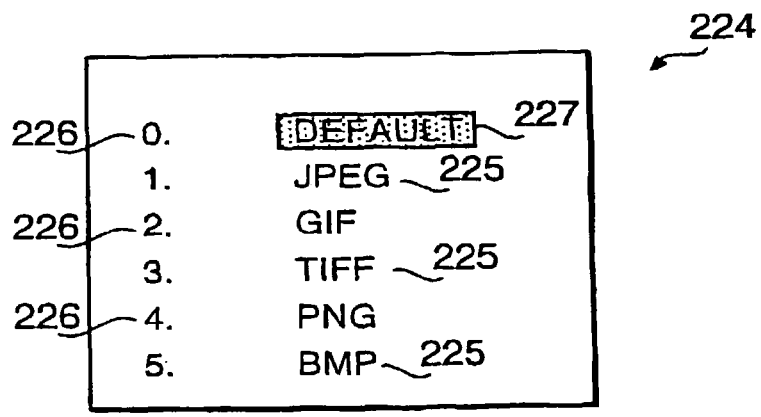
Figure 17:
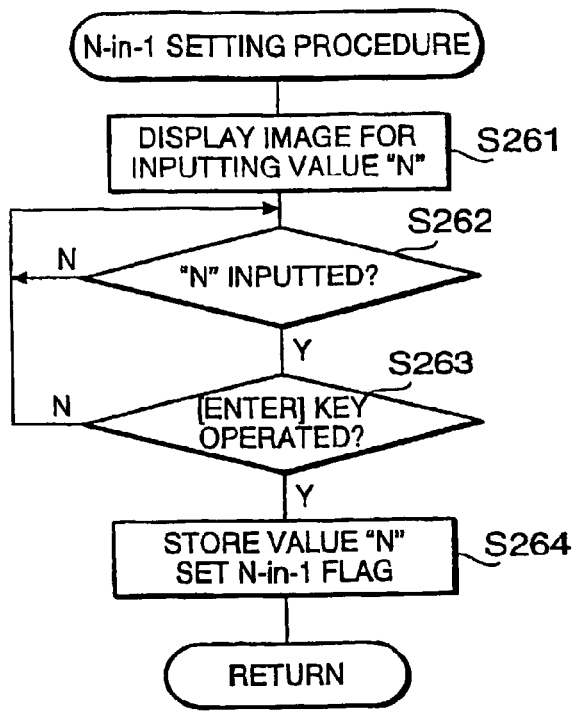
Figure 18A:
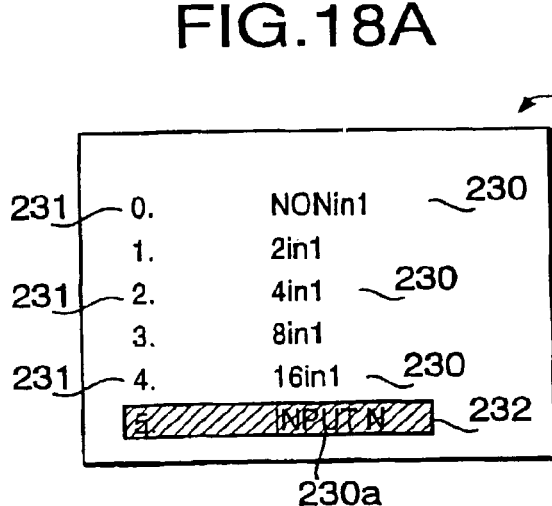
Figure 18B:
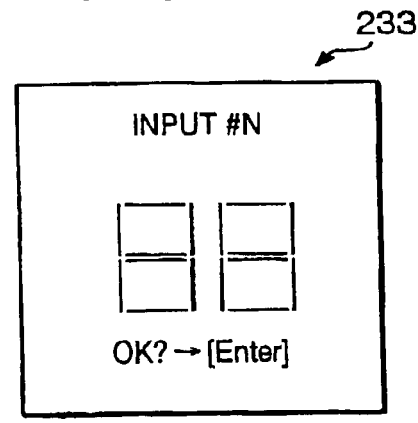
Figure 19:
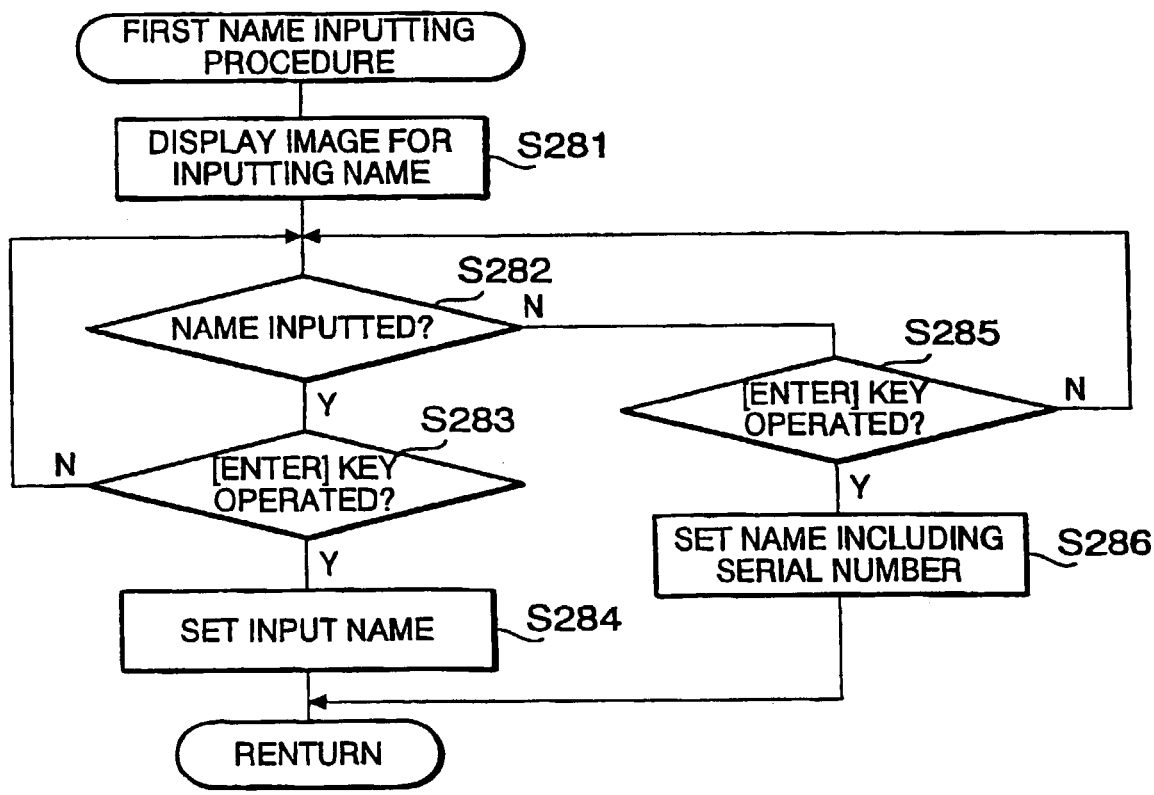
Figure 20:
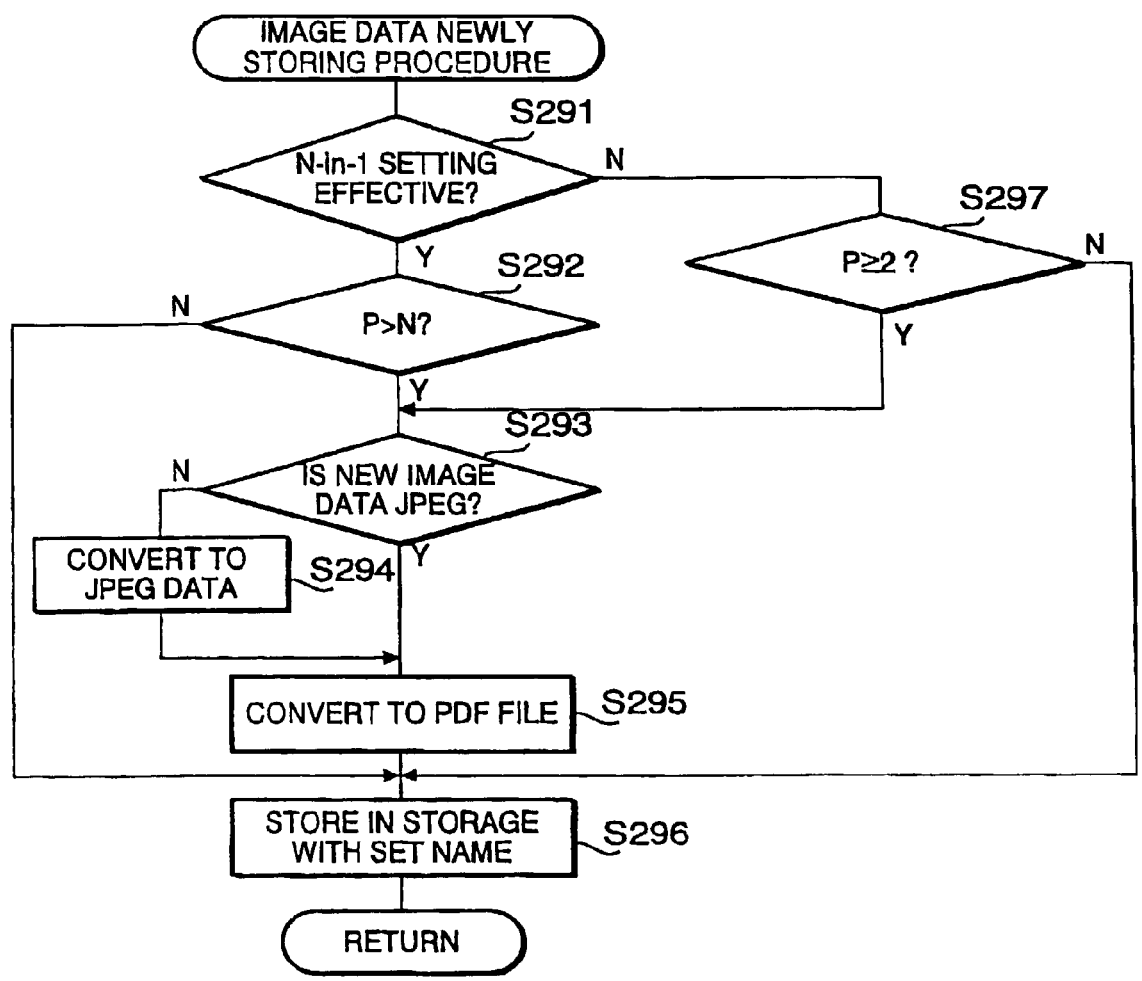
Figure 21:
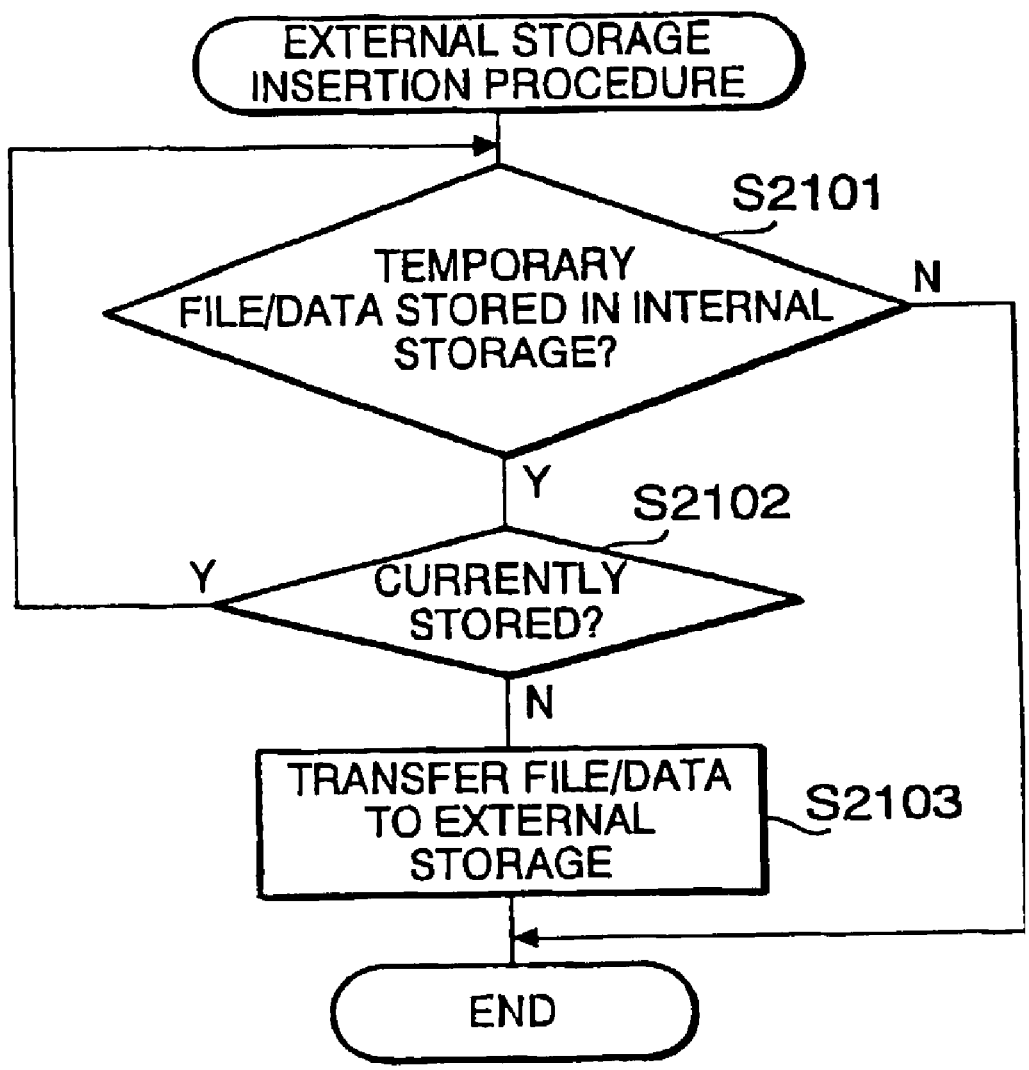
Figure 22:
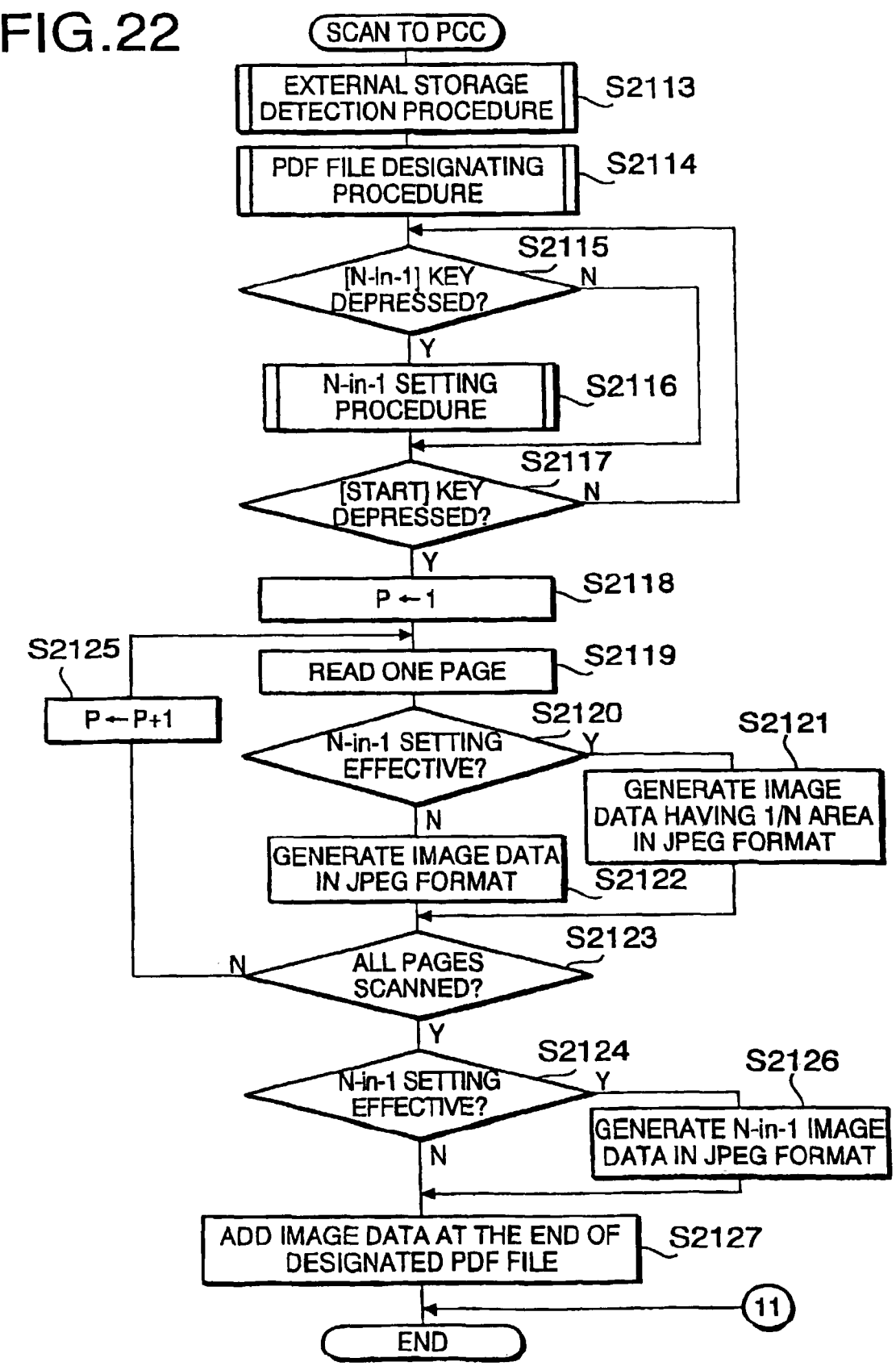
Figure 23:
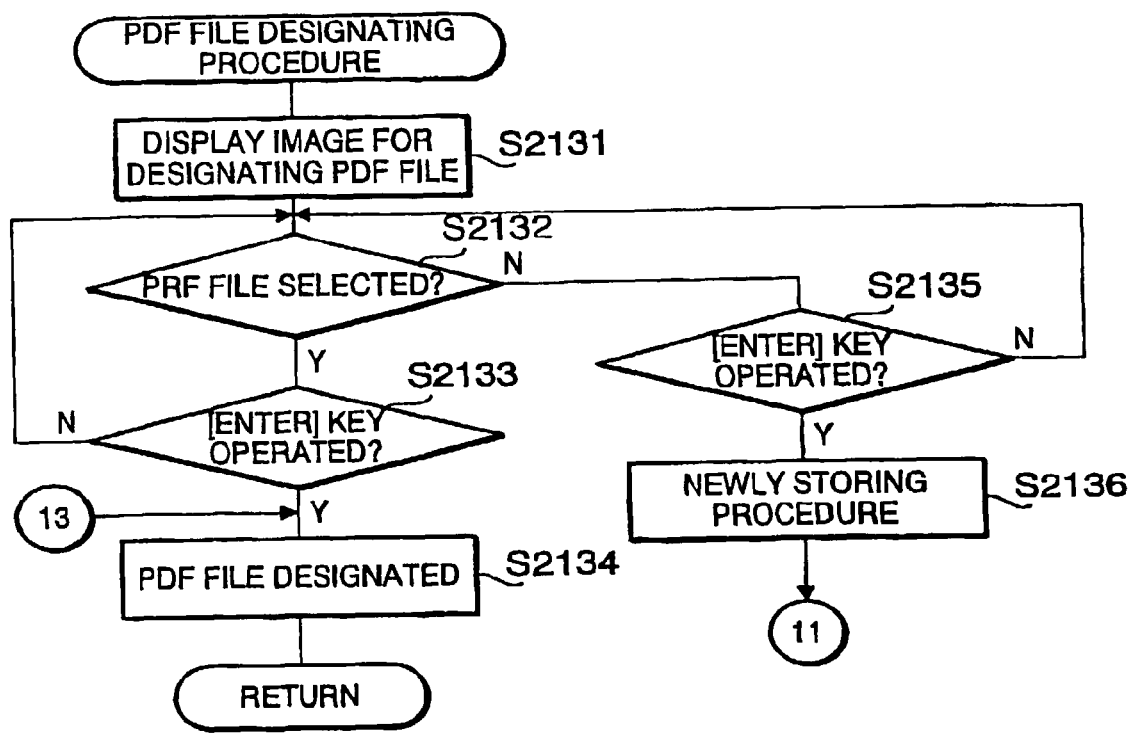
Figure 24:
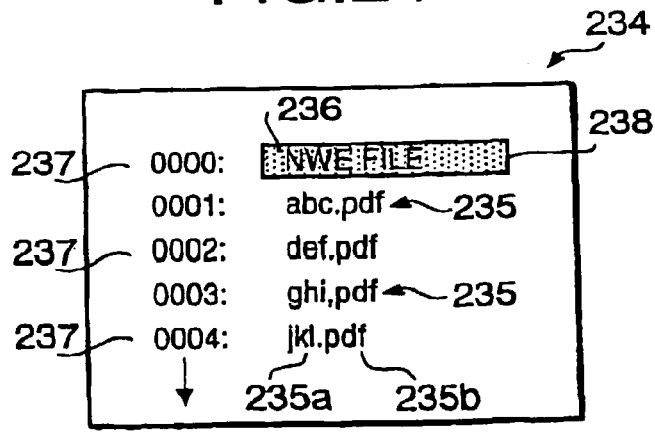
Figure 25:
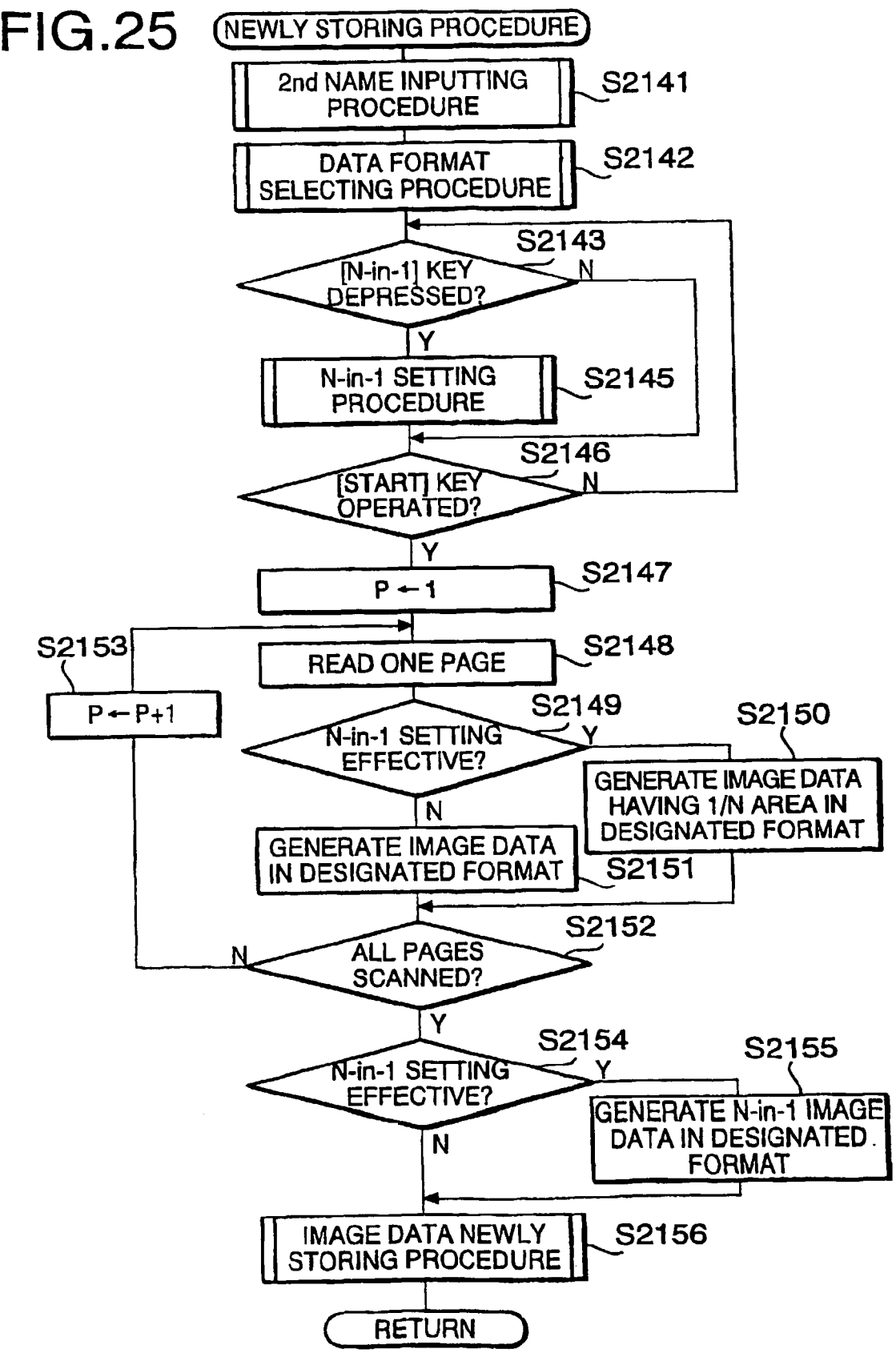
Figure 26:
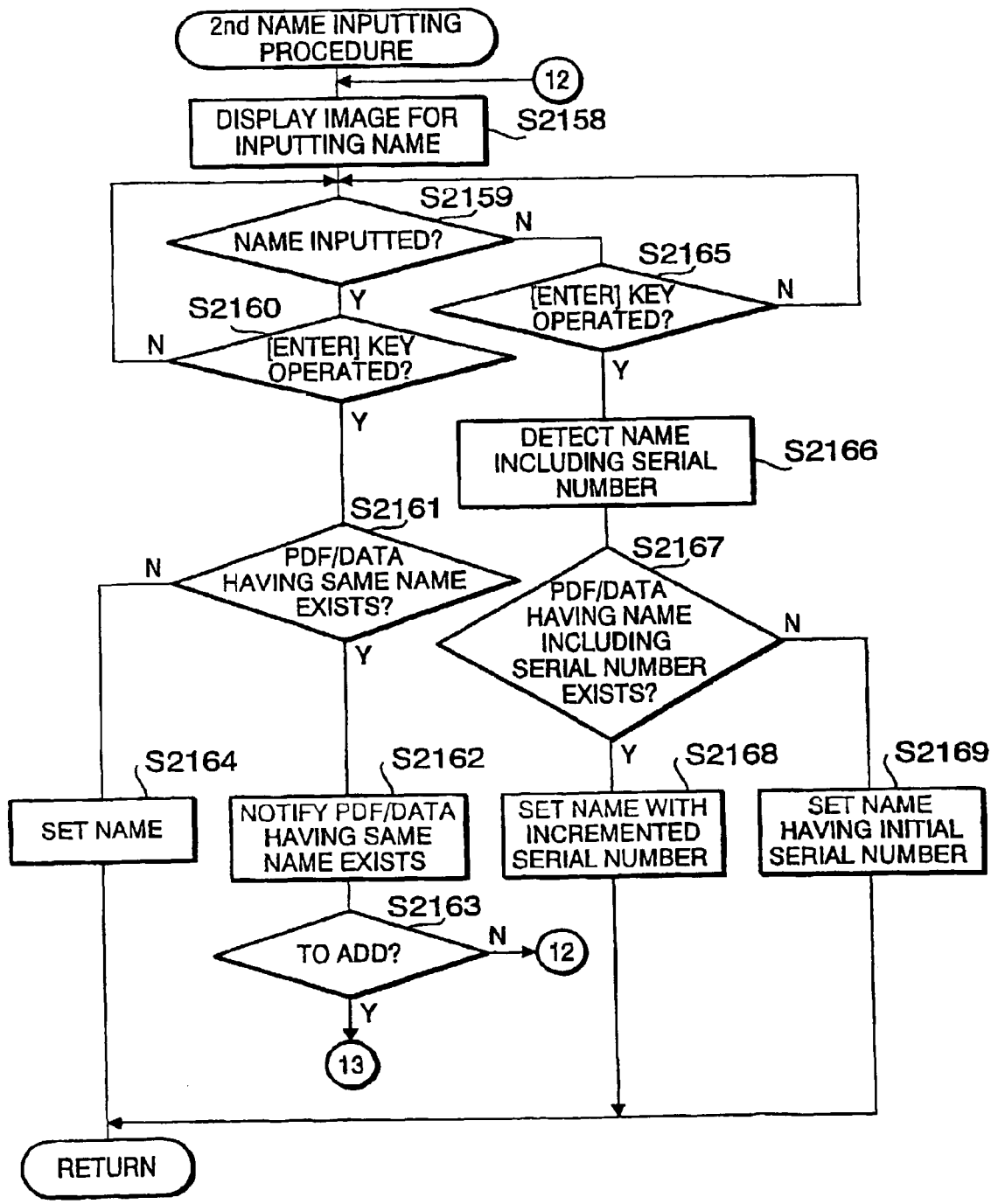
Figure 27:
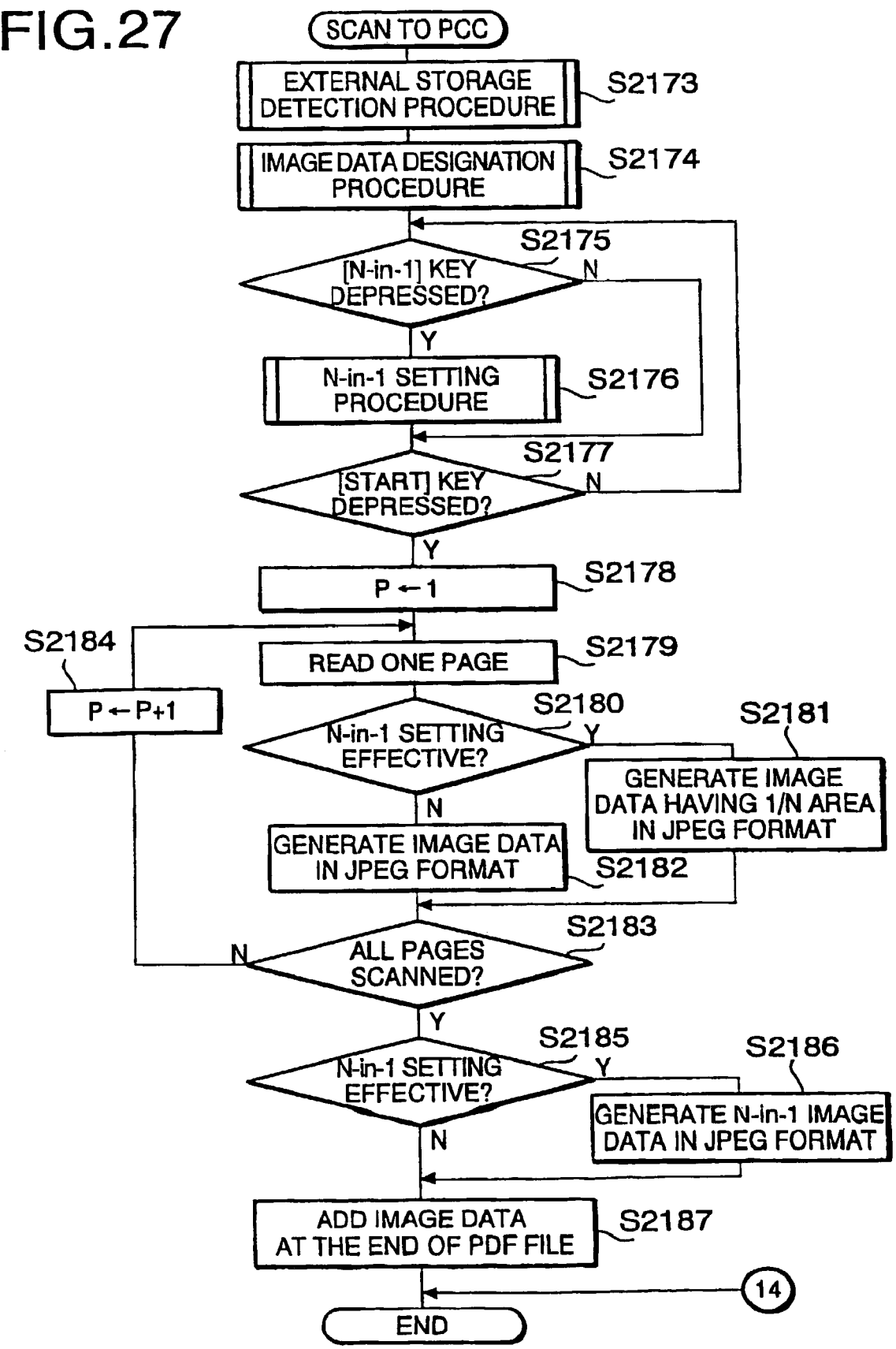
Figure 28:
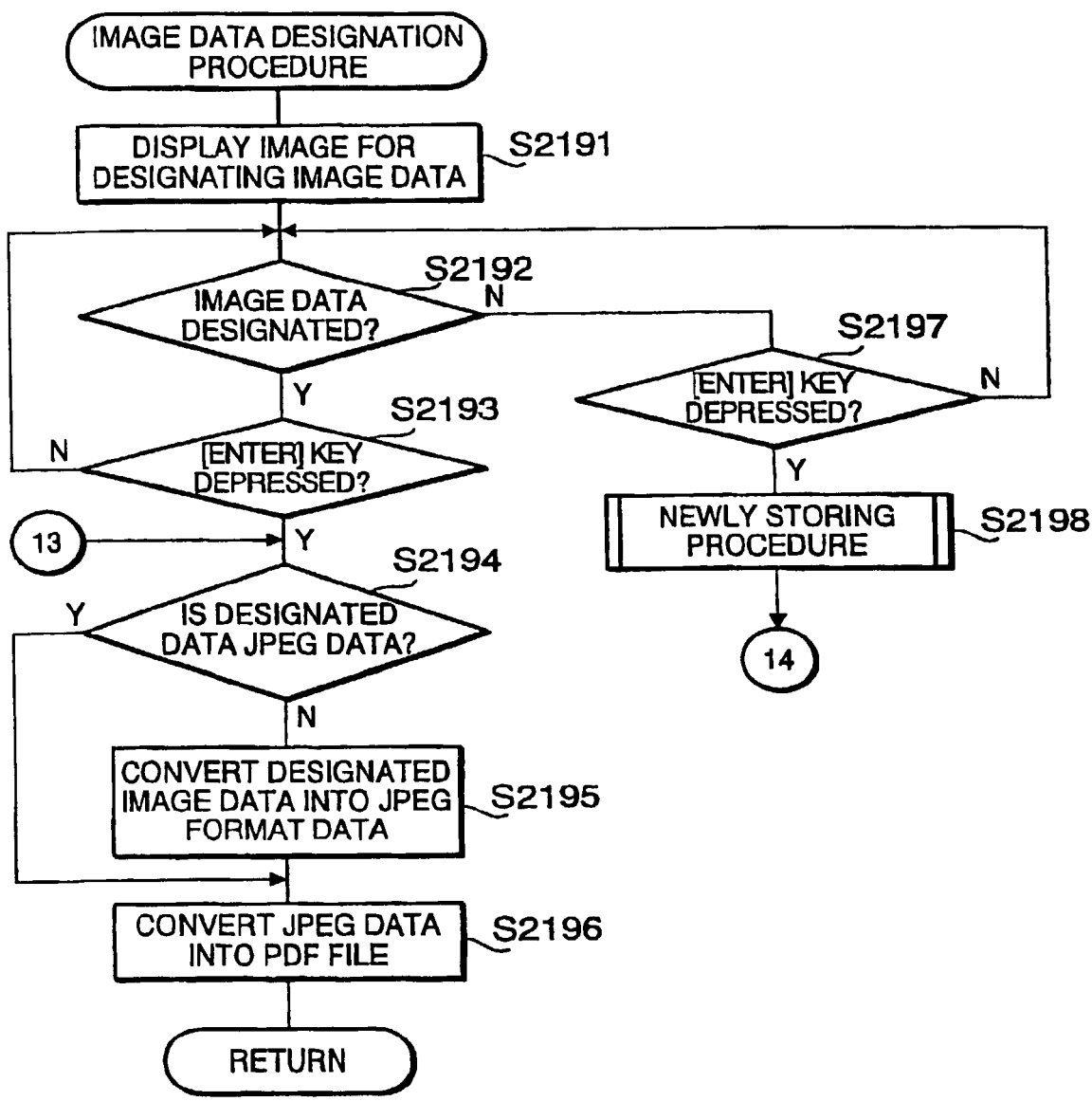
Figure 29:
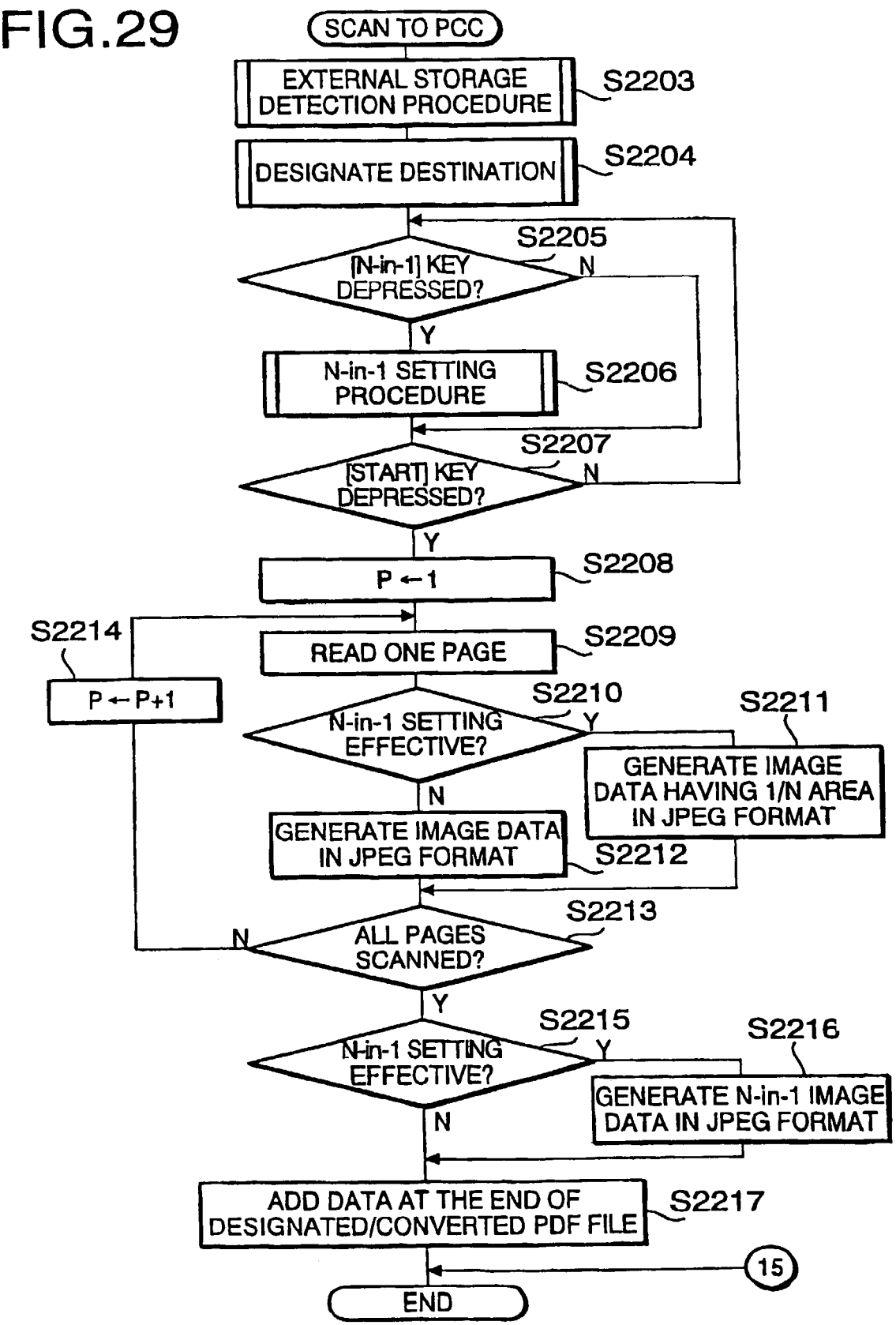
Figure 30:
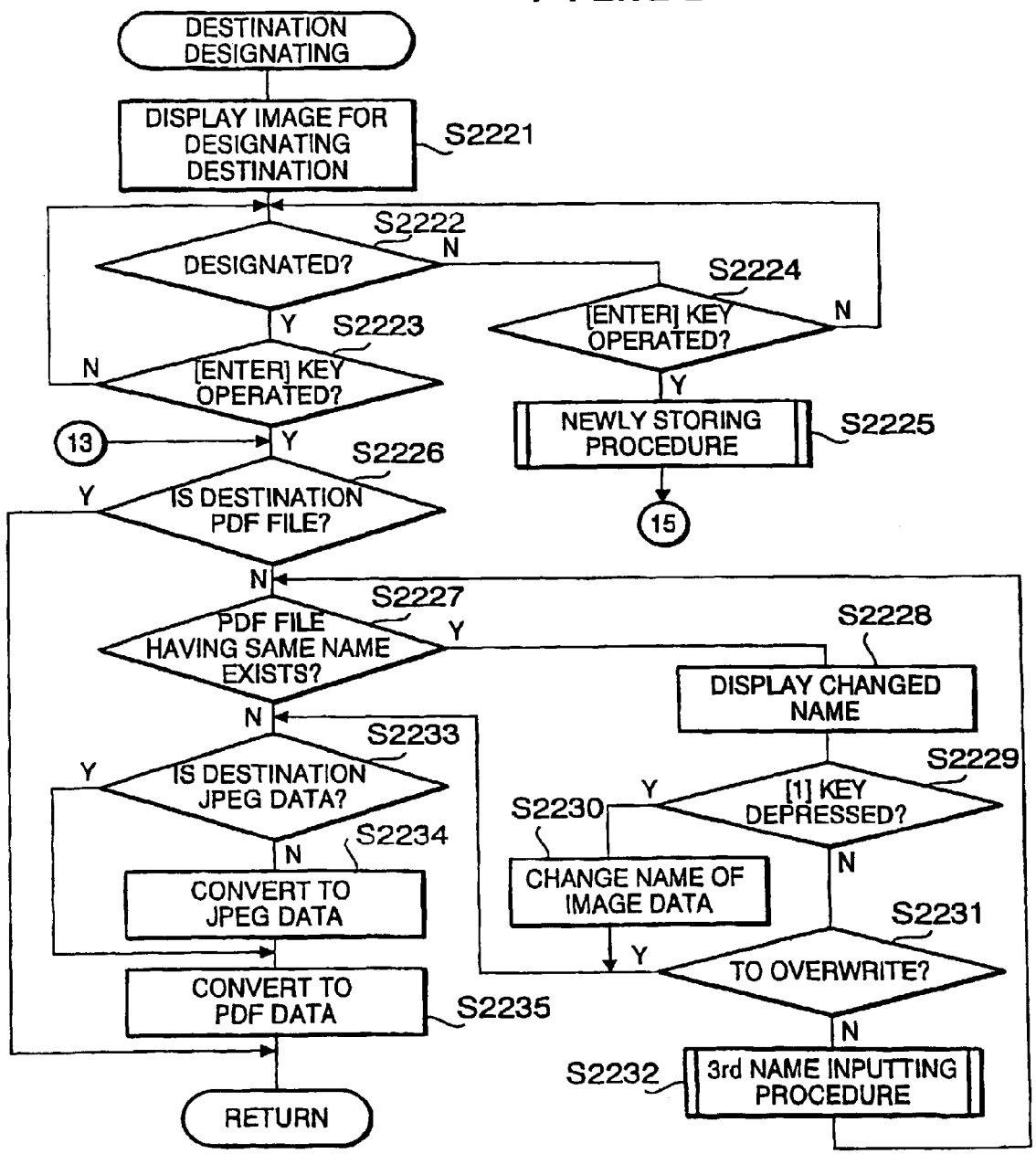
Figure 31:
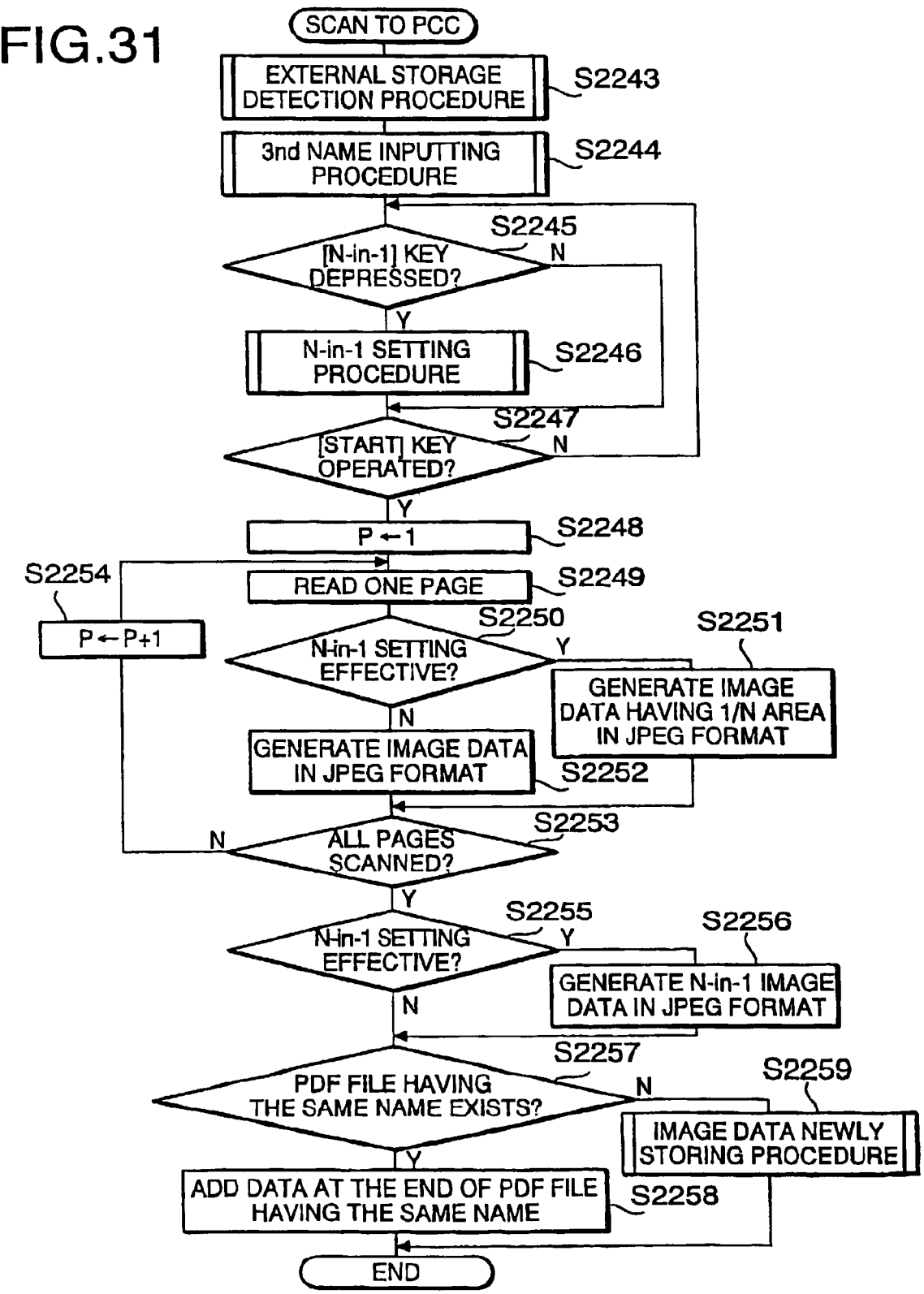
Figure 32:
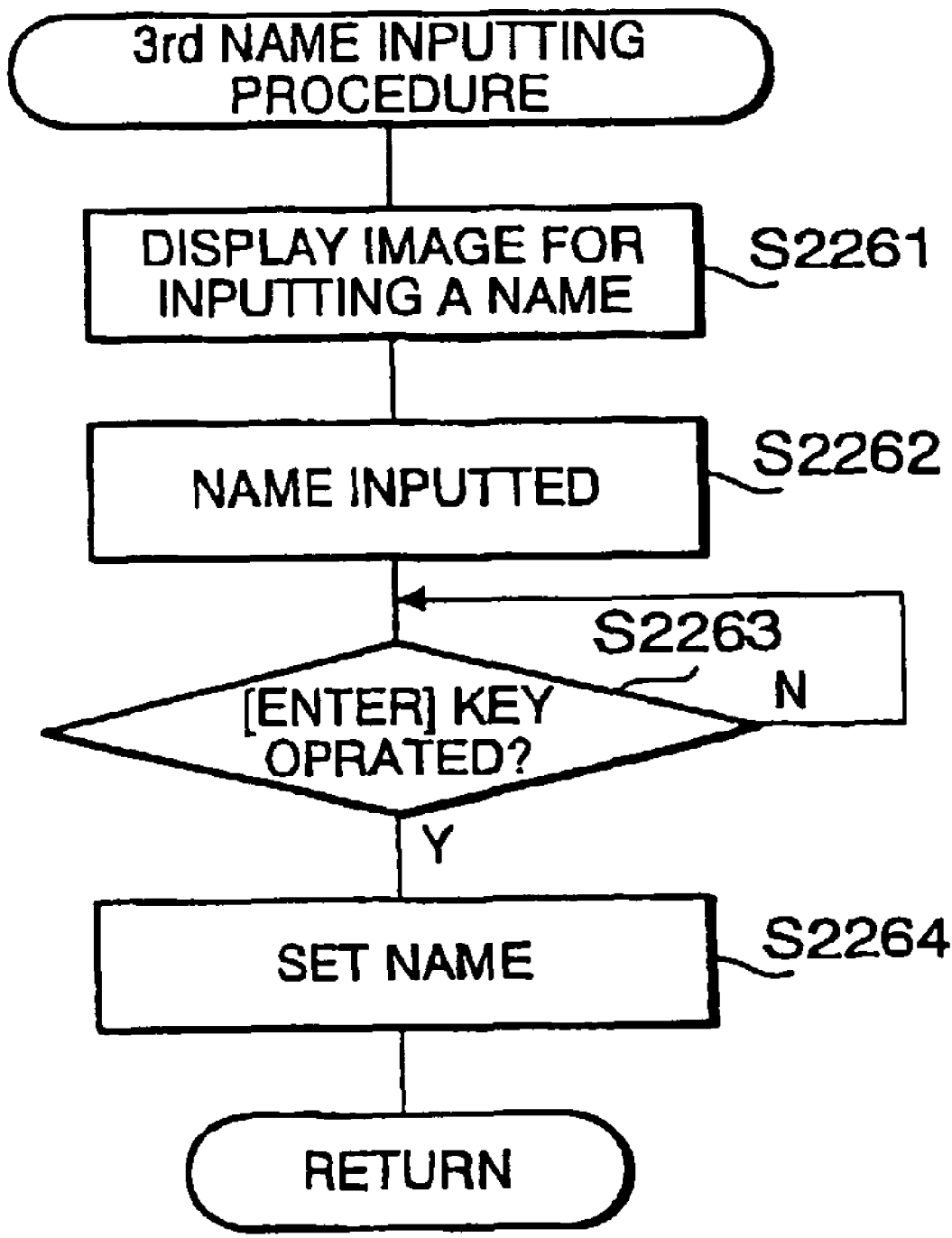
Figure 33:
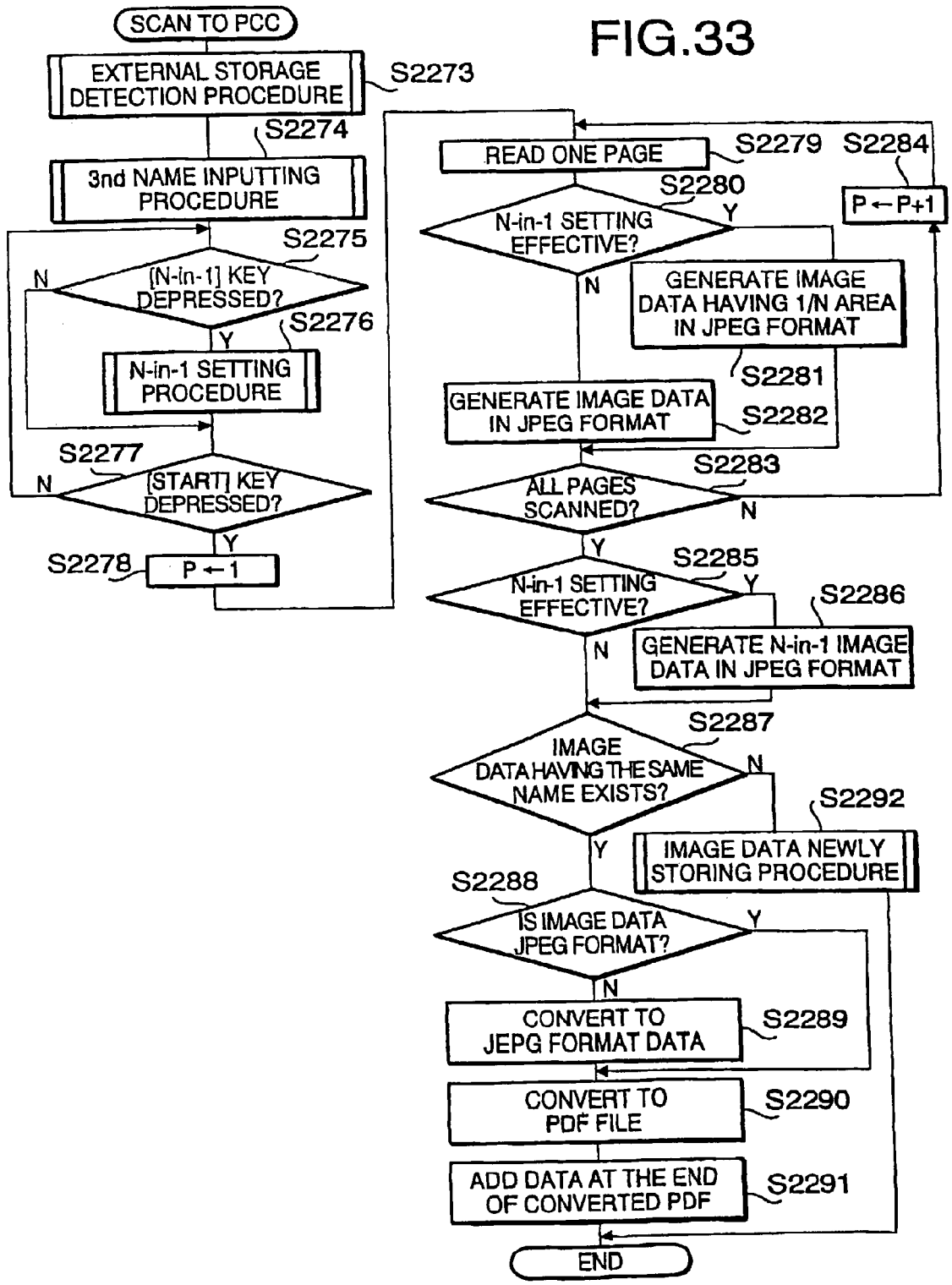
Figure 34:
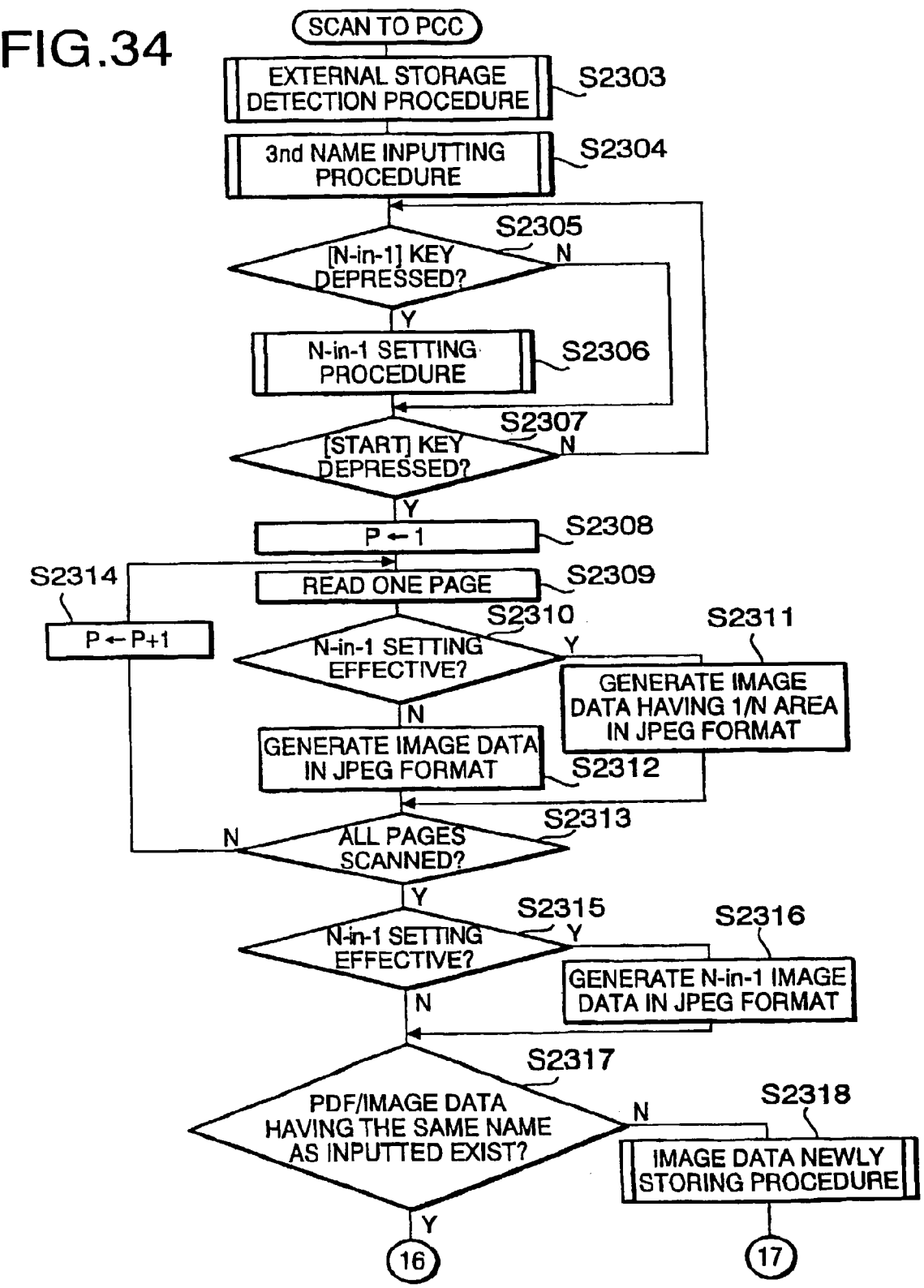
Figure 35:
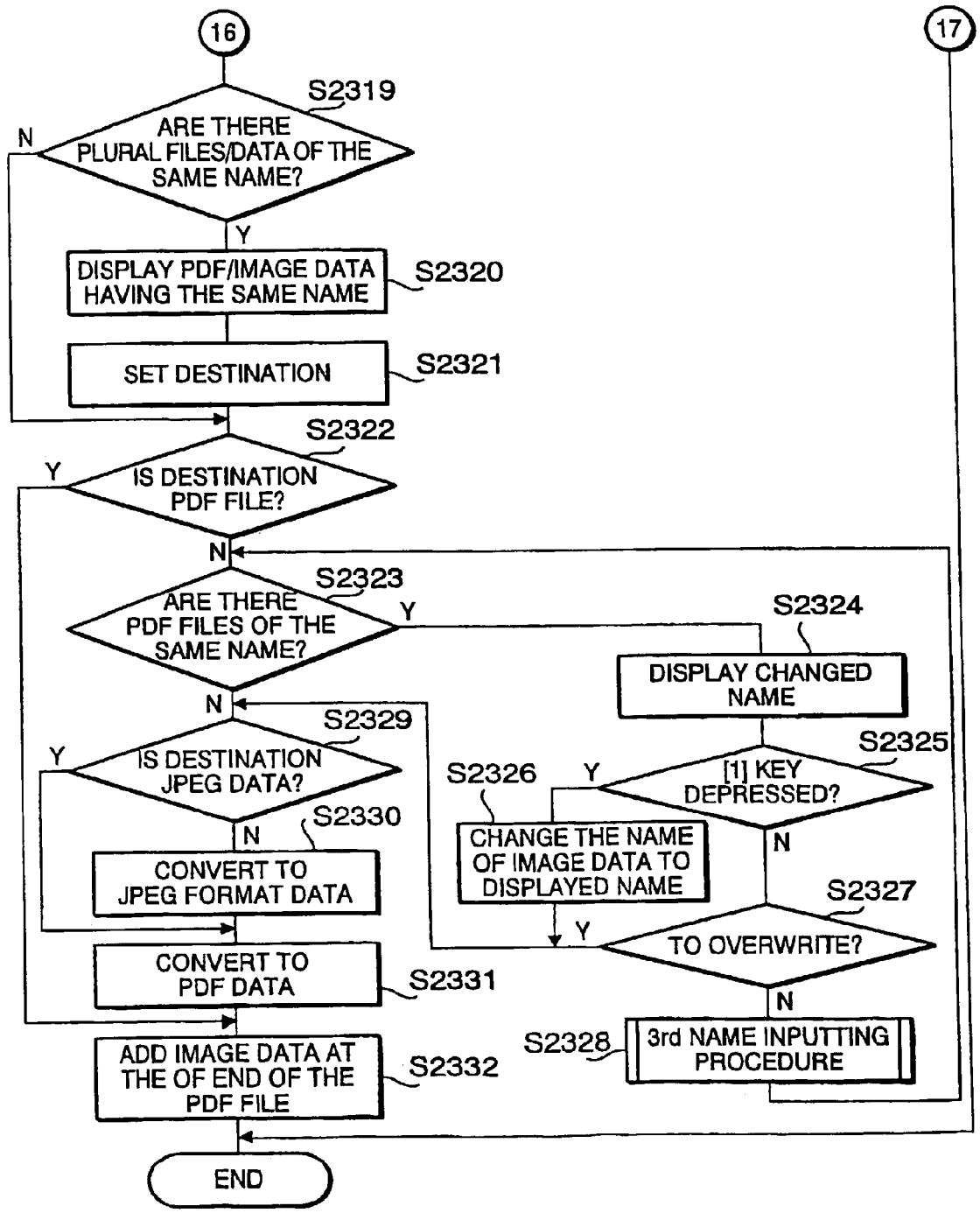
Figure 36A:
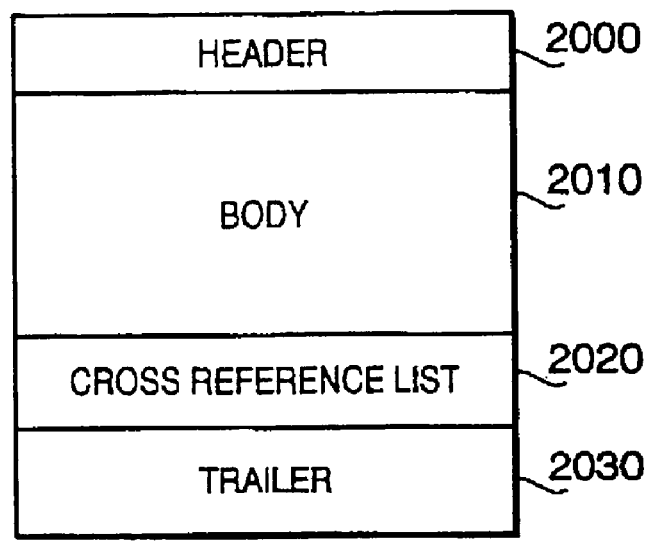
Figure 36B:
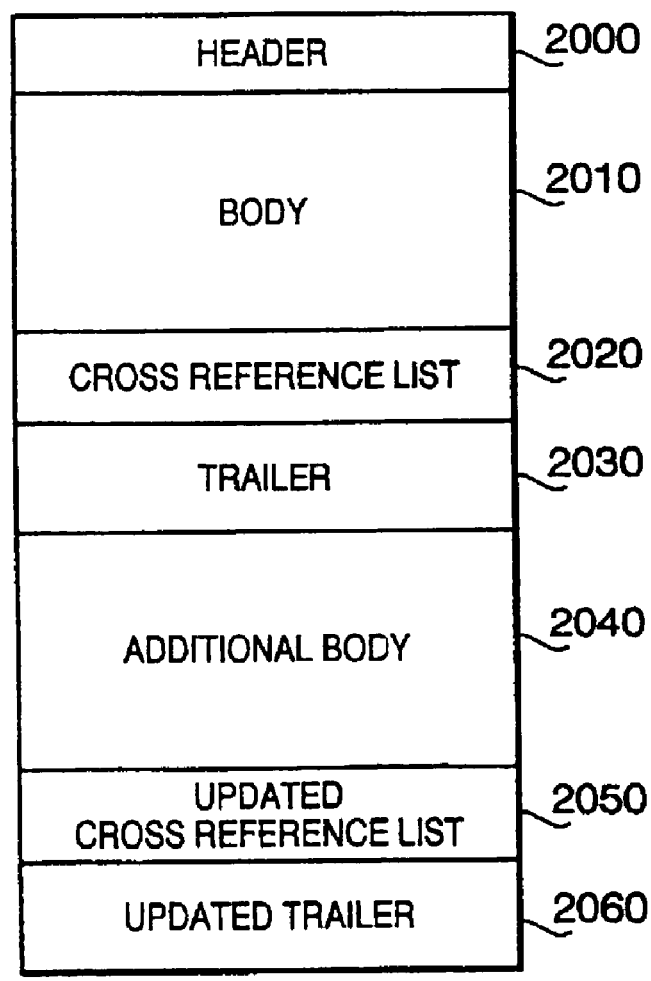

FIG. 12B schematically shows a structure of a keyboard of the MFP shown in FIG. 12A;

FIG. 13 is a flowchart illustrating a SCAN TO PCC procedure of the MFP according to the second embodiment;

FIG. 14 is a flowchart illustrating an EXTERNAL STORAGE DETECTION procedure;

FIG. 15 shows a flowchart illustrating a FORMAT SELECTION procedure called in FIG. 13;

FIG. 16 shows a screen for selecting a data format;

FIG. 17 is a flowchart illustrating an N-IN-1 SETTING procedure;

FIGS. 18A and 18B show screen images for setting the number N of the N-in-1 setting;

FIG. 19 is a flowchart illustrating a FIRST NAME INPUTTING procedure;

FIG. 20 is a flowchart illustrating an IMAGE DATA NEWLY STORING procedure;

FIG. 21 is a flowchart illustrating an EXTERNAL STORAGE INSERTING procedure;

FIG. 22 is a flowchart illustrating the SCAN TO PCC procedure according to the third embodiment;

FIG. 23 is a flowchart illustrating a PDF DESIGNATING procedure;

FIG. 24 shows a screen image for designating a PDF file;

FIG. 25 is a flowchart illustrating IMAGE DATA NEWLY STORING procedure;

FIG. 26 is a flowchart illustrating a SECOND NAME INPUTTING procedure;

FIG. 27 is a flowchart illustrating the SCAN TO PCC procedure according to the fourth embodiment;

FIG. 28 shows a flowchart illustrating an IMAGE DATA DESIGNATING procedure which is called in the SCAN TO PCC procedure shown in FIG. 27;

FIG. 29 is a flowchart illustrating the SCAN TO PCC procedure according to the fifth embodiment;

FIG. 30 shows a flowchart illustrating an OBJECTIVE FILE DESIGNATING procedure which is called in the SCAN TO PCC procedure shown in FIG. 29;

FIG. 31 shows a flowchart illustrating the SCAN TO PCC procedure according to the sixth embodiment;

FIG. 32 is a flowchart illustrating a THIRD NAME INPUTTING procedure;

FIG. 33 shows a flowchart illustrating the SCAN TO PCC procedure according to the seventh embodiment;

FIGS. 34 and 35 show a flowchart illustrating the SCAN TO PCC procedure according to the eighth embodiment;

FIGS. 36A and 36B show a data structure of a PDF file.

DESCRIPTION OF THE EMBODIMENTS

Hereinafter, multi-function peripherals according to embodiments of the invention will be described with reference to the accompanying drawings.

Figure 1:
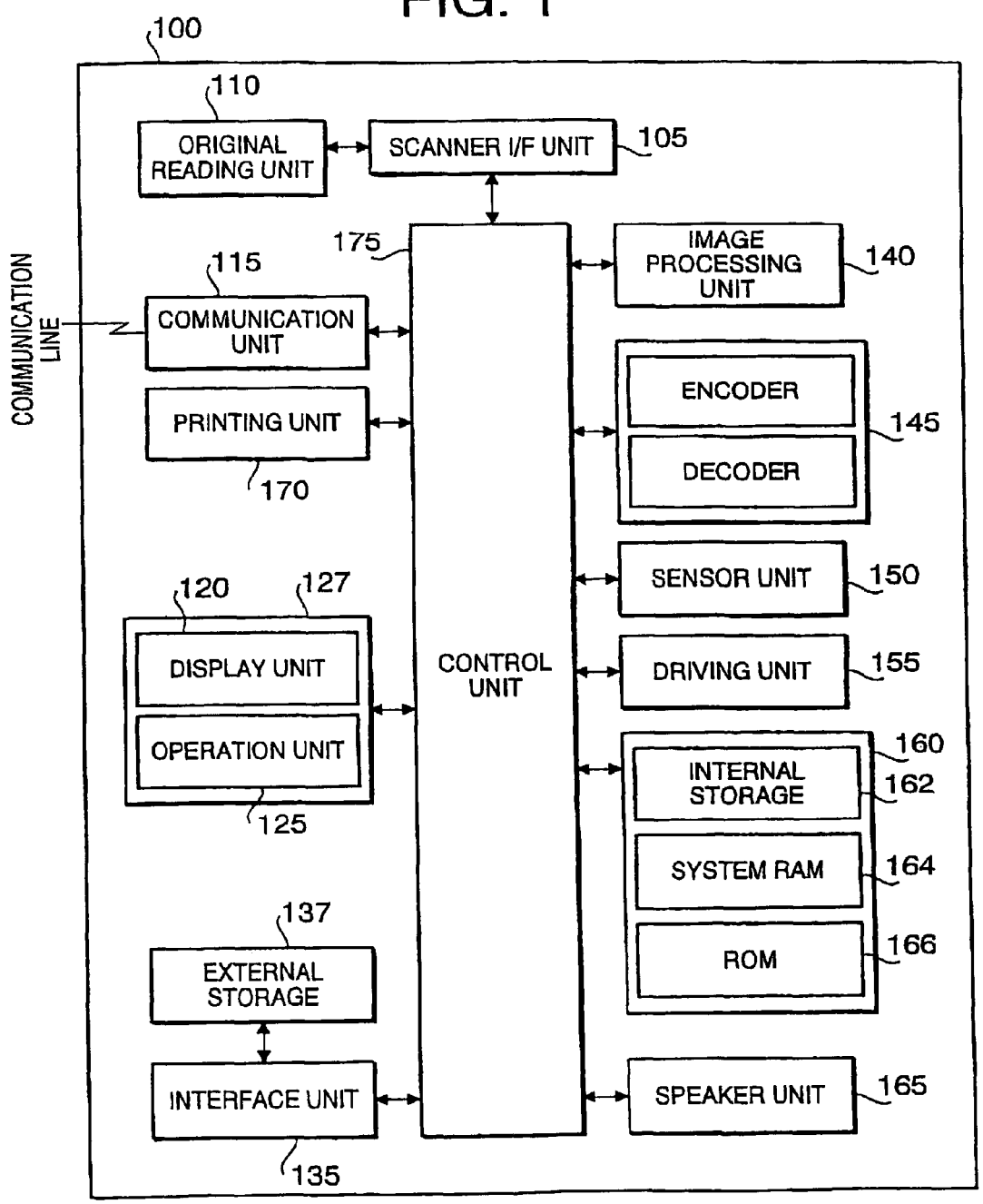
FIG. 1 is a block diagram showing a configuration of an MFP (multi-function peripheral) according to a first embodiment of the invention.
Figure 2:
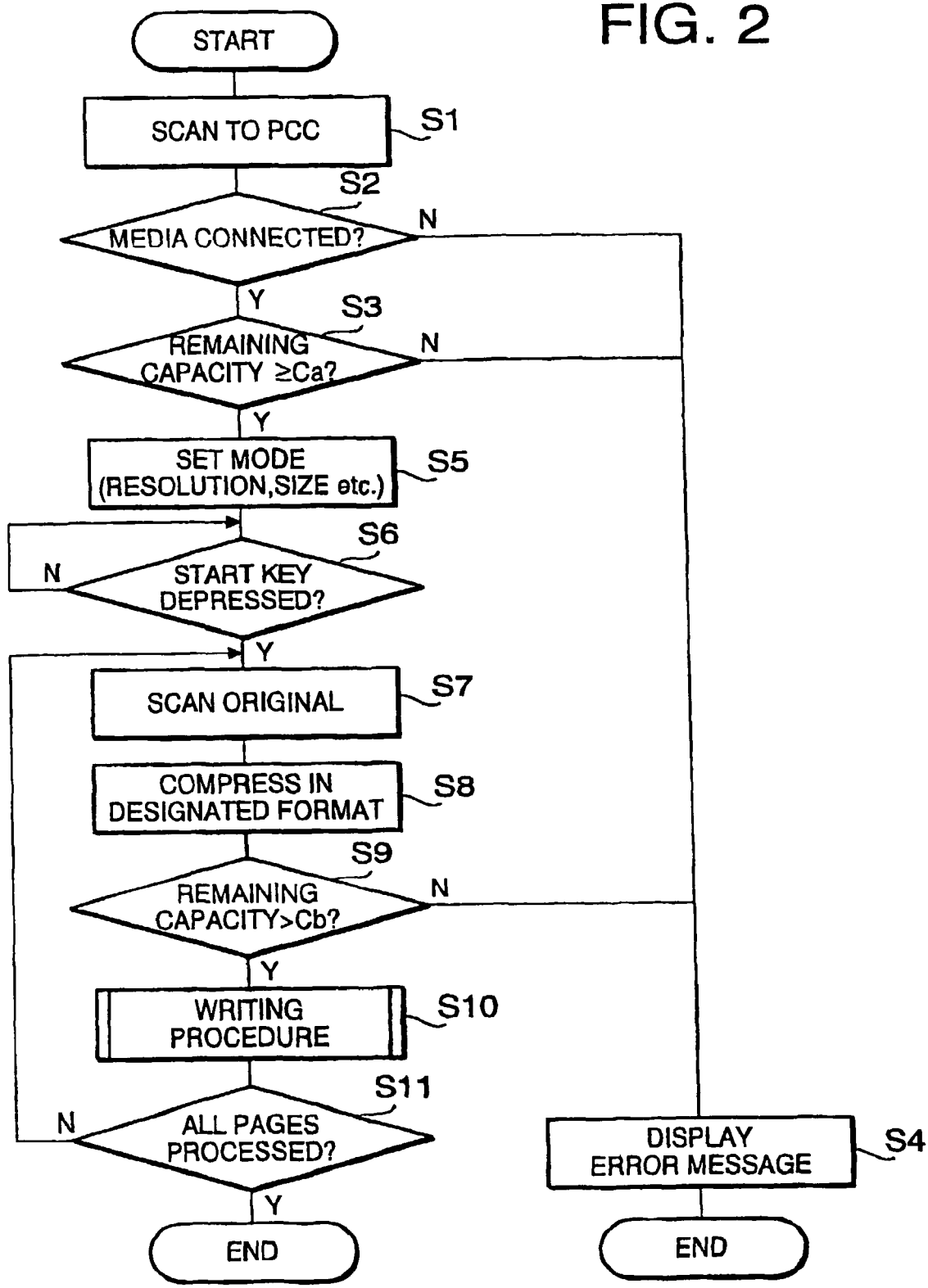
FIG. 2 is a flowchart illustrating a SCANNING procedure executed by the MFP shown in FIG. 1.

FIG. 1 is a block diagram showing a configuration of an MFP (multi-function peripheral) 100 according to a first embodiment of the invention. FIG. 2 is a flowchart illustrating a SCANNING procedure executed by the MFP shown in FIG. 1.

The MFP 100 includes a control unit 175 which controls the entire operation of the MFP 100. The MFP 100 includes an original reading unit 110 which reads an image on an original via a scanner interface unit 105, a communication unit 115 which communicates with an external device through a communication line, a display unit 120 which displays various information for a user, an operation unit 125 to be operated by the user, an interface unit 135 which transmits data to an external storage medium 137, an image processing unit 140 that processes the image data read by the original reading unit 110 and converts the same into converted data having a predetermined format, a CODEC 145 which encodes/decodes image data received through the communication line and/or scanned by the original reading unit 110, a sensor unit 150 that detects an operation condition of the MFP 100, a driving unit 155 including a motor and the like for driving the MFP 100, a storage unit 160 which stores the data of the original, a speaker unit 165 that outputs a sound signal as audible sound, a printing unit 170 which prints out data read by the original reading unit 110 and/or transmitted/received data. The control unit 175 is connected with the above-described various units.

The storage unit 160 includes an image memory which functions as an internal storage 162 for storing received image data having the predetermined format, scanned data and the like, and a system RAM (Random Access Memory) 164 storing parameters defining a performance of the MFP 100, and a ROM (Read Only Memory) 166 defining a specification of the MFP 100.

The internal storage 162 stores image data, facsimile numbers of customers (receiving stations) and the like in respective folders. The image data is mainly stored in the folders having names of the customers. The facsimile numbers of the customers are the numbers assigned to abbreviated dialing keys such as one-touch keys or speed-dialing keys.

The interface unit 135 can be connected with a removable external storage 137 and read/write image data or the like from/to the external storage 137. Examples of the external storage 137 are floppy disk®, compact flash®, smart media® and the like.

An operation unit 125 and a display unit 120 are provided on the operation panel 27 to allow a user to input commands and the like. The operation unit 125 includes function keys, ten keys, one-touch keys, speed dialing key, start key and the like. The ten keys include depression switches for inputting numbers 0-9, respectively, and mainly used for inputting facsimile numbers. To the one touch keys and the speed dialing keys, abbreviated numbers are assigned. The display unit 120 includes an LCD (liquid crystal display).

The function keys are the depression switches for assigning the abbreviated numbers to the one-touch keys or the speed dialing keys.

The one-touch keys are, for example, depression switches having numbers 0-9, respectively. To each of the one-touch keys, a facsimile number can be assigned. According to the first embodiment, by simply depressing a one-touch key, the facsimile number assigned to the key can be selected.

The speed dialing key is used with ten-keys. A combination of the speed dialing key and two-digit number input through the ten-keys, a facsimile number is designated. With use of the speed dialing keys, facsimile numbers of the customers can be assigned to abbreviated numbers 10-99, respectively.

The control unit 175 controls operations of the MFP 100. The control by the control unit 175 is executed in accordance with control programs. According to the embodiment, the control programs are stored in a system RAM 164 and/or a ROM 166 of the memory unit 160. The control unit 175 is capable of executing a various programs depending on operation status of the MFP 100.

The control programs include, for example, but not limited to, a storing program for storing image data of an original into the internal storage 162 of the storage unit 160 or the external storage 137, a readout program for reading out the image data of the original stored in the internal storage 162 and/or the external storage 137, a data converting program for converting the data transmitted/received through the communication unit 115 into data having a predetermined format and a control program which controls the entire operation.

Referring FIGS. 2-10, an operation of the MFP 100 will be described. The procedures shown in FIGS. 2-10 are executed under the control of the control unit 175, and are initiated when the MFP 100 is powered on.

First Embodiment

FIG. 2 is a flowchart illustrating a SCAN TO PCC procedure. The SCAN TO PCC procedure is a procedure for scanning an original to generate image data having a predetermined format, and stores the image data (scan data) in the external storage 37. The operation unit 125 is provided with a depression switch for starting the control.

In S1, the SCAN TO PCC procedure is initiated.

In S2, it is judged whether the external storage 137 is coupled to the MFP 100. If the external storage 137 is coupled (S2: YES), control proceeds to S3. If the external storage 137 is not coupled to the MFP 100 (S2: NO), control proceeds to S4.

In S3, it is judged whether a remaining capacity of the external storage 137 (i.e., capacity for additionally storing data) is larger than a predetermined capacity Ca. If the remaining capacity is equal to or larger than the predetermined capacity Ca (S3: YES), control proceeds to S5. If the remaining capacity is smaller than the predetermined capacity Ca (S3: NO), control proceeds to S4. The predetermined capacity Ca may be determined as the capacity in which a page of color image can be stored in the JPEG format. With this judgment, whenever control proceeds to S5, at least one page of image data can be stored.

When the external storage 137 is not attached to the MFP 100 (S2: NO) or when the remaining capacity of the external storage 137 is less than the predetermined capacity Ca (S3: NO), an error message indicating the status is displayed on the display unit 120 in S4, and the procedure shown in FIG. 2 is terminated.

In S5, conditions for storing image data, which includes resolution, size and color format, is determined. For example, one of JPEG, PDF, GIF, BMP or the like is selected, and a selection of color or monochromatic, scanning resolution (e.g., one of 200 dpi, 300 dpi, 600 dpi and the like) and a selection of a sheet size (e.g., A4, postcard and the like) are made. Further, a file name for storing the image data is designated.

In S6, control waits for depression of the start key provided on the operation unit 125. Although not shown in FIG. 2, control may be configured such that by depression of another predetermined key, control may return to S5 to allow the user to change the settings.

In S7, scanning of the original with the original reading unit 10 is started. In S8, image data obtained by scanning the original is converted in accordance with the conditions set in S5 to generate original data.

In S9, the amount of the original data generated in S8 is examined to check whether the amount is less than the remaining capacity of the external storage 137. If the amount of the original data is equal to or larger than the remaining capacity of the external storage 137 (S9: NO), control proceeds to S4 to display the error message. If the amount of the original data is less than the remaining capacity of the external storage 137 (S9: YES), control proceeds to S10.

In S10, a WRITING procedure is called so that the original data scanned by the original reading unit 10 is stored in the external storage 137 in accordance with the conditions set in S5.

In S11, it is judged whether all pages of the original has been processed. If there are remaining pages of the original (S11: NO), control returns to S7 to repeat the steps thereafter. If all the pages of the original have been processed (S11: YES), the procedure shown in FIG. 2 is terminated.

Figure 3:
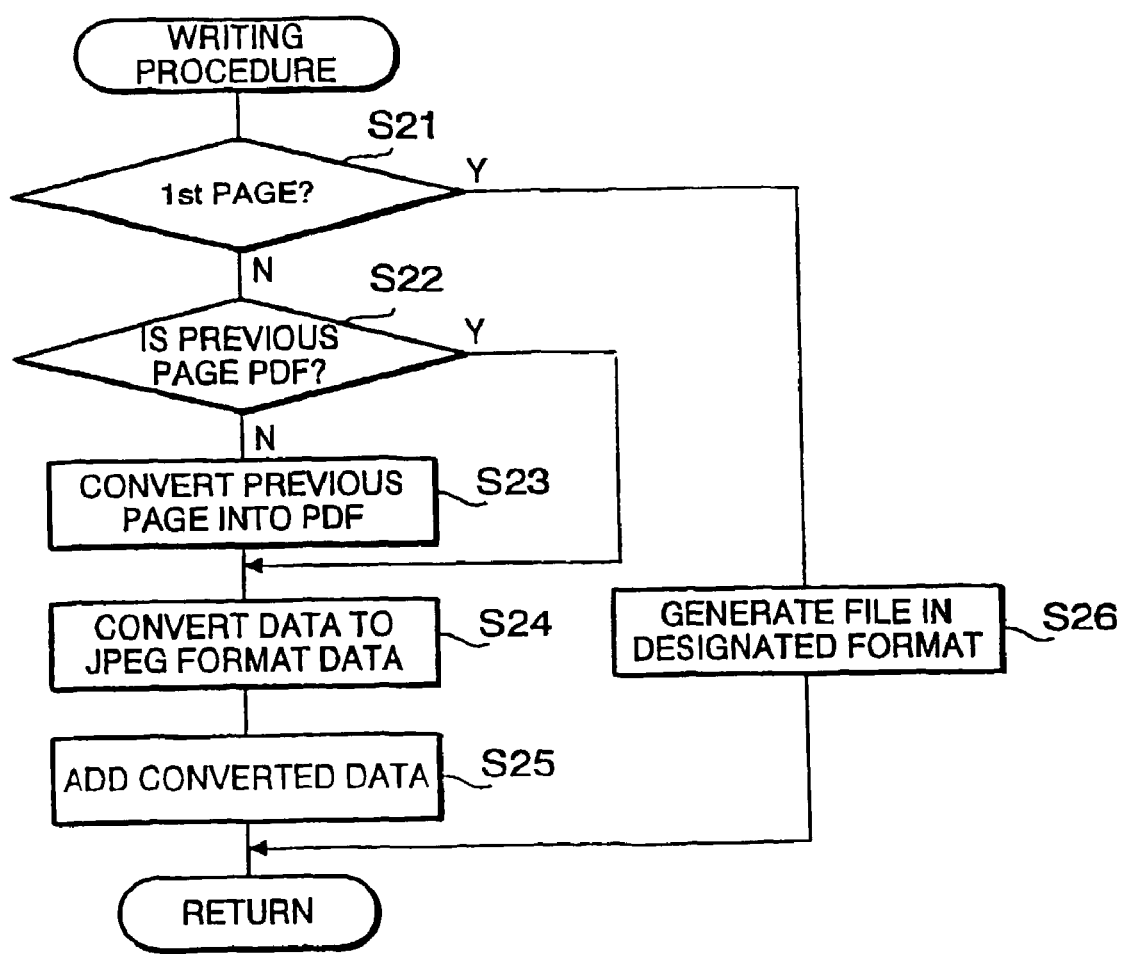
FIG. 3 shows a flowchart illustrating a WRITING procedure for writing data in the external storage.

FIG. 3 shows a flowchart illustrating the WRITING procedure, which is called in S10 of FIG. 2, for writing data in the external storage 137.

In S21, it is judged whether the original data, which has been scanned, is that of the first page of the original. It is a general practice that, when image data is stored as a file, a name indicating a content of the image is used as a file name. That is, when image data files were stored in the past, the file names were determined as names of subjects of the images in association with extensions, which indicate file types. Therefore, there is a possibility that the same file name as a file name of the original data file to be stored may exist in the external storage 137. In such a case, it may become possible to alert.

According to the first embodiment, a predetermined file name is defined for use in the process of the SCAN TO PCC procedure (e.g., TEMP.DAT or the like), and in S21, it is checked whether the file name same as the file name which will be created exists, and whether a file having the predetermined file name (e.g., TEMP.DAT) exists.

If the file having the same file name does not exist, and if the file having the same file name as the one to be created does not exist, then the currently processed data is the first page of the original, and accordingly, control proceeds to S26. If the file having the same file name exists, the control may ask the user to confirm that the file can be overwritten. Since such a configuration is not the characteristic feature of the invention, description thereof will not be provided in this specification.

If there is a file having the predetermined file name, there is a file which is being written in the SCAN TO PCC procedure, and control goes to S22.

In S22, it is judged whether the data of the previous page is stored in the PDF format. If the data format is the PDF (S22: YES), control proceeds to S24. If the data format is not the PDF (S22: NO), control proceeds to S23.

The structure of the PDF file will be briefly explained below. The PDF file is a file which defines a data structure in the PDF format with which a plurality of pages of data can be handled as a single file. Because of this characteristic, the PDF file is widespread as a document file.

FIG. 36A shows a basic data structure of the PDF file. As shown in FIG. 36A, the PDF file includes a header 2000 which is used for identifying the file specification, a body 2010 which is image data or document data, a cross reference list 2020 for referring to a page in the file, and a trailer 2030 indicating the end of the file. When a page is added, as shown in FIG. 36B, at the end of the file, the additional body 2040, an updated cross reference list 2050, and an updated trailer 2060 are added.

In S23, the data of the previous page is converted into the PDF format. The conversion of the page stored in the external storage 137 into the PDF data is executed as follows. If the page is not stored in the JPEG format, the page is once converted into an original format, which is then converted in the JPEG format. Then, a header 2000 representing header information is written at a top of the file, and a cross reference list 2020 and a trailer 2030 indicative of file information are written at the end of the file. With this operation, the JPEG format data is converted into the PDF format data.

In S24, the scanned original data is converted into the JPEG format. In S25, at the end of the file converted in S23, a body 2040 representing the image data converted in S24 is added. Further, an updated cross reference list 2050 and an updated trailer 2060 representing updated file information are added at the end of the file, thereby an updated PDF file is formed and stored.

In S22, if it is judged the previously stored file is the PDF file (S22: YES), control proceeds to S24.

In S26, since the image data is of the first page of the original, the original data is converted into data file in accordance with the conditions set in S5, and the data file is stored in the external storage 137 as a file having the predetermined name (e.g., TEMP.DAT) indicating the file is being written under control of the SCAN TO PCC procedure. It should be noted that the file name indicative of an intermediate file is used at this stage so that whether the all the pages of the original have been scanned by the reading unit 110 can be judged from the file name.

When all the pages of the original have been scanned, then the file name is changed to its final file name (i.e., the designated file name), and the procedure shown in FIG. 2 is terminated.

As described above, data storing in the external storage 137 is executed such that the first page is converted into the data format designated by the user (S26). If a plurality of pages of data are to be stored in the external storage 137, the data is once converted into a predetermined file format, and then converted into a specified file format (e.g., PDF format) (S22-S25). With this control, when the user has designated the PDF format, even if only one page data is to be stored, the data is stored in the PDF format.

Figure 4:
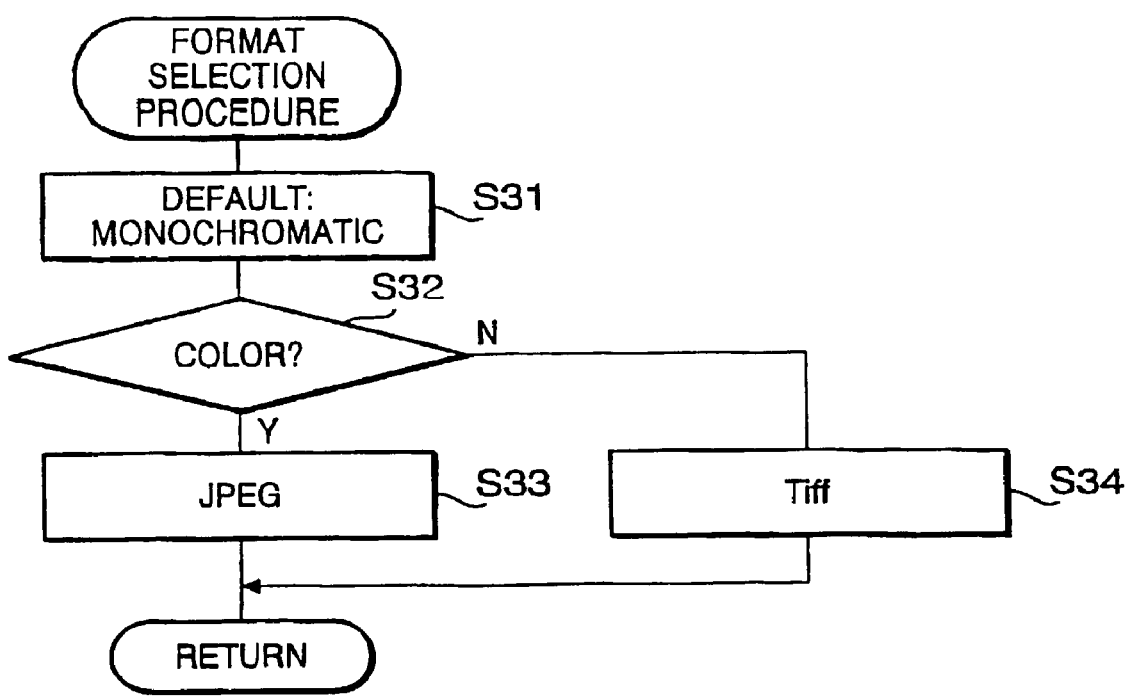
FIG. 4 shows a flowchart illustrating a FORMAT SELECTION procedure for a user to select a file format to be used.

FIG. 4 shows a flowchart illustrating a FORMAT SELECTION procedure in which a file format to be used is automatically determined as a user selects an image type. This procedure may be executed as a part of the procedure executed in S5 of FIG. 2.

In S31, as an initial setting (default setting), an image of the original is to be scanned as a monochromatic image.

In S32, it is judged whether the user designates the color setting, i.e., an image of the original is to be scanned as a color image. If it is judged that the color setting is designated (S32: YES), control proceeds to S33 where the JPEG format is selected as the file format. If it is judged that the monochromatic setting is designated (S32: NO), control proceeds to S34 where the TIFF format is selected as the file format.

It should be noted that the procedure shown in FIG. 4 is an exemplary and simplified procedure, and more candidates may be provided as the file formats to be used. With the control as exemplified in FIG. 4, an appropriate file format is selected in accordance with color settings. It should be noted again that the file formats to be used need not be limited to JPEG and TIFF.

Figure 5:
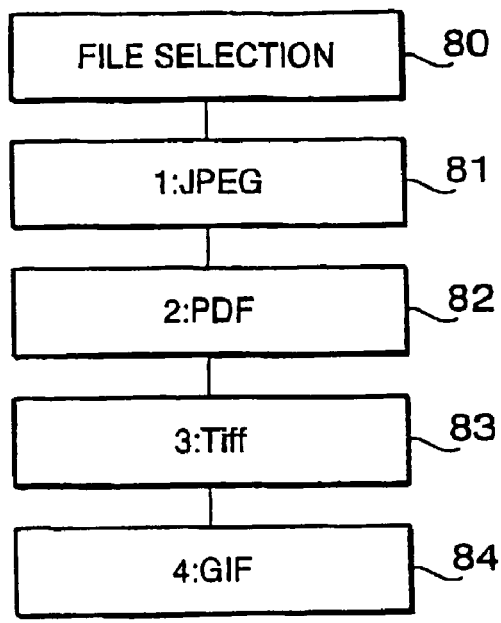
FIG. 5 shows a indication on the operation panel when a file format is directly selected.

FIG. 5 shows an exemplary indication on the operation panel when a file format is directly selected in S5 of FIG. 2. As shown in FIG. 5, firstly a message indicating the a file type should be selected is displayed (80), and then, file types "JPEG", "PDF", "TIFF" and "GIF" are subsequently displayed ((81-84) on the display panel upon operation of a predetermined key (e.g., an arrow key or the like). By depressing a predetermined decision key (e.g., an enter key) when the file format to be used is displayed on the display panel, the user can select the file format.

Figure 6:
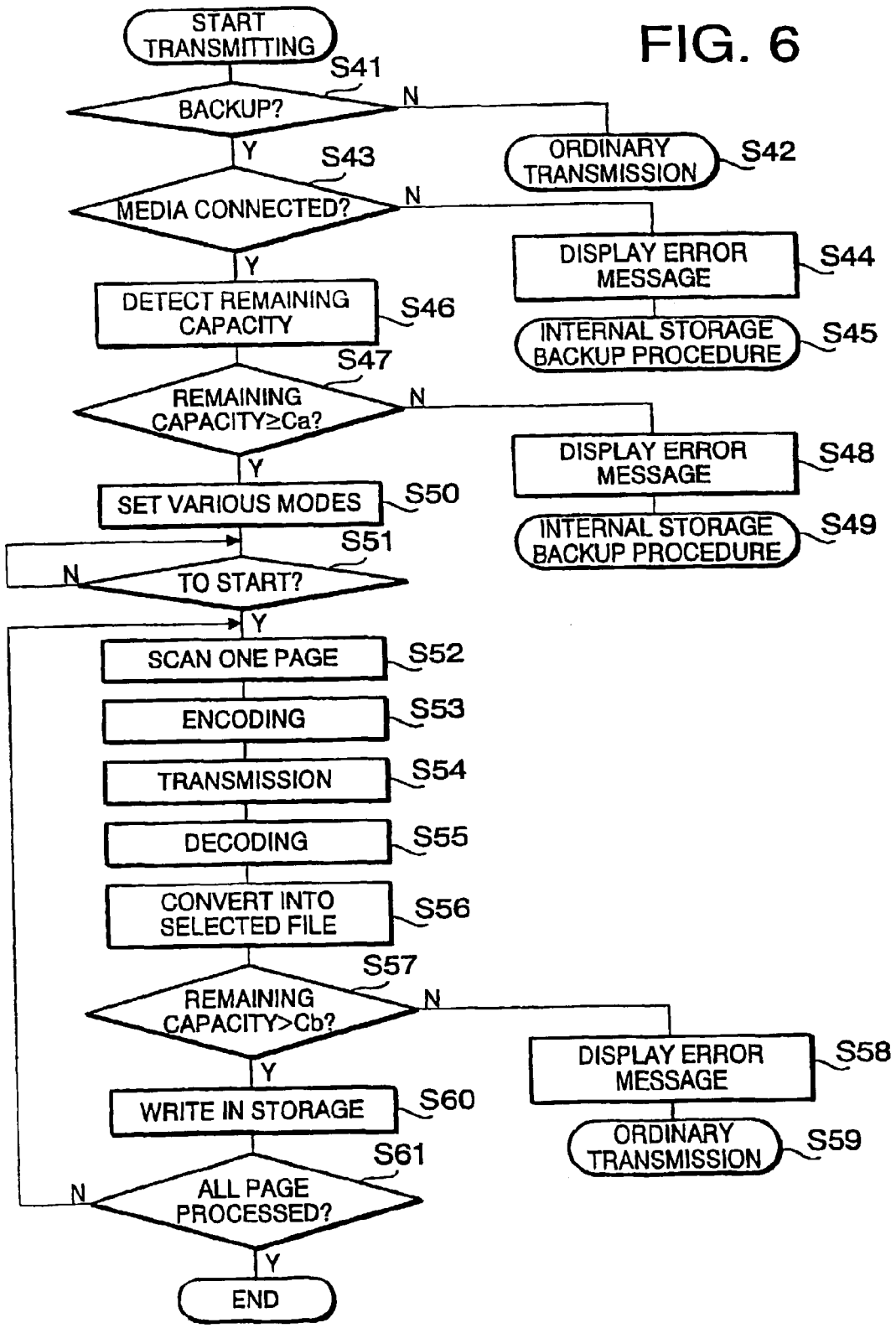
FIG. 6 is a flowchart illustrating a BACKUP procedure for storing the transmission data of the facsimile in the external storage as backup data.

FIG. 6 is a flowchart illustrating a BACKUP procedure for storing the transmission data of the facsimile in the external storage 137 as backup data.

In S41, it is judged that the backup is instructed by the user. If it is judged that the user has instructed the backup operation (S41: YES), control proceeds to S43. If the user has not designated the backup operation (S41: NO), control proceeds to S42, where the backup operation for storing the facsimile transmission data in the external storage 137 is interrupted, and a normal facsimile transmission procedure is executed.

In S43, it is judged whether the external storage 137 is attached. If it is judged that the external storage 137 is currently attached to the MFP 100, control proceeds to S46, otherwise to S44. In S44, an error message is displayed, and the backup operation for storing the backup data in the external storage 137 is interrupted. In S45, an INTERNAL STORAGE FACSIMILE TRANSMISSION DATA BACKUP procedure is executed, which will be described later.

In S46, the remaining storage capacity of the external storage 137 is detected. It should be noted that the remaining capacity can be detected by referring to a memory map, which is a well-known technology and will not be described herein.

In S47, it is judged whether the remaining storage capacity of the external storage 137 is equal to or greater than the predetermined capacity Ca or less than the predetermined capacity Ca. If the remaining storage area is the predetermined capacity Ca or more (S47: YES), control proceeds S50. If the remaining capacity is less than the predetermined capacity Ca (S47: NO), control proceeds to S48, where an error message is displayed, and the backup operation is interrupted. In S49, the INTERNAL STORAGE FACSIMILE TRANSMISSION DATA BACKUP procedure is executed.

Similarly to the above, the predetermined capacity Ca may be a size in which one page of JPEG color image data file can be stored therein.

In S50, various modes are set. The modes include, for example, file formats, resolution, image size, color and the like which are used for storing the image data. A procedure for setting the modes will be described later. It should be noted that, in the mode setting procedure executed in S50, predetermined conditions may be set in advance or a user may be required to input/select desired settings.

In S51, the original is scanned by the original reading unit 10 in accordance with the mode set in S50.

In S52, a page of the original is scanned, and in S53, a encoding of the scanned original image is executed by the CODEC 145 to generate an original data. In S54, the converted data is transmitted to another end of the line (i.e., a facsimile receiving station).

Next, in S55, the original data is decoded by the CODEC 145, and then, in S56, the decoded original data is converted (compressed) in accordance with the file format designated in S50.

In S57, it is judged whether the amount Cb of the original data generated in S56 is less than the remaining capacity of the external storage 137. If the remaining capacity is greater than the data amount Cb (S57: YES), control proceeds to S60, where the image data corresponding to the transmission data (transmitted through the communication unit 115) is stored in the external storage 137. If the remaining size is not greater than the data amount Cb (S58: NO), control proceeds to S58. In S58, an error message is displayed on the display unit 120, and the backup operation for storing the backup data in the external storage 137 is interrupted, and in S59, the normal facsimile transmission procedure (which is a procedure similar to a case when the backup is not instructed in S41) is executed.

In S60, as described above, the backup data is stored in the external storage 137. This storing procedure is executed in accordance with the procedure shown in FIG. 3.

In S61, it is judged whether all the data of the original has been read. If it is judged that all the data has been read (S61: YES), the procedure shown in FIG. 6 is terminated. If it is judged that all the data has not been read (S61: NO), control returns to S52 and steps S52 through S61 are repeated.

As is similar to the procedures in FIGS. 2 and 3, after all the data has been stored in the external storage 137, the file name is changed from a tentative one (e.g., TEMP.DAT) to a user's desired file name. When the file name is changed, file information is registered with a management file 90 (see FIG. 11) which will be described later. When the file name is to be assigned automatically, the a file name may be serial numbers, for example, or may be a combination of identifier indicative of a destination (i.e., a receiving station) and a serial number, for another example. Information related to date/time of the transmission may be used for the file name.

Figure 11:
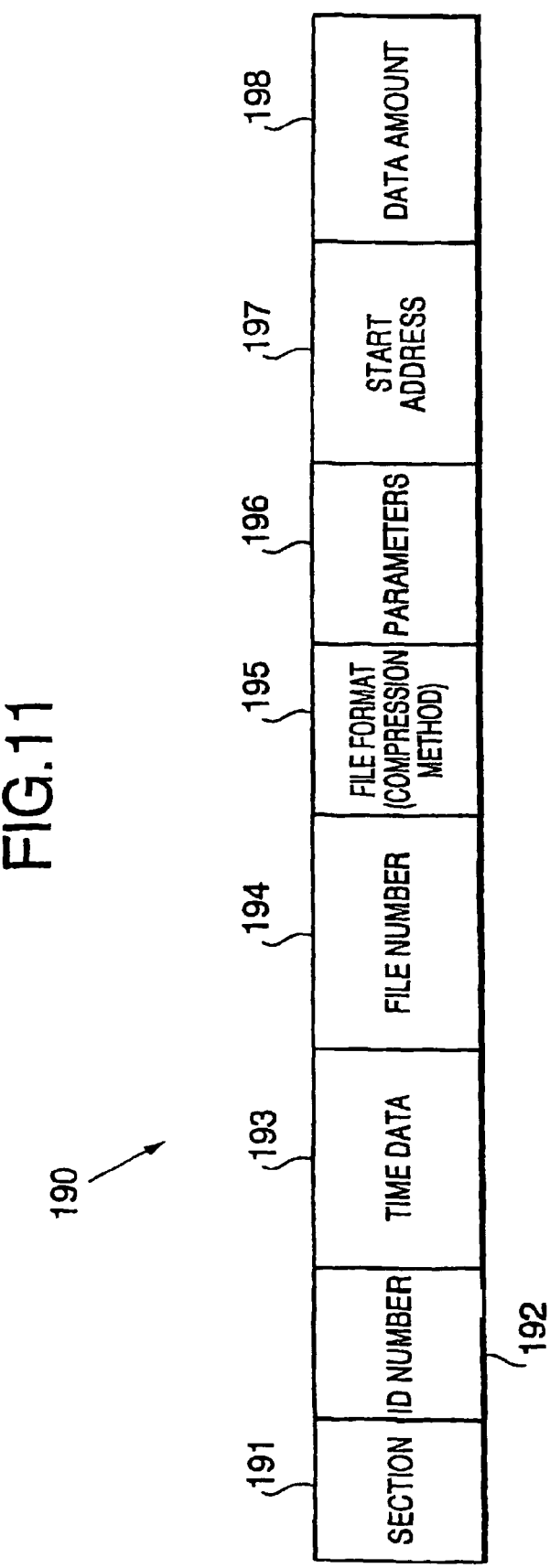
FIG. 11 shows a file structure of the backup file.

FIG. 11 shows a file structure of the management file 90 for the backup operation.

As shown in FIG. 11, the management file 90 includes an FAT (file allocation table) from which the file storing status of the external storage 137 can be known. Specifically, as shown in FIG. 11, the management file 90 is provided with a section segment 191 indicative of whether the backup data is for the facsimile transmission or the facsimile reception, the ID number 192 indicative of the telephone number or station ID, the time data 193 indicative of the time when the transmission/reception of the facsimile transmission is started, a file number 194 which is a serial number (which is normally assigned automatically) of the management file 90, a type 195 of the file indicative of the file format (i.e., TIFF, JPEG, PDF, GIF and the like), parameters (e.g., compression parameter indicating a compression rate) 196, a start address 197, and a data amount 198. By referring to the data above, file operation such as deletion of a file, which will be described later, can be executed.

When data (a file) is written in the external storage 137, identifier information indicating one of transmission data, reception data and scanned data is stored in the section segment 191, and a start time is stored in the time data segment 193 of the management file 190, the data of the section segment 191 and the time data 193 of the management file 190 can be used as history information. For example, by collecting management files 190 whose sections 191 indicate the transmission, transmission history can be obtained easily.

It should be noted that, in the file deletion procedure described later, if the user instructed to re-transmit, re-print or delete a file, the designated file is detected referring to the file number 194 of the management file 190, and then the designated file is re-transmitted, deleted or printed.

Figure 7:
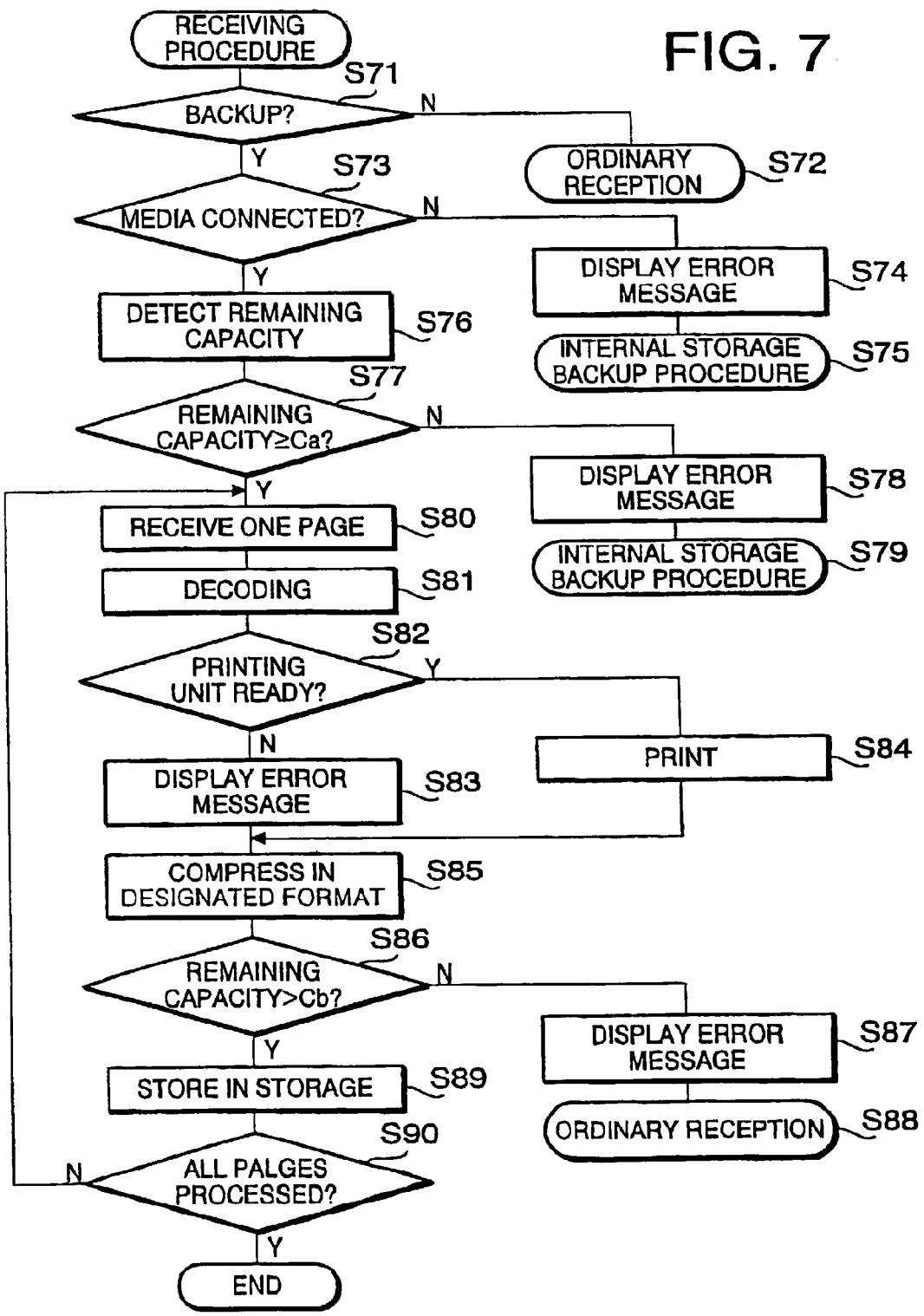
FIG. 7 is a flowchart illustrating a FACSIMILE RECEIVING procedure, wherein the received data is stored in the external storage as backup data.

FIG. 7 is a flowchart illustrating a FACSIMILE RECEIVING procedure, wherein the received data is stored in the external storage 137 as backup data. When the received data is stored as the backup data, the file format and the like should be designated in advance, and the received data is stored in accordance with the designated file format and the like. For example, the file format may be determined in accordance with the type of the image data as in the procedure shown in FIG. 4. Alternatively, a predetermined format (e.g., JPEG format ro the like) may be used as a fixed format setting.

The file name may be automatically assigned as in the case where the transmission data is stored. In the case where the received data is stored, it may be convenient if the file name includes information regarding transmitting station. Alternatively or optionally, the external storage 137 may be configured to have separate storing areas for storing data separately by the transmitting stations.

In S71, it is judged whether the received data is to be stored in the external storage 137 as the backup data, which is set by the user in advance. If it is judged that the backup data should be stored in the external storage 137 (S71: YES), control proceeds to S73, otherwise to S72 where the backup is interrupted and a normal facsimile receiving operation is performed.

In S73, it is judged whether the external storage 137 is attached to the MFP 100. If the external storage 137 is attached (S73: YES), control proceeds to S76. If the external storage 137 is not attached to the MFP 100 (S73: NO), control proceeds to S74, where an error message is displayed on the display unit 120, the backup operation is interrupted, and in S75, control proceeds to the main storage receiving data backup procedure, which will be described later, is executed.

In S76, the remaining storage capacity in the external storage 137 is detected.

In S77, it is judged whether the remaining storage capacity of the external storage 137 is equal to or greater than a predetermined capacity Ca. If it is judged that the remaining storage capacity is equal to or larger than the predetermined capacity Ca (S77: YES), control proceeds to S80, otherwise (S77: NO) to S78. In S78, an error message is displayed on the display unit 120, the backup operation is interrupted, and control proceeds to S79 where the INTERNAL STORAGE RECEIVED DATA BACKUP procedure is executed. As aforementioned, the predetermined capacity Ca is determined as a capacity for storing one page of color JPEG image data file.

In S80, a FACSIMILE DATA RECEIVING procedure is initiated and reception of a page of facsimile data is performed.

In S81, the received facsimile data is decoded by the CODEC 145 to convert the same to image data, and in S82, it is judged whether the converted image data can be printed by the printing unit 170. If the image data can be printed by the printing unit 170 (S81: YES), control proceeds to S84. If the image data cannot be printed by the printing unit 170 (S81: NO), control proceeds to S83, where the error message is displayed on the display unit 120.

In S84, one page of the image data is printed using the printing unit 170.

In S85, the image data is converted and/or compressed in accordance with a predetermined (designated) file format.

In S86, it is judged whether the amount Cb of the data generated in S85 is less than the remaining storage capacity of the external storage 137. If the amount Cb is less than the remaining storage capacity (S86: YES), control proceeds to S89. If the amount Cb is equal to or greater than the remaining storage capacity (S86: NO), control proceeds to S88, where the normal facsimile receiving procedure is performed.

In S89, the compressed received data is stored in the external storage 137. The procedure for storing the received data is similar to the procedure shown in FIG. 3.

In S90, it is judged whether all the pages of the facsimile data are received by the communication unit 115. If the data of all the pages has been received (S90: YES), the procedure shown in FIG. 7 is terminated. If the data of all the pages of the facsimile data have not been received (S90: NO), control returns to S80, and steps S80-S90 are repeated. When the procedure shown in FIG. 7 is terminated, the file name is changed from the tentative one to the desired one, which is similar to the procedure described with reference to FIGS. 2 and 3.

As shown in FIGS. 6 and 7, when the backup operation is executed for the facsimile transmission/reception, the data is transmitted/received on a page basis (i.e., page by page), and at every transmission/reception of data for a page, it is judged whether the remaining storage capacity of the external storage 137 is sufficient for storing at least one page of the transmission/reception data until the data for the last page is transmitted/received. When the data is stored in the external storage 137, the data of the first page is stored in accordance with the format designated by the user using the operation unit 125. When the data for a plurality of pages is stored in the external storage 137, the data is converted into a predetermined file format and then converted into a specified file format and stored in the external storage 137 under control of the control unit 75 (S22-S25).

Figure 8:
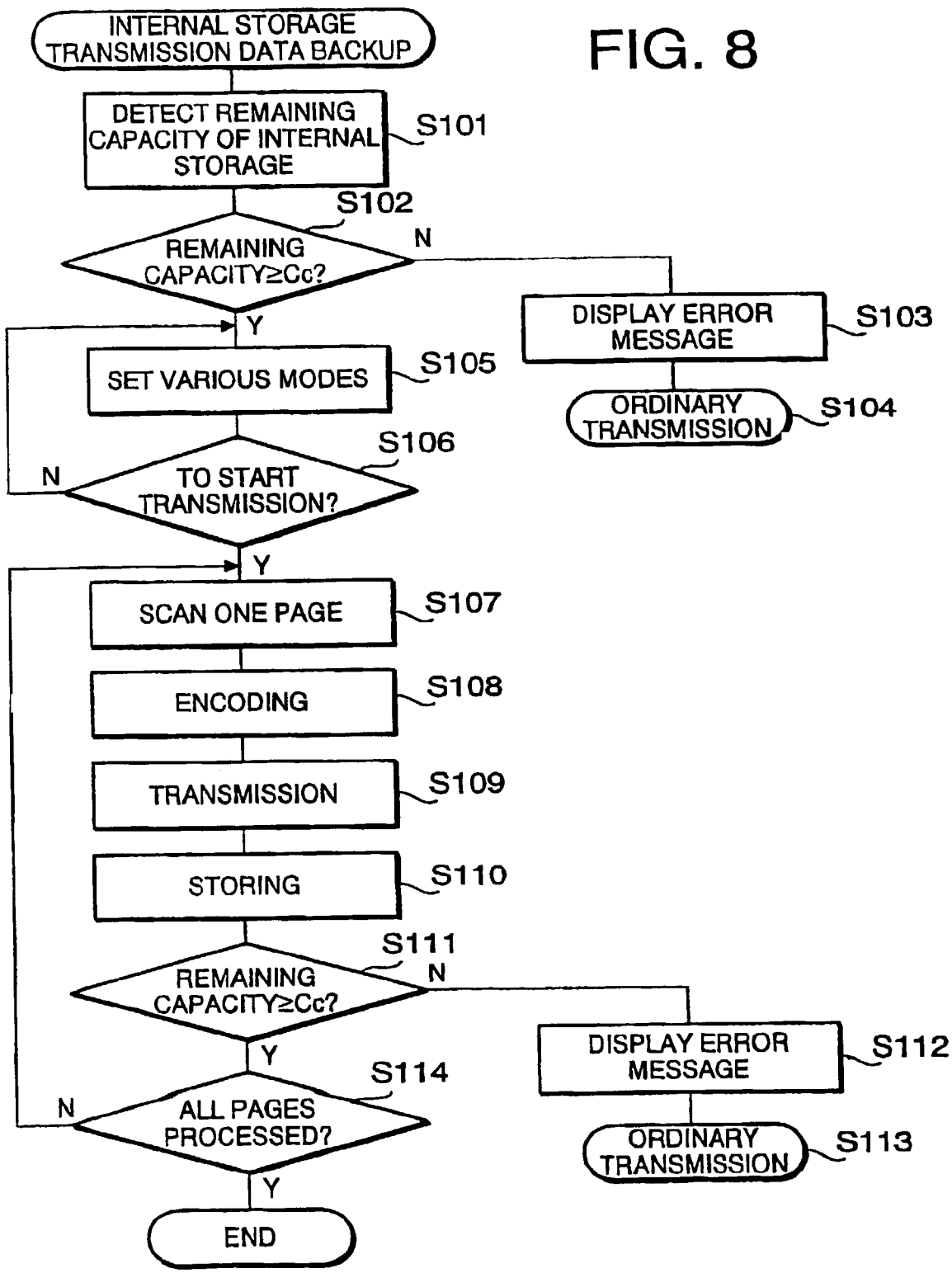
FIG. 8 is a flowchart illustrating an INTERNAL STORAGE TRANSMISSION BACKUP procedure for storing the transmission data in the internal storage which is executed during a normal transmission procedure.

FIG. 8 is a flowchart illustrating an INTERNAL STORAGE TRANSMISSION DATA BACKUP procedure for storing the transmission data in the internal storage 162 which is executed during a normal transmission procedure.

In S101, the remaining storage capacity of the internal storage 162 is detected.

In S102, it is judged whether the remaining storage capacity of the internal storage 162 is equal to or greater than a predetermined capacity Cc. If the remaining storage capacity of the internal storage 162 is equal to or larger than the predetermined capacity Cc (S102: YES), control proceeds to S105. If the remaining storage capacity is not greater than the predetermined capacity Cc (S102: NO), control proceeds to S103. In S103, the error message is displayed on the display unit 20, and the backup operation to the internal storage 162 is interrupted. In S104, the normal facsimile transmission procedure is operated. It should be noted that the predetermined capacity Cc is determined such that the data corresponding to one page of the file format employed in the normal facsimile machines (e.g., MH coding format) can be stored.

It should be noted that the data may be stored in the format which is generally supported by PCs (e.g., JPEG, Tiff and the like). However, unlike the external storage 137, the internal storage 162 will not be detached from the MFP 100 and the stored data will not be printed by external printers. Therefore, if the data is stored in accordance with the dedicated facsimile machine format, when the re-transmission and/or re-print is required, the request can easily be dealt with without converting the stored data.

In S105, various mode settings are executed. The mode settings include, for example, a setting of resolution, image size and the like, which define conditions when the data is stored. It should be noted that the step is similar to S50 in FIG. 6.

In S106, it is judged whether the scanning of the original should be started based on the mode set in S105. If it is judged that the scanning should be started (S106: YES), control proceeds to S107. If it is judged that the scanning should not be started (S106: NO), control returns to S105.

In S107, a page of the original is scanned. The obtained data by scanning is converted, by the CODEC 145, into an original data having a predetermined format in S108. Then, in S109, the original data is transmitted to the other end of the line (i.e., the facsimile receiving station).

In S110, the original data as transmitted is stored in the internal storage 162. In this case, the format of the data stored in the internal storage 162 is a dedicated format, which is the format normally employed in the known facsimile machines, such as MH format, FR format and MMR format.

In S111, the remaining storage capacity of the internal storage 162 is detected, and it is judged whether the remaining storage capacity is equal to or greater than the predetermined capacity Cc. If the remaining capacity is equal to or greater than the predetermined capacity Cc (S111: YES), control proceeds to S114. If the remaining capacity is less than the predetermined capacity Cc (S111: NO), control proceeds to S112. In S112, an error message is displayed on the display unit 120, and the backup operation in the internal storage 162 is interrupted. Then in S113, the normal facsimile transmission operation is executed. The predetermined capacity Cc corresponds to a page of the facsimile data (e.g., MH format data) employed in the known facsimile machines.

In S114, it is judged whether all the pages of the original have been read (scanned). If the all the pages of the original have been scanned (S114: YES), the procedure shown in FIG. 8 is terminated. If the all the pages have not yet been scanned (S114: NO), control returns to S107, and steps S107 through S111 are repeated. It should be noted that in this procedure, the stored data can have any kind of file format (including a format dedicated to facsimile machines) since the data need not be read by the PC and the like. Therefore, a file conversion operation is not included.

Figure 9:
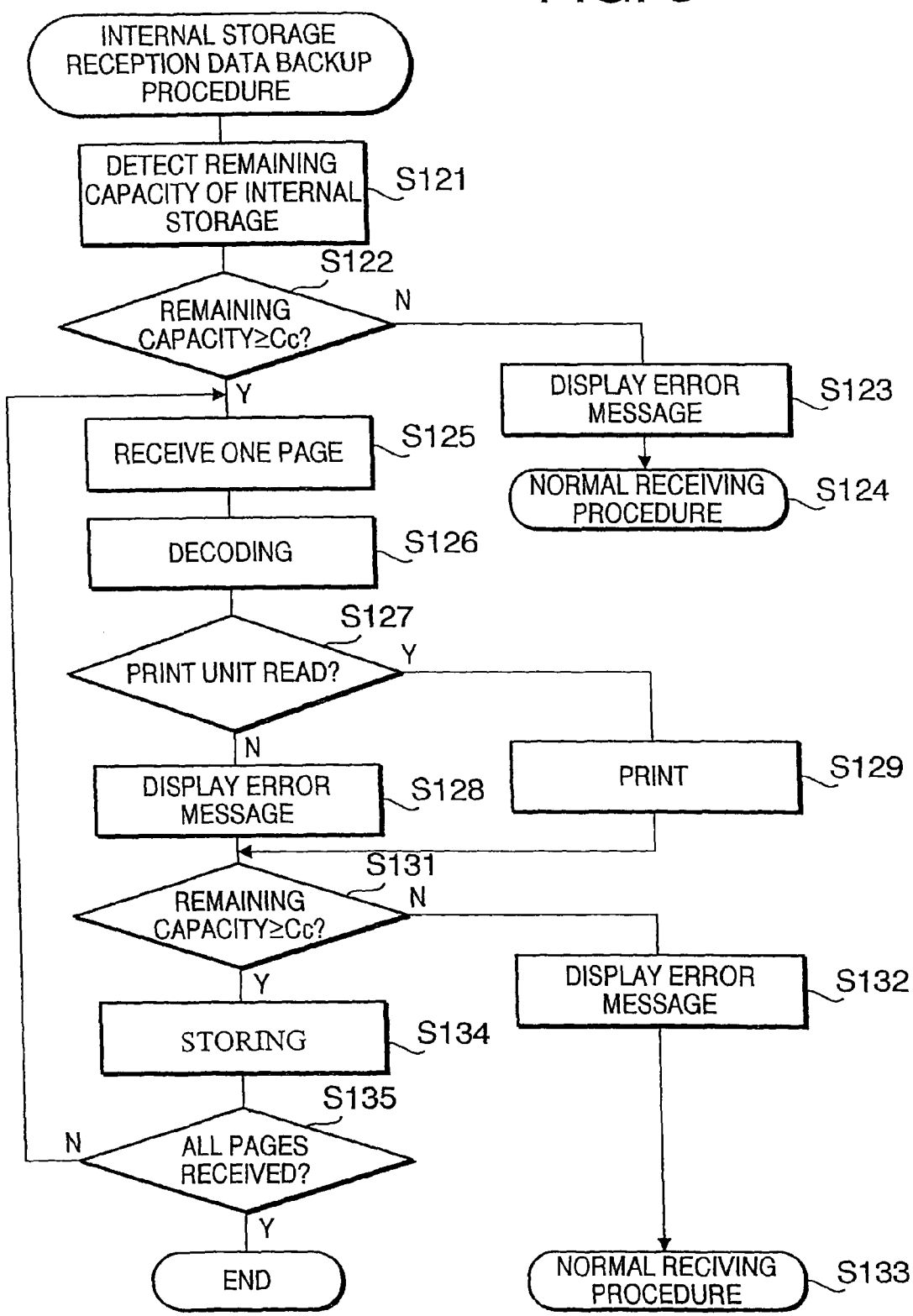
FIG. 9 is a flowchart illustrating a RECEPTION DATA BACKUP procedure for storing the received facsimile data in the storage of the MFP shown in FIG. 1.

FIG. 9 is a flowchart illustrating a RECEPTION DATA BACKUP procedure for storing the received facsimile data in the internal storage 162 of the MFP 100.

In S121, the remaining capacity of the internal storage 162 is detected.

Then, in S122, it is judged whether the remaining capacity of the internal storage 162 is equal to or greater than the predetermined capacity Cc. If it is judged that the remaining capacity of the internal storage 162 is equal to or greater than the predetermined capacity Cc (S121: YES), control proceeds to S125. Otherwise (S121: NO), control proceeds to S123, where an error message is displayed on the display unit 120, the backup procedure is interrupted, and in S124, the normal facsimile receiving procedure is executed. It should be noted that the predetermined capacity Cc corresponds to one page of the facsimile data (e.g., MH format data) employed in the known facsimile machines.

In S125, it is started to receive one page of data.

In S126, the received data is sequentially decoded by the CODEC 145 to image data.

In S127, it is judged whether the converted iamge data can be printed by the printing unit 170. If it is judged that the converted data can be printed (S127: YES), control proceeds to 129. If it is judged that the converted data cannot be printed (S127: NO), control proceeds to S128, where an error message is displayed on the display unit 129.

In S129, a page of the converted data (image data) is printed.

In S131, the remaining storage capacity of the internal storage 162 is detected, and is judged whether the remaining capacity is equal to or greater than the predetermined capacity Cc. If it is judged that the remaining capacity is equal to or greater than the predetermined capacity Cc (S131: YES), control proceeds to S134. If it is judged that the remaining capacity is less than the predetermined capacity Cc (S131: NO), control proceeds to S132, where the error message is displayed on the display unit 120, and the backup operation in the internal storage 162 is interrupted. In S133, the normal facsimile reception procedure is executed. It should be noted that the predetermined capacity Cc corresponds to one page of facsimile data in the known format (e.g., the MH format).

In S134, the received data is stored in the internal storage 162. It should be noted that, in this case, the format of the received data stored in the internal storage 162 is the normal facsimile data format, or the format dedicated to the facsimile transmission/reception (e.g., MH format, MR format, MMR format).

In S135, it is judged whether all the pages of the facsimile data has been received by the communication unit 115. If it is judged that all the pages of the facsimile data have been received (S135: YES), the procedure shown in FIG. 9 is terminated. If not (S135: NO), control returns to S125, and the steps S125 through S135 are repeated.

As shown in FIGS. 8 and 9, if the external storage 37 is not attached, the transmitted and/or received data can be stored in the internal storage 162 as the backup data. When the backup is made, the transmission/reception data is processed page by page, and examine whether the remaining storage area of the internal storage 162 is sufficient for storing at least one page of transmission/reception data at every transmission/reception of a page of the data, until the last page of the data is transmitted/received. The data is stored in the internal storage 162 in accordance with the format, which is generally employed in the facsimile machines such as the MH format, MR format, MMR format and the like.

Figure 10:
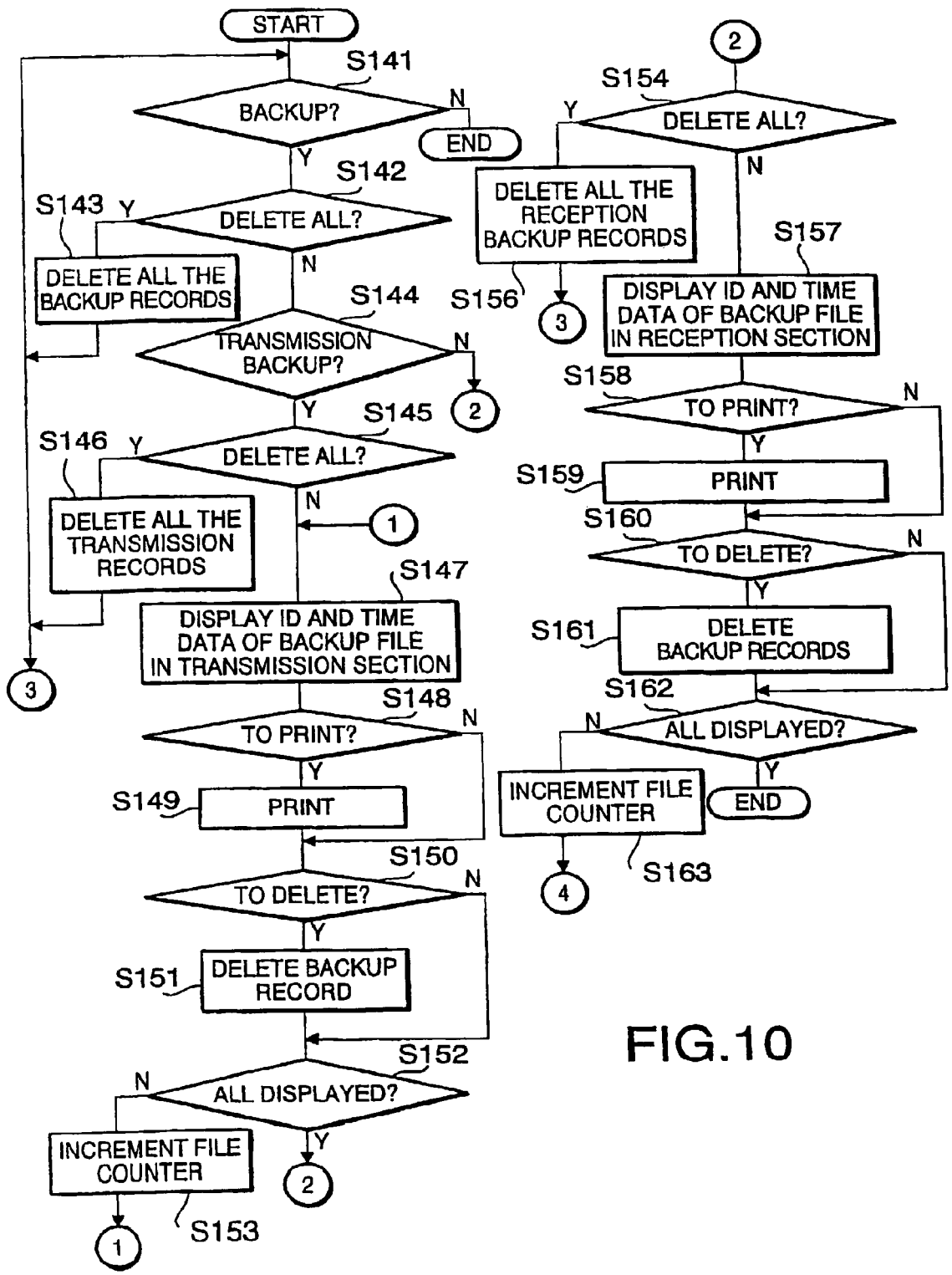
FIG. 10 is a flowchart illustrating a DATA DELETION procedure for deleting the backup data.

FIG. 10 is a flowchart illustrating a DATA DELETION procedure for deleting the backup data.

In S141, it is judged whether the backup data is stored in the internal storage 62 or the external storage 137. If there is backup data in the internal storage 62 or the external storage 137 (S141: YES), control proceeds to S142. If there is no backup data (S141: NO), the procedure shown in FIG. 10 is terminated.

In S142, control inquires the user whether all the backup data is to be deleted. If the user has instructed that all the backup data is to be deleted (S142: YES), control proceeds to S143. If not (S142: NO), control proceeds to S144. In S143, all the backup data is deleted, and control returns to S141. According to the embodiment, the data to be deleted includes file(s) having the dedicated facsimile transmission/reception formats and the file(s) which can be used in the PCs.

In S144, control inquires the user whether the file to be deleted is the backup file of the facsimile transmission. If the user has instructed that the file to be deleted is the backup file of the facsimile transmission (S144: YES), control proceeds to S145. If not (S144: NO), control proceeds to S154.

In S145, control inquires the user whether all the facsimile backup files are to be deleted. If it is judged in accordance with the user's instruction that all the backup files are to be deleted (S145: YES), control proceeds to S146. If not (S145: NO), control proceeds to S147. In S146, all the transmission backup files are deleted, and control returns to S141. According to the embodiment, the transmission backup files to be deleted include the files having the formats dedicated facsimile transmission formats and the files which can be used in the PCs.

In S147, the ID number and time of the backup file of the transmission history is displayed with reference to the management files 90. From the displayed data, to whom and when the transmission was executed can be known.

In S148, control inquires the user whether the files displayed in S147 are to be printed. If it is judged, in accordance with the user's instruction, that the files are to be printed (S148: YES), control proceeds to S149, where the files are printed. If the files need not be printed (S148: NO), control proceeds to S150.

In S150, control inquires the user whether the files displayed in S147 are to be deleted. If it is judged, in accordance with the user's instruction, that the files are to be deleted (S150: YES), control proceeds to S151, where the files are deleted. The files to be deleted includes the files of the dedicated facsimile transmission format and the files readable by the PC and the like. If the files need not be deleted, control proceeds to S152.

In S152, it is judged whether all the files included in the backup file of the transmission history has been displayed. If it is judged that all the files have been displayed (S152: YES), control proceeds to S154. If not (S152: NO), control proceeds to S153. In S153, in order to display the next file which has not been displayed, a file number is incremented and control returns to S147.

In S154, control inquires the user whether all the reception backup files are to be deleted. If all the reception backup files are to be deleted (S153: YES), control proceeds to S156. If not (S153: NO), control proceeds to S157. In S156, all the reception backup files are deleted, and then control returns to S141. The reception backup files to be deleted include the files having a dedicated facsimile transmission format, and the files which can be readable by the PCs or the like.

In S157, the ID number and time of the backup file of the reception history are displayed.

In S158, control inquires the user whether the files displayed in S157 are to be printed. If the user has instructed that the files are to be printed (S158: YES), control proceeds to S159. If not (S157: NO), control proceeds to S160. In S159, the files displayed in S157 are printed.

In S160, control inquires the user whether the files displayed in S147 are to be deleted. If the user has instructed that the files are to be deleted (S160: YES), control proceeds to S161. If not (S160: NO), control proceeds to S162. In S161, the files are deleted. It should be noted that the files to be deleted include files having the dedicated file transmission format, and files readable by the PCs.

In S162, it is judged that all the backup files indicating the reception history have been displayed. If it is judged that all the files has been displayed (S162: YES), the procedure shown in FIG. 10 is terminated. If not (S162: NO), control proceeds to S163, where the file number is incremented in order to display the data which has not yet been displayed on the display unit 20.

Second Embodiment

FIG. 12A is a block diagram schematically showing a configuration of an MFP 200 according to a second embodiment, and FIG. 12B schematically shows a structure of a keyboard 209 of the MFP 200. The MFP 200 has a image reading function (scanning function), and capable of scanning an image using an original reading unit 206 in accordance with instructions input by a user through the keyboard 209, and storing image data representing the scanned image in an external storage (218, 219 or 220). In this case, new image data can be added at the end of a file having a predetermined document-like format. It should be noted that the document-like format refers to a format having a plurality of pages in a single file, and data can be added to the document-like format as a new page in the same file.

Similarly to the first embodiment, the image data may include JPEG, GIF, TIFF, PNG (Portable Network Graphics), BMP data, for example. As an example of the document-like format, but not limited to, the PDF format suggested by the Adobe Systems is known.

As shown in FIG. 12A, the MFP 200 includes a CPU 202 which controls the entire operation of the MFP 200, ROM 203 and RAM 204 storing control programs and various data, ASIC (Application Specific Integrated Circuit) 205, MODEM 216 are interconnected through a bus 201.

The RAM 204 includes a storage section functioning as an internal storage 204a and a flag storage area 204b storing a N-in-1 flag set by a user. In the N-in-1 flag storage area 204b, a value "1" is stored when the N-in-1 function is ON, while a value "0" is stored when the N-in-1 function is OFF. In ASIC 205, the original reading unit 6 for reading the original as an image, a panel interface 207, a detachable storage interface 210, a parallel interface 214, a USB interface 215 are electrically connected.

The original reading unit 206 is provided with an ADF (Automatic Document Feeder) and a plurality of sheets of the original can be subsequently fed on an image reading position of the original reading unit 206. The original reading unit 206 may be configured such that a sheet of original is manually placed by the user.

The panel interface 207 is connected with an LCD 208 for displaying information for the user and the keyboard 209 through which the user can input various instructions.

The removable storage interface 210 is connected with a first slot 211, a second slot 212 and a third slot 213. First through third external storages 218-220 can be detachably coupled to the first through third slots 211-213, respectively. In the following description, for the sake of brevity, only the first slot 211 and the first external storage 218 will be described. However, the description can apply to each of the slots and the external storages.

The external storage 218 may be, but not limited to, a compact flash®, a smart media®, a memory stick® and the like. Of course, the external storage 218 is not limited to such media, and floppy® disk, MO, CD-R, CD-RW, DVDOR, DVD-RAM, DVD-RW and the like can be used. Depending on the type of the external storage 218, the slot 211 should be replaced with an appropriate drive.

The parallel interface 214 and USB interface 215 can be connected with other electronic devices, when necessary, through parallel cable and USB cable, respectively. To the ASIC 205, the NCU (Network Control Unit) 217 is connected, and the MODEM 216 is connected to the NCU 217. The NCU 217 is connected with a public telephone line network.

The keyboard 209 is provided with a various keys. As schematically indicated in FIG. 12B, the keyboard 209 has ten-keys 209a, a SCAN TO PCC key 209b for initiating a SCAN TO PCC procedure, arrow keys 209c, an enter key 209d used for establishing a selection or the like, a transmission key 209e for initiating a facsimile transmission, a delete key 209f for deleting files/image data stored in the memory/storages, N-in-1 key 209g for composing an N-in-1 image including N pages of images in one page, and a start key 209h for starting respective operations.

It should be noted that the ten-keys 209a may be provided with alphanumeric keys, and the user may input series of alphanumeric characters to the MFP 200 through the ten-keys 209a for various settings/instructions. The SCAN TO PCC procedure is the procedure for storing image data obtained with the original reading unit 206 in the external storage 218.

FIG. 13 is a flowchart illustrating a main procedure of the MFP 200 according to the second embodiment. FIG. 14 is a flowchart illustrating an EXTERNAL STORAGE DETEC- TION procedure, and FIG. 15 shows a flowchart illustrating a FORMAT SELECTION procedure called at S204 of FIG. 13. FIG. 16 shows a screen for selecting a data format. FIG. 17 is a flowchart illustrating an N-IN-1 SETTING procedure, and FIGS. 18A and 18B show screen images for setting the number N of the N-IN-1 setting. FIG. 19 is a flowchart illustrating a FIRST NAME INPUTTING procedure. FIG. 20 is a flowchart illustrating an IMAGE DATA NEWLY STORING procedure. FIG. 21 is a flowchart illustrating an EXTERNAL STORAGE RECEPTION procedure.

When the user place the original at an image reading position of the original reading unit 206, and depresses the SCAN TO PCC key 209*b* of the keyboard 209, the procedure shown in FIG. 13 is initiated. In response to the depression of the SCAN TO PCC key 209*b*, the main program is executed.

In S203, a subroutine EXTERNAL STORAGE DETECTING procedure, which is shown in FIG. 14, is executed. In this procedure, it is judged whether the external storage 218 is attached to the first slot 211 of the MFP 200. Further, a device (i.e., the external storage 218) in which the image data obtained by the original reading unit 206 is stored is set.

In S231 of FIG. 14, it is judged whether the external storage 218 is coupled to (i.e., inserted in) the first slot 211. If the external storage 218 is coupled (S231: YES), the subroutine shown in FIG. 14 is terminated promptly, and control goes to S204 of FIG. 13. If the external storage 218 is not coupled to the first slot 211 (S231: NO), control proceeds to S232, where a message inquiring the user whether the procedure should be continued is displayed on the LCD 208. The message may read, for example, "NO EXTERNAL MEMORY IN THE SLOT. DEPRESS [1] TO CONTINUE, or [2] TO TERMINATE". Depending on which is depressed, it is judged whether the procedure should be continued (S233). If the [1] key is depressed (S233: YES), control proceeds to S234, where the internal storage 204*a* of the RAM 204 is tentatively selected as the storage for storing the image data obtained by the original reading unit 206, and the control goes to S204 of FIG. 13. If [2] key is depressed (S233: NO), not only the procedure of FIG. 14, but also the procedure of FIG. 13 are terminated. It should be noted that, when the external storage 218 is not available, the external storages 219 and 220 may be checked automatically, or the user may be inquired to select the same.

In S203 of FIG. 13, when the storage in which the image data obtained by the original reading unit 206 is stored is set, the DATA FORMAT SELECTION procedure, which is a subroutine, is called in S204. In this procedure, a data format of the image data when stored in the storage is determined.

In S241 of FIG. 15, an image for selecting the data format to be used is displayed on the LCD 208. An example of such an image is shown in FIG. 16. In this example, six pairs of item number 255 and format type 256, and a highlighting cursor 257 highlighting one of the pairs are displayed. The highlighting cursor 257 initially highlights the default format, which may have been set to a predetermined format or may be set by the user. When the selecting image is displayed on the LCD 208, the user can select one of the format by moving the highlighting cursor 257 with the arrow keys or one of [01885] keys of the ten-keys 209*a* (S242: YES). If the [6]-[9] keys or other unrelated keys are depressed, control judges that the selection has not been made (S242: NO).

When the user depresses the arrow key (S242: YES), depending on the direction of the depressed arrow key, the highlighting cursor 257 moves upward or downward in FIG. 17 one by one upon every depression of the arrow key. If the user depresses the numeral key ([01905]), depending on the depressed key, the highlighting cursor 257 is moved to the line having the item number same as the depressed key. In S243, it is judged whether the enter key 209*d* is depressed. If the enter key 209*d* is depressed (S243: YES), the format selected in S242 is set us the data format to be used when the image data is stored in the external storage 218 or the internal storage 206*c*. If the enter key 209*d* is not depressed (S243: NO), control returns to S242.

If the user has not depressed none of the arrow keys 209*c* or the [01925] keys (including a case where the user has depressed the [6]-[9] keys) (S246: NO), control proceeds to S246, where it is judged whether the enter key 209*d* is depressed. If the user depresses the enter key 209*d* (S246: YES), the data format to be used is set to the default format (which is the JPEG format in the embodiment) in S247, and the control returns to the main procedure shown in FIG. 13. If the user does not depress the enter key 209*d*, control returns to S242.

As described above, in S204 of FIG. 13, the format of the image data is determined.

In S205, it is judged whether the N-in-1 key 209*g* is depressed. If the N-in-1 key 209*g* has not been depressed (S205: NO), control proceeds to S207. If the N-in-1 key 209*g* has been depressed (s205: YES), control proceeds to S205, where a subroutine, N-IN-1 SETTING procedure is called. In the N-IN-1 SETTING procedure, the number N of pages to be included in one page of the N-IN-1 image is determined by the user.

The N-IN-1 SETTING procedure shown in FIG. 17 will be described. In S261, an image for inputting the number N for the N-in-1 image is displayed on the LCD 208. An example of the image is shown in FIG. 18A. In this example, six item numbers 231 and five selections 230 and a selection 230*a* for directly inputting the number N are provided. Further, a highlighting cursor 232 is also displayed to highlight the currently selected item. The user can select a desired item by moving the highlighting cursor 232 using the arrow keys 209*c* or directly inputting the item number using the ten-keys 209*a* ([01965] keys).

In S262, it is judged whether the number N is selected from the items 0-5 as described above, or the enter key 209*d* is operated. If the user operates the arrow keys 209*c*, ten-keys 209*a*, or the enter key 209*d* (S262: YES), control proceeds to S263. If it is judged that no keys are operated or keys unrelated to the selection of the items are operated (S262: NO), control repeats S262. In S263, it is judged whether the operated key is the enter key 209*d*.

If the enter key 209*d* is operated, the number N corresponding to the item on which the highlighting cursor 232 is located (in case the cursor 232 is on item 5, the input number N) is stored as the number N for the N-in-1 image, and the N-in-1 flag is set. If the number N is two or greater, the N-in-1 flag is set to ON (i.e., "1" is stored in the N-in-1 flag storage area 204*b*). It should be noted that, when item of [0199no N-in-1 image) is selected, the N-in-1 flag is set to OFF (i.e., "0" is stored in the N-in-1 flag storage area 204*b*). When item of [5] (INPUT N) is selected, and the enter key 209*d* is depressed (S263: YES), an image shown in FIG. 18B is displayed on the LCD 208. In this case, the user can directly input the number N through the ten-keys 209*a*. In this case, the thus input number N is stored in the RAM 204 as the number N of the N-in-1 image.

In S207 of FIG. 13, it is judged whether the start key 209*h* is depressed. If the start key 209*h* is not depressed (S207: NO), control returns to S205. If the start key 209*h* has been depressed by the user (S207: YES), control proceeds so that the SCAN TO PCC procedure is executed in accordance with the settings input in steps S203, S204 and S206.

In S208, a parameter P representing the number of sheets of the original is set to 1. This parameter P is stored in a predetermined area of the RAM 204. Then, using the original reading unit 206, a page of the original is read (S209). In S210, it is judged whether the N-in-1 flag is ON (i.e., whether "1" is stored in the N-in-1 flag storage area 204b). If the N-in-1 flag is set to ON (S210: YES), control proceeds to S211, where image data whose area is 1/N of the area of one page of the original is generated in accordance with the data format set in S204. If the N-in-1 image is not set (S210: NO), control proceeds to S212, where image data having the same area as one page of the original is generated in accordance with the data format set in S204.

In S213, it is judged whether all the pages of the original have been read. This judgment is performed using a well-known paper sensor or manual input by the user. If all the pages of the original have not been completed (S213: NO), control proceeds to S214, where the parameter P is incremented by one and control goes to S209. Until all the pages of the original are read, steps S209 through S214 are repeatedly executed. If all the pages of the original have been read (S213: YES), control proceeds to S215. In S215, it is judged whether the N-in-1 setting is effected again. If the N-in-1 setting is effective (S215: YES), using a plurality of pieces of image data each representing an image whose size is 1/N of one page of the original, a page of N-in-1 image data is generated in accordance with the format set in S204 (S216). For example, if the number N is set to 4 (four), image data whose area is ¼ of a page of the original is generated in S211, and a page of 4-in-1 image is generated using four pages of image data each having a ¼ page area (S216). In this case, if the image data generated in S211 includes four or less than four pages of images, only one page of 4-in-1 image is generated in S216. If the image data generated in S211 includes more than four pages of images, a plurality of pages of 4-in-1 images are generated in S216. If the number of images generated in S211 is not a multiple number of four, a white image (i.e., an area which does not have an image thereon) whose size is ¼ of a page of the original is inserted when the N-in-1 image is generated. For example, if three pages of the images are generated in S211, a white image is inserted as the fourth page when the 4-in-1 image is generated in S216. If it is judged, in S215, that the N-in-1 setting is OFF (S215: NO), control proceeds to S217.

In S217, it is judged whether a PDF file is currently stored in the external storage 218. If it is judged in S203 that the external storage 218 is not attached, and that the user intended to continue the SCAN TO PCC procedure, then, in S217, it is judged whether a PDF file is currently stored in the internal storage 204a. If the PDF file is stored in the external storage 218 or the internal storage 204a (S217: YES), it is further judged whether the new image data generated in S212 or S216 is JPEG format image data (S218). If the data is not the JPEG format data (S218: NO), the image data is converted into the JPEG format data in S219, and control proceeds to S220. If the data generated in S212 or S216 is the JPEG format image data (S218: YES), control proceeds to S220. In S220, the JPEG format image data is added at the end of the PDF file stored in the external storage 218 or the internal storage 204a to update the PDF file, and the updated PDF file is re-stored in the external storage 218 or the internal storage 204a. After the PDF file is updated, the procedure shown in FIG. 13 is terminated.

If a PDF file is not stored in the external storage 218 or the internal storage 204a (S217: NO), it is judged whether an image data file is stored in the external storage 218 or the internal storage 204a (S221).

If an image data is currently stored in the external storage 218 or the internal storage 204a (S221: YES), it is judged whether the image data is of the JPEG format data (S222). If the image data is the JPEG format data (S222: YES), control goes to S224. If the image data is not the JPEG format data (S222: NO), the data is converted in the JPEG format image data (S223), and control proceeds to S224.

If no image data is stored in the external storage 218 or the internal storage 204a (S221: NO), a subroutine "FIRST NAME INPUT" procedure (see FIG. 19) is called in S225. By this subroutine, a name of a PDF file to be stored in the external storage 218 or the internal storage 204a, or a name of image data is set.

Next, the FIRST NAME INPUT procedure will be described with reference to FIG. 19. In this procedure, an image inquiring the user to input the name of the newly generated image data is displayed on the LCD 208 (S281). The user can input a desired name of the image data with the keyboard 209. Next, in S282, it is judged whether a key operation using the ten-key 209d or the like is preformed by the user. If the ten-key 209d or the like is operated (S282: YES), control proceeds to S283, where it is judged whether the enter key 209d is depressed. If the enter key 209d is operated (S283: YES), the name input by the user is assigned as the new data name, and control returns to the main procedure shown in FIG. 13. If it is judged that the enter key 209d has not yet been operated (S283: NO), control returns to S282.

If the key input through the ten-keys 209a and the like has note been done by the user (S282: NO), it is judged whether the enter key 209d is depressed (S285). If the enter key 209d has been depressed (S285: YES), a predetermined name including a serial number (e.g., img0001) is assigned as the new image data name, and control returns to FIG. 13. If it is judged that the user has not operated the enter key 209d (S283: NO), then control returns to S282.

As apparent from the foregoing, in the MFP 100, if no PDF data or image data are stored in the external storage 218 or the internal storage 204a, the new data name or the new PDF file name is set by the user.

Next, as shown in FIG. 13, a subroutine IMAGE DATA NEWLY STORING procedure for newly storing the image data is executed (S226), with which the image data read by the original reading unit 206 is stored in the external storage 218 or the internal storage 204a as the new image data of new PDF file having the name determined in S225.

A subroutine, IMAGE DATA NEWLY STORING procedure will now be described with reference to FIG. 20. In S291, it is judged whether the N-in-1 setting is ON. Specifically, in S291, it is judged whether the value "1" is stored in the N-in-1 flag storage area 204b of the RAM 204. If the N-in-1 flag is ON (S291: YES), the number P of pages of the original stored in the RAM 204 and the number N for N-in-1 stored in the RAM 204 are compared, and it is judged whether the number P is greater than the number N (S292). If the number P is greater than the number N (S292: YES), which means that the total number of pages of the original is greater than the number N, control proceeds to S293. In S293, it is judged whether the image data (the new image data) generated as an image is scanned by the original reading unit 206 is the JPEG format data. If the new data is the JPEG format data (S293: YES), the new data is further converted into the PDF file (S295). If the new data is not the JPEG format data (S293: NO), the new image data is converted into the JPEG format data (S294), and then converted into the PDF file (S295). The thus converted PDF file is stored (S296) in the external storage 218 or the internal storage 204a with the name set in the S225 of FIG.

13, and the subroutine shown in FIG. 20 is terminated and control returns to the main procedure shown in FIG. 13.

If it is judged that the N-in-1 setting is OFF (S291: NO), it is judged whether the total number P of pages of the original stored in the RAM 204 is two or more in S297. If the total number P is 2 or greater (S207: YES), control proceeds to S293. In this case, as described above, the PDF file is newly created and stored in the external storage 218 or the internal storage 204a. If the total number P is less than two (i.e., P is equal to one) (S297: NO), control proceeds to S296. In this case, the number of the pages of the original is one, and the image data generated from the one page of the original is stored as it is in the external storage 218 or the internal storage 204a with the name input in S225 of FIG. 13. Thereafter, control proceeds to the main procedure shown in FIG. 13.

If the total number P is not greater than the number N, i.e., if the total number of pages of the original is equal to N or less (S292: NO), control proceeds to S296. In this case, since P≦N, all the pages of the original is included in one page of the N-in-1 image, and therefore only one page of image data is stored. Therefore, the image data is stored as it is in the external storage 218 or the internal storage 204a with the name set in S225 of FIG. 13 (S296), and control returns to the main procedure shown in FIG. 13.

Next, a procedure to be executed if the external storage 218 is inserted in the slot 211 during the execution of the SCAN TO PCC procedure or later will be described with reference to FIG. 21. This subroutine is initiated when the external storage 218 is inserted in the slot 211.

In the EXTERNAL STORAGE INSERTIING procedure shown in FIG. 21, firstly whether the PDF file or the image data is temporarily stored in the internal storage 204a (S2101). If it is judged that the PDF file or the image data is temporarily stored in the internal storage 204a (S2101: YES), it is further judged in S2102 whether the MFP 200 is adding new image data to the PDF file stored in the internal storage 204a or new data file is being stored in the internal storage 204a. If the MFP 200 is adding the image data to the PDF file stored in the internal storage 204a or storing the image data in the internal storage 204a (S2102: YES), control returns to S2101. If it is judged that the MFP 200 is not adding the image data to the PDF file stored in the internal storage 204a or the image data is not being stored in the internal storage 204a (S2102: NO), control proceeds to S2103, where the temporarily stored PDF file or the image data in the internal storage 204a is moved to the external storage 218, and the procedure is terminated. If there is no PDF file or image data in the internal storage 204a (S2101: NO), the procedure is terminated immediately. Upon completion this procedure, the destination to which the new image data is added or stored is changed to the external storage 218. Although not described repeatedly, the similar procedure is performed in the third through eighth embodiments described later. Further, for the external storages 219 and 220, the similar procedures are executed when they area inserted in the slots 212 and 213, respectively.

In the embodiments, when image data is added to the PDF file, the image data is converted into the JPEG format data. It is known that another type of encoded image data can also be added to the PDF file as data for succeeding pages, and the data type need not be limited to the JPEG format data. For example, instead of the JPEG data, GIF data may be used for composing the PDF file.

As described above, according to the second embodiment, if only a PDF file is stored in the external storage 218 or the internal storage 204a, newly stored JPEG data is added at the end of the PDF file. If the newly stored image data is not the JPEG data, it is converted into the JPEG data, and is added at the end of the PDF file.

Further, if image data of some type is stored in the external storage 218 or the internal storage 204a, and new image data is to be stored, the previously stored image data is converted into the JPEG data, and then into the PDF file. Thereafter, the newly stored image data is converted to the JPEG data, if necessary, and is added at the end of the PDF file.

If there are PDF file and some type of image data stored in the external storage 218 or the internal storage 204a, the PDF file is given priority, and newly added image data is added to the end of the PDF file after, if necessary, converted into the JPEG data.

If no PDF files or image data are stored in the external storage 218 or the internal storage 204a, the newly stored image data is stored as a PDF file or as it is with the name set in S225 of the SCAN TO PCC procedure. Specifically, if the newly stored image data is a page of data, it is stored as it is (i.e., with the data format designated by the user). IF the newly stored data include a plurality of pages of data, the image data is converted into a PDF file and then stored with the name set in the SCAN TO PCC procedure.

Third Embodiment

With reference to FIGS. 22 through 26, the third embodiment will be described.

FIG. 22 is a flowchart illustrating the SCAN TO PCC procedure (i.e., the main procedure) of the MFP 200 according to the third embodiment. FIG. 23 is a flowchart illustrating a PDF DESIGNATING procedure and FIG. 24 shows a screen image for designating a PDF file. FIG. 25 is a flowchart illustrating IMAGE DATA NEWLY STORING procedure and FIG. 26 is a flowchart illustrating a SECOND NAME INPUTTING procedure.

Step S2113 is similar to S203 in FIG. 13, and description thereof will be omitted. In S2114, the PDF DESIGNATING procedure, which is a subroutine, is called. In this PDF DESIGNATING procedure, if there area plurality of PDF files in the external storage 218 or internal storage 204a, one PDF file, to which the new image data is to be added, is specified by the user.

In S2131 of FIG. 23, an image 234 showing a plurality of PDF files stored in the external storage 218 or the internal storage 204a are listed on the LCD 208 as shown in FIG. 24. The image 234 shows a plurality of items 235 and 236, item numbers 237 corresponding to the items 235 and 236, and a highlighting cursor 238 indicating the currently selected item 235 or 236 (in FIG. 24, item 236 is selected). When item 236 is selected, a newly storing procedure is executed, which will be described later. Each of items 235 indicates a file name 235a and its extension 235b. Since the listed file are PDF files, the extensions 235b may be hidden. The user may operate the arrow keys 209c to move the cursor 238 or operate ten-keys 209a to designate the item number 237 to select the desired file 235 or the newly storing option 236.

In S2132 of FIG. 23, it is judged whether the user select one of the PDF files. If the user operates the arrow keys 209c or ten-keys 209a to select one of items 235 and 236 (S2132: YES), control proceeds to S2133, where it is judged whether the user depresses the enter key 209d. If it is judged that the user does not depress the enter key 209d (S2133: NO), control returns to S2132. If it is judged that the user depressed the enter key 209d (S2133: YES), the PDF file selected by the user in S2132 is set as the PDF file to which the new image data is added (S2134). Thereafter, control returns to the main procedure shown in FIG. 22.

If the user does not operate the arrow keys 209c nor ten-keys 209a (S2133: NO), it is judged whether the user depresses the enter key 209d without changing the selection (S2135). If it is judged that the user does not depress the enter key 209d (S2135: NO), control returns to S2132. If it is judged that the user depressed the enter key 209d (S2135: YES), a subroutine for NEWLY STORING procedure based on no-designation of a PDF file will be executed, which is shown in FIG. 25. As shown in FIG. 24, in a default status, the highlighting cursor 238 is located on an item 236 of the newly storing procedure. Thus, if the user does not move the highlighting cursor 238, and depresses the enter key 209d, it is known that the user intends to store the new image data as new image data and does not intend to add the image data at the end of the previously stored PDF files. When the NEWLY STORING procedure is executed, the new image data is stored in the external storage 218 or the internal storage 204a as it is, or as a new PDF file.

When the NEWLY STORING procedure shown in FIG. 25 is initiated, a subroutine of SECOND NAME INPUTTING procedure (shown in FIG. 26) is called in S2141. In the SECOND NAME INPUTTING procedure, a name of new image data, which is generated as the original reading unit 206 scans the original, is stored in the external storage 218 or the internal storage 204a as it is or as converted into a PDF file is set.

In S2158, an image for inputting a name of the PDF file or the image data when stored in the external storage 218 or the internal storage 204a is displayed on the LCD 208. Next, it is judged whether the user inputs alphanumeric characters using the ten-keys 209a and the like as the name of the PDF file or the image data in S2159. If it is judged that some alphanumeric characters have been input (S2159: YES), it is further judged whether the enter key 209d is depressed in S2160. If the user has depressed the enter key 209d (S2160: YES), control proceeds to S2161. In S2161, it is judged whether PDF file or image data having the same name as input in S2159 in the external storage 218 or the internal storage 204a. If it is judged that the PDF file or the image data having the same name as input by the user does not exist in the external storage 218 or the internal storage 204a (S2161: NO), the name input by the user in steps S2159 and S2160 is set to be used as the name when the PDF file or the image data is stored in the external storage 218 or the internal storage 204a in S2164.

If it is judged that the PDF file or the image data having the same name as input by the user exists in the external storage 218 or the internal storage 204a (S2161: YES), the fact is notified to the user, and an inquiry asking the user whether the new image data is to be added at the end of the PDF file having the same name, or the existing image data is converted into the PDF file having the similar name, and add the new data at the end of the thus created PDF file in S2162. This notification and inquiry are displayed on the LCD 208, or notified by sound output from a not shown speaker. Next, in S2163, it is judged whether the user instructs the MFP 200 to add the PDF file or the image data to the existing file/data through the keyboard 209. If the user rejects the addition of the data through the keyboard 209 (S2163: NO), control returns to S2158. If the user accepts the addition of the data through the keyboard 209 (S2163: YES), control proceeds to S2134 of FIG. 23.

If it is judged that the alphanumeric characters has not been input (S2159: NO), it is further judged whether the enter key 209d is depressed (S2165). If it is judged that the enter key 209d is not depressed (S2165: NO), control returns to S2159. If it is judged that the enter key 209d id depressed (S2165: YES) without the name of the file/data being input, searching of the names including the continuous serial number in the external storage 218 or the internal storage 204d is executed in S2166. Specifically, in this procedure, names of the PDF files and/or image data having names which include continuous serial numbers are searched in the external storage 218 or the internal storage 204a. Then, in S2167, depending on the search result, control diverges.

If the PDF files or the image data having the names including the continuous serial numbers exist in the external storage 218 or internal storage 204a (S2167: YES), control proceeds to S2168, where the serial number of the name which has the maximum serial number is incremented by one and is used the new name of the PDF file or the image data. For example, if the detected names are "img0001" and "img0002", then "img0003" is used as the new name for the PDF file or the image data to be stored. After the name is determined in S2168, control returns to the procedure shown in FIG. 25.

If the PDF files or image data having the names including the serial numbers do not exist in the external storage 218 or the internal storage 294a (S2167: NO), a name including an initial value of the serial number is assigned as the new name of the PDF file or the image data to be stored (S2169) For example, "img0001" is assigned as the name of the new PDF file or the image data. Thereafter, control returns to the NEWLY STORING procedure shown in FIG. 25.

After the new name is set in the SECOND NAME INPUTTING procedure shown in FIG. 26, control proceeds to S2142 of FIG. 25. It should be noted that steps S2142 through S2155 are similar to steps S204 through S216 of FIG. 13, and therefore, description thereof will be omitted for the sake of brevity. Further, the NEWLY STORING procedure called in S2156 is similar to the procedure shown in FIG. 20 (S226 of FIG. 13), and therefore description thereof will not be repeated.

After S2156 is finished, the procedure shown in FIG. 25 is terminated. Then, procedure shown in FIG. 22 is terminated.

When the PDF file to which the new image data is added is determined in S2134 of FIG. 23, it is judged whether the N-in-1 key 209g is depressed by the user (S2115 of FIG. 22). It should be noted that steps S2115 through S2126 are substantially similar to steps S205 through S216 of FIG. 13, and can be understood with reference to the description of the latter steps. Accordingly, description with respect to steps S2115 through S2126 will be omitted. However, it should be noted that, in S2121, S2122 and S2126, the JPEG format image data is generated but the image data in accordance with the format selected by the user is not generated since the image data is to be added at the end of an PDF file.

At the end of the PDF file designated in S2114, the image data generated in S2126 or in S2122 is added, and the procedure according to the third embodiment is terminated.

As is apparent from the forgoing description, in the MFP 200, if a plurality of PDF files have been stored in the external storage 218 or the internal storage 204a, one of the files is designated by the user, and the new image data is added to the designated PDF file.

If the user has not designated one of the stored PDF files, the image data is stored as it is or as a new PDF file with a new name input by the user in the external storage 218 or the internal storage 204a. In this case, if the newly generated image data is of one page, the image data is stored as it is (i.e., without changing the format thereof) in the external storage 218 or the internal storage 204a with the new name. If the newly generated image data includes a plurality of pages of data, the image data is converted into a PDF file, and then stored in the external storage 218 or the internal storage 204*a* with the new name.

Fourth Embodiment

The fourth embodiment will be described with reference to FIGS. 27 and 28.

FIG. 27 is a flowchart illustrating the SCAN TO PCC procedure according to the fourth embodiment. FIG. 28 shows a flowchart illustrating an IMAGE DATA DESIGNATING procedure which is called in the SCAN TO PCC procedure shown in FIG. 27.

Since S2173 is similar to step S203 of the second embodiment, it will not be described herein. When the procedure in S2173 is finished, a subroutine IMAGE DATA DESIGNATING procedure is called in S2174 for designating image data. In this subroutine, from among a plurality of pieces of image data stored in the external storage 218 or the internal storage 204*a*, one piece of image data is designated by the user.

In the IMAGE DATA DESIGNATING procedure shown in FIG. 28, firstly, an image for selecting one of a plurality of pieces of image data stored in the external storage 218 or the internal storage 204*a* is displayed on the LCD 208 (S2191). The image is, although not shown, similar to that shown in FIG. 24 except that the names of the PDF files (items 235) are replaced with names of the pieces of image data, each of which includes a data name and an extension representative of its data format.

In S2192, it is judged whether one of the pieces of image data is selected. That is, it is judged whether the user operates the arrow keys 209*c* to move the highlighting cursor on the LCD display or directly inputs the item number with the ten-keys 209*a* to select one of the pieces of the image data. If the user operates the arrow keys 209*c* or ten-keys 209*a* (S2192: YES), it is further judged whether the user has depressed the enter key 209*d* (S2193). If it is judged that the user has not depressed the enter key 209*d* (S2193: NO), control returns to S2192. If it is judged that the user has depressed the enter key 209*d* (S2193: YES), control proceeds to S2194, where the designated image data is established as the data to which the new image data is added, and it is judged whether the designated image data is JPEG format data. If the designated image data is the JPEG format data (S2194: YES), control proceeds to S2196, where the JPEG format data is converted into a PDF file. If the designated data is not the JPEG format data (S2194: NO), then the designated image data is converted into the JPEG format data (S2196), and then is converted into the PDF file (S21196). Thereafter, control returns to the SCAN TO PCC procedure shown in FIG. 27.

If it is judged that the user has not depressed the arrow keys 209*c* nor the ten-keys 209*a* (S2192: NO), it is judged whether the user has depressed the enter key 209*d* without operating the arrow keys 209*c* or the ten-keys 209*a* (S2197). If it is judged that the user has not operated the enter key 209*d* (S2197: NO), control returns to S2192. If it is judged that the user has operated the enter key 209*d* (S2197: YES), control proceeds to S2198 where a subroutine NEWLY STORING procedure for newly storing image data of a PDF file will be called in S2198. That is, in the image data selection image show in S2191, the image data of the PDF file is saved as new data/file in a default status. If the user depresses the enter key 209*d* without moving the highlighting cursor, the user's intention is to store the image data of the PDF file as new data/file, and therefore in such a case control proceeds from S2197 to S2198, where the NEWLY STORING procedure is called. Since the NEWLY STORING procedure called in S2198 has been described with reference to FIG. 25, description thereof will be omitted herein. It should be noted that, when the SEOOND NAME INPUTTING procedure (shown in FIG. 26) is called in the NEWLY STORING procedure (shown in FIG. 25), if it is judged that the image data of the PDF file is added to the previously stored image data or the PDF file (S2163: YES), then control proceeds to S2194 of FIG. 27. Further, if the NEWLY STORING procedure (S2156) is finished, the procedure shown in FIG. 27 is terminated.

After the JPEG format image data is converted into the PDF file in S2196, it is judged whether the N-in-1 key 209*g* has be depressed by the user (S2175 of FIG. 27). Since the steps S2175 through S2186 in FIG. 27 are similar to steps S2115 through S2126 in FIG. 22, description thereof will not be repeated.

In S2187, the image data generated in S2186 or S2182 is added to the PDF file, which has been converted from the image data previously stored in the external storage 218 or the internal storage 204*a*, then the updated PDF file is re-stored in the external storage 218 or the internal storage 204*a*, and the SCAN TO PCC procedure according to the fourth embodiment is finished.

As is understood from the foregoing description, if a plurality of pieces of image data are previously stored in the external storage 218 or the internal storage 204*a*, the user selects one of the previously stored image data. Then, the selected image data is converted into a PDF file, to which new image data is added to update the PDF file. The updated PDF file is re-stored in the external storage 218 or the internal storage 204*a*.

If the user has not selected one of the previously store image data, the new data can be stored in the external storage 218 or the internal storage 204*a* as new image data or a new PDF file with a new name thereof. Specifically, the new data include a page of data, then the image data is stored as is, while the new image data includes a plurality of pages of data, then the image data is converted into the PDF file and is stored in the external storage 218 or the internal storage 204*a* with a new name.

Fifth Embodiment

Next, with reference to FIGS. 29, 30 and 32, the SCAN TO PCC procedure according to the fifth embodiment will be described. FIG. 29 is a flowchart illustrating the SCAN TO PCC procedure according to the fifth embodiment. FIG. 30 shows a flowchart illustrating an OBJECTIVE FILE DESIGNATING procedure which is called in the SCAN TO PCC procedure shown in FIG. 29. FIG. 32 is a flowchart illustrating a THIRD NAME INPUTTING procedure. It should be noted that all the steps other than steps S2204 and S2217 of FIG. 29 are similar to those in the third or fourth embodiment, and description thereof will be omitted.

In S2204 of FIG. 29, a subroutine OBJECTIVE FILE DESIGNATING procedure is called, which is shown in FIG. 30. In the OBJECTIVE FILE DESIGNATING procedure, one of a plurality of PDF files or a plurality of pieces of image data stored in the external storage 218 or the internal storage 204*a* is designated as a file/data, to which new image data is added, by the user.

In FIG. 30, firstly an image for selecting a plurality of PDF files and/or a plurality of pieces of image data stored in the external storage 218 or the internal storage 204*a* is displayed on the LCD 208 (S2221). Although the image is not shown in a drawing, it is similar to the image shown in FIG. 24, and the items 235 are replaced with a plurality of PDF files and a plurality of pieces of image data.

Next, it is judged whether one of the plurality of PDF files and the plurality of pieces of the image data is selected (S2222). That is, it is judged whether the user operates the arrow keys 209c to move the highlighting cursor or the ten-keys 209a to input the item number to select a PDF file or image data. If the user operates the arrow keys 209c or the ten-keys 209a (S2222: YES), control proceeds to S2223, where it is further judged whether the enter key 209d is depressed. If it is judged that the user has not depressed the enter key 209d (S2223: NO), control returns to S2222. If it is judged that the user has depressed the enter key 209d (S2223: YES), control proceeds to S2226, where the designated item is a PDF file (i.e., new image data is to be added at the end of the designated PDF file). If the designated item is a PDF file (S2226: YES), the procedure of FIG. 30 is terminated, and control returns to the SCAN TO PCC procedure shown in FIG. 29.

If the designated item is not a PDF file (S2226: NO), control proceeds to S2227. When the PDF file is not designated, the item designated in S2222 and S2223 represents image data of some format. In such a case, in S2227, it is judged whether there is a PDF file having the same name as the designated image data in the external storage 218 or the internal storage 204a. If a PDF file having the same name as the designate image data is not stored in the external storage 218 or the internal storage 204a (S2227: NO), it is judged whether the data format of the designated image data is a JPEG format (S2233). If the data format is the JPEG format, control proceeds to S2235, where the designated image data is converted into a PDF file. If the designated image data is not of the JPEG format data (S2233: NO), the designated image data is converted into JPEG format data (S2234), and then is converted into the PDF file (S2235). Thereafter, control returns to the SCAN TO PCC procedure shown in FIG. 29.

If a PDF file having the same name as the designated image data is stored in the external storage 218 or the internal storage 204a (S2227: YES), the name of the designated image data is changed, and the changed name is displayed on the LCD 208 (S2228). For example, a message "A PDF file having the same name exists, and a new name AAA will be used. Press [1] to change, [2] to remain unchanged" is displayed on the LCD 208. The name AAA in the above example is automatically generated and no file/data stored in the external storage 218 or internal storage 204a does not have the name AAA. Following the message displayed on the LCD 208, the user is capable of changing the name of the designated image data.

Next, it is judged whether [1] key or [2] key is depressed by the user (S2229). If [1] key is depressed (S2229: YES), control proceeds to S2230, and the name of the designated image data is changed to the new name (AAA in the above example). If [2] key is depressed (S2229: NO), then control proceeds to S2231, where it is judged whether the previously stored PDF having the same name of the designated image data should be overwritten with a newly created PDF file. For example, an inquiry "Press [1] to overwrite old PDF file, or press [2] to input a new name of the image data" may be displayed on the LCD 208, and the decision in S2231 is made in accordance with the key input by the user. If [1] key is depressed (S2231: YES), control proceeds to S2233. If [2] key is depressed (S2231: NO), control proceeds to S2232, where the THIRD NAME INPUTTING procedure is called. This procedure is show in FIG. 32 and is executed when a new name of a PDF file is input.

In FIG. 32, firstly, an image for inputting the new name is displayed on the LCD 208 (S2261). Then, the user inputs the new name through the ten-keys 209a and the like (S2262). After the input of the new name, the user depresses the enter key 209d to validate the new name. Accordingly, in S2263, it is judged whether the enter key 209d is depressed. Until the enter key 209d is depressed, control stays at S2263, and when the enter key 209d is depressed (S2263: YES), the name is validated (S2264). Then, control returns to S2227 of FIG. 30.

If the user has not depressed the arrow keys 209c or the ten-keys 209a (S2222: NO), it is judged whether the user has depressed the enter key 109b without operating the arrow keys 209c or ten-keys 209a (S2224). If the user has not depressed the enter key 209d (S2224: NO), control returns to S2222. If the user has depressed the enter key 209d (S2224: YES), the subroutine NEWLY STORING procedure shown in FIG. 25 is called in S2225. That is, in the image displayed in S2221, NEWLY STORING PROCEDURE is set to be a default selection. Thus, if the user depresses the enter key 209d without operating the arrow keys 209c or the ten-keys 209a, the user's intention is to newly store the new image data in the external storage 218 or the internal storage 204a. In this NEWLY STORING procedure, the new data is stored as it is or after converted into the PDF file. Since the procedure shown in FIG. 25 is described above, it will not be explained again. It should be noted that, when the NEWLY STORING procedure is called at S2225, when the decision at S2163 of FIG. 26 is YES, control proceeds to S2226 of FIG. 30. If S2156 of FIG. 25 is finished, then the procedure shown in FIG. 29 is terminated.

If a PDF file is set in S2223 or image data is converted into the PDF file in S2235, it is judged whether the N-in-1 key 209g is depressed (S2205). It should be noted that steps S2205 through S2216 are the same as steps S2115 through S2126 of the third embodiment or steps S2175 through S2186 of the fourth embodiment, and will not be described again.

In S2217, the JPEG format data created in S2216 or S2212 is added at the end of the PDF file designated in S2204 or the PDF file which is converted from the image data designated in S2204 to update the PDF file. Then the updated PDF file is stored in the external storage 218 or the internal storage 204a, and the procedure shown in FIG. 29 is terminated.

If the image data is designated, and a PDF file having the same name as the designated image data is stored in the external storage 218 or the internal storage 204a, a candidate of the new name is automatically presented to the user. The user can accept the candidate, overwrite the old PDF file with the new PDF file or save the new PDF file with a new name, which is input by the user.

Sixth Embodiment

Next, with reference to FIGS. 31 and 32, the SCAN TO PCC procedure according to the sixth embodiment will be described. FIG. 31 shows a flowchart illustrating the SCAN TO PCC procedure according to the sixth embodiment. FIG. 32 is, as described above, a flowchart illustrating the THIRD NAME INPUTTING procedure.

In FIG. 30, steps S2243 and S2245 through S2256 are similar to those in the second, third and fourth embodiments, and description thereof is not repeated. Further, S2244 is similar to S2232 (FIG. 30) and S2259 is similar to S226 (FIG. 13). Thus, description thereof will also be omitted.

In FIG. 31, when control proceeds from S2255 or S2256 to S2257, it is judged whether there is a PDF file having the same name as set in S2244 in the external storage 218 or the internal storage 204a (S2257). If the PDF file having the same name is found (S2257: YES), control proceeds to S2258, where the JPEG format image file generated in S2252 or S2256 is added to the end of the PDF file having the same name as set in S2244. Then, the updated PDF file is re-stored in the external storage 218 or the internal storage 204a. If there is no PDF file having the same name as set in S2244 in the external storage 218 or the internal storage 204a (S2257: NO), control proceeds to S2259, where the subroutine NEWLY STORING procedure is called. The NEWLY STORING procedure is described above, and will not be explained again. When S2258 or S2259 is finished, the SCAN TO PCC procedure shown in FIG. 31 is terminated.

As is understood from the foregoing description, according to the sixth embodiment, if the name of the newly stored image data is input by the user, and the PDF file having the same name has been stored in the external storage 218 or the internal storage 204a, the new data is added at the end of the PDF file having the same name. The thus updated PDF file is re-stored in the external storage 218 or the internal storage 204a.

If the PDF file having the same name as the newly stored image data is not stored in the external storage 218 or the internal storage 204a, the new image data is stored in the external storage 218 or the internal storage 204a as image data of the PDF file with the new name input by the user.

Seventh Embodiment

The SCAN TO PCC procedure according to the seventh embodiment will be described with reference to FIG. 33, which shows a flowchart illustrating the SCAN TO PCC procedure.

Steps S2273 through S2286 of FIG. 33 are similar to S2243 through S2256 (FIG. 31) of the sixth embodiment, and the description thereof will be omitted.

In FIG. 33, when S2285 or S2286 is finished, it is judged whether the image data having the same name as is set in S2274 is stored in the external storage 218 or the internal storage 204a (S2287). If the image data having the same name is stored in the external storage 218 or the internal storage 204a (S2287: YES), it is further judged whether the image data having the same name is the JPEG format image data (S2288). If the image data is the JPEG format data (S2288: YES), control proceeds to S2290. If the image data is not the JPEG format data (S2288: NO), the image data is converted into the JPEG format data in S2289, and then control proceeds to S2290. In S2290, the JPEG format data is converted into the PDF file. Then, in S2291, the newly stored image data is added to the end of the thus converted PDF file. The updated PDF file is then re-stored in the external storage 218 or the internal storage 204a, and the procedure shown in FIG. 33 is terminated.

If the no image data having the same name as set in S2274 is stored in the external storage 218 or the internal storage 204a (S2287: NO), control proceeds to S2292, where the subroutine NEWLY STORING procedure is called. The subroutine has been explained in the foregoing description. After the NEWLY STORING procedure is finished, the procedure shown in FIG. 33 is terminated.

As understood from the above, according to the seventh embodiment, when the name of the image data to be newly store is input by the user, and if the image data having the same name as the data to be newly stored has been stored in the external storage 218 or the internal storage 204a, the image data having the same name as the newly store image data is converted into JPEG data (if necessary), and then the JPEG data is converted into the PDF file. Then, the newly stored image data is added at the end of the thus converted PDF file.

Eighth Embodiment

Hereinafter, with reference to FIGS. 34 and 35, the SCAN TO PCC procedure according to the eighth embodiment will be described.

FIGS. 34 and 35 show a flowchart illustrating the SCAN TO PCC procedure according to the eighth embodiment.

Steps S2303 through S2316 of FIG. 34 are similar to S2243 through S2256 of the sixth embodiment or S2273 through S2286 of the seventh embodiment, and accordingly, description thereof will not be repeated, and S2137 and the following steps will be described in detail.

When S2315 or S2316 is finished, it is judged whether the PDF file or the image data having the same name which has been set in S2304 is stored in the external storage 218 or the internal storage 204a in S2317. If the PDF file or the image data having the same name as set in S2304 is stored in the external storage 218 or the internal storage 204a (S2317: YES), it is further judged whether a plurality of PDF files and/or image data having the same name are stored in the external storage 218 or the internal storage 204a (S2319). If a plurality of PDF files and/or image data are stored in the external storage 218 or the internal storage 204a (S2319: YES), the PDF files and/or the image data having the same name are listed on the LCD 208 (S2320) and ask the user to designate one of the listed PDF files and/or image data. Similarly to the other embodiments, designation of one of the PDF files and/or image data can be done with use of a highlighting cursor, arrow keys 209c and ten-keys 209a (S2321). If it is judged that a plurality of PDF files or the image data having the same name as was set in S2304 are not stored in the external storage 218 or the internal storage 204a (i.e., a single PDF file or the image data having the same name is found) (S2319: NO), S2320 and S2321 are skipped, and control proceeds to S2322. In S2322, it is judged whether the new image data is to be added to a PDF file. If so (S2322: YES), control proceeds to S2332. If the designation to which the new image data is added is not the PDF file (S2322: NO), control proceeds to S2323. Steps S2322 through S2331 are similar to S2226 through S2235 of FIG. 30, and therefore, will not be described in detail.

If the destination to which the new image data is added is the PDF file (S2322: YES), to the PDF file, or if the destination to which the new image data is added is the image data (S2322: NO), and the image data is converted to the PDF file (S2331) to the converted PDF file, the new image is added at the end thereof (S2332). Then, the PDF file to which the new image data is added is re-stored in the external storage 218 or the internal storage 204a, and the procedure shown in FIGS. 34 and 35 is terminated.

If no PDF file or the image data having the same name as set in S2304 is stored in the external storage 218 or the internal storage 204a (S2317: NO), the NEWLY STORING procedure shown in FIG. 20 is executed (S2318), and the procedure shown in FIGS. 34 and 35 is terminated.

As is understood from the foregoing description, according to the eighth embodiment, if the name of the image data to be newly stored is input and PDF files and/or image data having the same name have already been stored in the external storage 218 or the internal storage 204a, they are informed to the user so that one of them is selected. Then, the new image data is added to the selected PDF file/image data. In this case, if the PDF file is selected as the destination, the new image data is added at the end of the selected PDF file. If the image data is selected, it is converted into the PDF file, and then the new image data is added to the end of the converted PDF file.

It is preferable that, if both the PDF files and image data having the same name as the name of the image data to be newly stored are stored in the external storage 218 or the internal storage 204a, selection is made by the user. Optionally, priority may be given to the PDF files and image data in such a case. If the user selects the image data to which the new image is to be added, and there exists a PDF file having the same name of the selected image data, the name of the selected image data may be changed, and then the image data is converted into image data having a predetermined format, and is further converted into a PDF file. Then, the new image data is added at the end of the thus created PDF file.

It should be noted that, in the above-described second through eighth embodiments, description is given with respect to only one of the slots 211-213 and one of the external storages 218-220 for the sake of brevity. Since a plurality of slots are provided and a plurality of external storages can be inserted, the above described embodiments can be modified to make use of the plurality of slots/external storages. For example, each of the embodiments can be modified such that the user can select a desired one of the slots/external storages. Alternatively or optionally, a predetermined slot/external storage may be specified as default slot/external storage.

In the procedure shown in FIG. 14, even if the external storage 218 is inserted in the slot 211, the internal storage 204a may be used as a temporary storage if the remaining capacity of the external storage 218 is insufficient. In such a case, it is preferable that a message indicating the external storage 218 should be exchanged is displayed.

In the above embodiments, the user designate only one PDF file or one piece of image data as a destination to which the new image data is added. However, the invention need not be limited to such a configuration, and each embodiment may be modified such that the user can select a plurality of PDF files and/or image data and the new image data may be added to all of the selected PDF files/image data.

Although the eight embodiments are separately described, it should be understood that any appropriate combination of features of the embodiments and modifications thereof are also within the scope of the present invention.

The MFPs and procedures according to the present invention can be realized when appropriate programs are provided and executed by a personal computer or the like. Such programs may be stored in recording medium such as a flexible disk, CD-ROM, memory cards and the like and distributed. Alternatively or optionally, such programs can be distributed through networks such as the Internet.

The present disclosure relates to the subject matters contained in Japanese Patent Applications No. 2002-09294, filed on Mar. 28, 2002, and No. 2002-202608, filed on Jul. 11, 2003, which are expressly incorporated herein by reference in their entireties.

What is claimed is:

1. An imaging apparatus capable of storing image data in a storage, comprising:
    an image obtaining system that obtains original image data;
    a conversion system that converts the original image data into converted image data; and
    an image data storing system that stores the converted image data in the storage,
    wherein the conversion system converts the original image data into the converted image data having a first format if only one page of the converted image data is to be stored in the storage, while the conversion system converts the original image data into the converted image data having a second format if a plurality of pages of the converted image data is to be stored in the storage, the first format and the second format being different from each other, the first format being capable of including only one page of image data in the converted image data, the second format being capable of including a plurality of pages of image data in the converted image data.

2. The imaging apparatus according to claim 1, wherein, even if the original image data includes a plurality of pages of images, the conversion system converts a first page of the original image data including a plurality of pages of images into the converted image data having the first format.

3. The imaging apparatus according to claim 1, wherein the first format is a versatile image format.

4. The imaging apparatus according to claim 2, further comprising:
    a detecting system that detects the converted image data converted from the first page of the original image data including a plurality of pages of images in said storage,
    wherein the conversion system converts the converted image data stored in the first format detected by said detecting system into new converted image data having the second format and converts a second page of the original image data into second new converted image data having the first format;
    the image data storing system adds the second new converted image data at the end of the first new converted image data.

5. The imaging apparatus according to claim 1, further comprising:
    a detecting system that detects a plurality of pieces of the converted image data each stored in the second format,
    wherein said imaging apparatus further includes:
        a user operable selection system which allows the user to select one of the plurality of pieces of the converted image data detected by said detecting system; and
        a conversion system that converts the converted image data selected by the user with said user operable selection system into new converted image data having the first format,
    wherein said image data storing system adds the new converted image data at the end of the stored converted image data converted by said conversion system.

6. The imaging apparatus according to claim 1, wherein said storage includes an electrically connectable removable storage.

7. The imaging apparatus according to claim 6, wherein said storage includes:
    an internal storage provided inside said imaging apparatus; and
    a detecting system that detects whether the removable storage is connected to said imaging apparatus,
    wherein said image data storing system stores the converted image data in said internal storage if said detecting system detects that the removable storage is not connected to the imaging apparatus.

8. The imaging apparatus according to claim 6, further comprising:
    a capacity detecting system that detects a remaining capacity of the removable storage, said image data storing system storing the converted image data in an internal storage if the remaining capacity of the removable storage detected by said capacity detecting system is less than a predetermined capacity.

9. The imaging apparatus according to claim 1, further comprising:
an N-in-1 image composing system that composes an N-in-1 image having reduced N pages of images in one image,
wherein the conversion system converts the original image data into converted image data in accordance with the number of pages of N-in-1 images.

10. The imaging apparatus according to claim 9, wherein if the original image data includes a plurality of pages of N-in-1 images, which have reduced N pages of images in one image, the conversion system converts the original image data into the converted image data having the second format.

11. The imaging apparatus according to claim 9, wherein if the original image data includes only one page of N-in-1 image, the conversion system converts the original image data into the converted image data having the first format.

12. The imaging apparatus according to claim 1, which functions as a facsimile machine, said original image data including facsimile transmission and/or reception data, and
wherein said storage includes a removable storage, said image data storing system stores converted facsimile transmission and/or reception data in said removable storage in a versatile image format.

13. The imaging apparatus according to claim 12, wherein said storage includes an internal storage provided in said imaging apparatus, said image data storing system storing the converted facsimile transmission and/or reception data in said internal storage in a dedicated format for the facsimile machine.

14. The imaging apparatus according to claim 1, wherein said image obtaining system includes a scanning system.

15. The imaging apparatus according to claim 1, wherein said storage includes an internal storage provided in said imaging apparatus and an external storage which is detachably coupled to said imaging apparatus, said image data storing system stores the converted image data in said internal storage and in said external storage in different formats.

16. The imaging apparatus according to claim 15,
wherein said imaging apparatus functions as a facsimile machine,
wherein said image obtaining system obtains facsimile transmission data as the original image data,
wherein said image data storing system is capable of storing the converted image data in any one of:
a dedicated facsimile transmission format;
a first format for versatile image data; and
a second format for versatile image data, the dedicated facsimile transmission format, the first format and the second format being different from each other,
wherein, when the facsimile transmission and/or reception data is stored in said external storage, said image data storing system stores converted facsimile transmission and/or reception data in one of the first format and the second format, and
wherein, when the converted facsimile transmission and/or reception data is stored in said internal storage, said image data storing system stores the converted facsimile transmission and/or reception data in the dedicated facsimile transmission format.

17. The imaging apparatus according to claim 1, further comprising an image data format selecting system that selects an image data format, wherein said second format is an image data format selected by the image data format selecting system.

18. The imaging apparatus according to claim 4, wherein the conversion system converts a next page of the original image data into next new converted image data having the first format, and the image data storing system adds the next new converted image data at the end of the first new converted image data to which the second new converted image data has been added.

19. An imaging apparatus, which scans an original image to obtain original image data, said imaging apparatus comprising:
a file format selecting system that selects a file format;
a data conversion system that converts the original image data into converted image data;
a connecting system capable of transmitting the converted image data to an external storage; and
a controlling system that controls said data conversion system to convert the original image data such that,
if the converted image data having a plurality of pages is to be stored in the external storage, the original image data is converted into the converted image data having a specific file format, and
if the converted image data having a single page is to be stored in the external storage, the original image data is converted into the converted image data having the file format selected by said file format selecting system for storing the converted image data in the external storage through said connecting system,
the selected file format and the specific file format being different from each other, the selected file format being capable of including only one page of image data in the converted image data, the specific file format being capable of including a plurality of pages of image data in the converted image data.

20. The imaging apparatus according to claim 19, wherein said controlling system controls said data conversion system to convert a first page of the original image data into converted data having the file format selected by said file format selecting system.

21. The imaging apparatus according to claim 19, wherein said controlling system controls said data conversion system to convert the original image data into converted data having the specific file format if the original image data includes a plurality of pages of images.

22. The imaging apparatus according to claim 21, wherein, when said data conversion system converts the original image data into the converted image data having the specific file format, if there is a page which has been converted from the original image data to the converted image data having the file format selected by said file format selecting system, the data conversion system converts the converted data having the file format selected by the file format selecting system into the specific file format.

23. The imaging apparatus according to claim 19, further including:
a communication device capable of communicating with another communication device through a communication line, said imaging apparatus capable of storing the original image data transmitted/received in the communication with the other communication device; and
a storing system that stores the converted image data, said storing system storing the original image data in a facsimile transmission/reception format if the external storage is not connected to said imaging apparatus or if the external storage is connected to said imaging apparatus but does not have sufficient remaining capacity.

24. The imaging apparatus according to claim 21, wherein the specific file format includes header information, compressed image data compressed in accordance with a predetermined compression method and file information in one file.

25. The imaging apparatus according to claim 21, wherein the specific file format includes a PDF format.

26. The imaging apparatus according to claim 24, wherein, if the original image data includes a plurality of pages, said data conversion system converts the original image data on a page basis in accordance with the predetermined compression method to generate a plurality of compressed pages, said plurality of compressed pages being included in one file.

27. An image data processing apparatus, comprising:
an original reading unit that scans an image on an original to generate original first image data;
a storage capable of storing a file having a predetermined file format, the file having the predetermined file format capable of including a plurality of pages within a single file;
a data converting unit configured to convert the original first image data into converted image data having a predefined data format, the data having the predefined data format being allowed to be added to the file having the predetermined file format; and
a storing system that updates the file stored in the storage by adding the converted image data as a page subsequent to a last page of the file stored in the storage,
the predetermined file format and the predefined data format being different from each other.

28. The image data processing apparatus according to claim 27, wherein said storage is capable of storing the original first image data.

29. The image data processing apparatus according to claim 28, wherein if only the original first image data has been stored in said storage, said data converting unit converts the original first image data into the file having the predetermined file format, and wherein said storing system adds subsequently generated original first image data at an end of the file having the predetermined file format as a subsequent page.

30. The image data processing apparatus according to claim 27, further including a file designating system allowing a user to designate a specific file from among a plurality of files stored in said storage, wherein if the specific file is designated with said file designating system, said storing system adds subsequently generated original first image data at an end of the specific file designated with said file designating system as a subsequent page.

31. The image data processing apparatus according to claim 28, further including an image data designating system allowing a user to designate a specific one of a plurality of pieces of the original first image data stored in said storage, wherein if the specific one of the plurality of pieces of the original first image data is designated with said image data designating system, said data converting unit converts the specific one of the plurality of pieces of the original first image data designated with said image data designating system into the file having the predetermined file format, said storing system adding subsequently generated original first image data at an end of the file having the predetermined file format converted by said data converting unit as a subsequent page.

32. The image data processing apparatus according to claim 27, wherein said original reading unit is capable of generating the converted image data having the predefined data format and representing an area of 1/N of one page area, N being an integer, and
wherein said image data processing apparatus further includes an N-in-1 image data composing system that combines a plurality of pieces of converted image data each representing an area of 1/N times of one page area to compose an N-in-1 type second converted image data.

33. The image data processing apparatus according to claim 32, further comprising:
an N-in-1 instruction system through which a user can instruct whether said N-in-1 image data composing system composes the second converted image data, wherein, if the user instructs, through said N-in-1 instruction system, said N-in-1 image data composing system to compose the second converted image data, said original reading unit generates converted image data having the predefined data format and representing 1/N times one page area, and said storing system adds the second converted image data generated by said N-in-1 image data composing system at an end of the file having the predetermined file format and stored in said storage as a subsequent page.

34. The image data processing apparatus according to claim 32, further comprising:
an N inputting system through which a user can input a number N for the N-in-1 image data composing system.

35. The image data processing apparatus according to claim 28, further comprising:
a designating system allowing a user to designate one of the original first image data and files stored in said storage; and
a judging system that judges whether a file or the original first image data is designated with said designating system,
wherein if said judging system judges that the file is designated with said designating system, said storing system adds subsequently generated first image data at an end of the file as a subsequent page, and
wherein if said judging system judges that a piece of the original first image data is designated by said designating system, said data conversion system converts the designated piece of the original first image data into the file having the predetermined file format, said storing system adding subsequently generated original first image data at an end of the converted file as a subsequent page.

36. The image data processing apparatus according to claim 27, further including:
an image data name inputting system that allows a user to input a name of newly generated original first image data generated by said original reading unit; and
a file name detection system that detects names of files stored in the storage.

37. The image data processing apparatus according to claim 36, further comprising:
a notifying system, and
a destination selection system allowing a user to select a destination to which the converted image data is to be added,
wherein if a plurality of files and/or pieces of the converted image data having the same name that is inputted through said image data name inputting system exist in said storage, said notifying system notifies the user that a plurality of files and/or pieces of the converted image data having the same name as inputted through said image data name inputting system exist in said storage in order to request the user to select the destination, through said destination selection system, subsequently generated original first image data being added to the destination selected with said destination selecting system.

38. The image data processing apparatus according to claim 27, further comprising:
an external storage receiving unit to which an external storage can be detachably coupled, said storage including the external storage coupled to said external storage receiving unit.

* * * * *